United States Patent [19]

Wada et al.

[11] Patent Number: 5,481,325
[45] Date of Patent: Jan. 2, 1996

[54] MECHANISM FOR LOCKING CARTRIDGE COMPARTMENT COVER OF CAMERA

[75] Inventors: Shigeru Wada, Kishiwada; Akira Funahashi, Sakai, both of Japan; Michihiro Iwata, Ridgewood, N.J.

[73] Assignee: Minolta Camera Kabushiki Kaisha, Osaka, Japan

[21] Appl. No.: 380,936

[22] Filed: Jan. 31, 1995

Related U.S. Application Data

[63] Continuation of Ser. No. 224,656, Apr. 6, 1994, abandoned.

[30] Foreign Application Priority Data

| Apr. 7, 1993 | [JP] | Japan | 5-080461 |
| Apr. 7, 1993 | [JP] | Japan | 5-080513 |
| Jun. 10, 1993 | [JP] | Japan | 5-138307 |
| Jun. 16, 1993 | [JP] | Japan | 5-145193 |
| Jun. 16, 1993 | [JP] | Japan | 5-145194 |
| Jun. 18, 1993 | [JP] | Japan | 5-147380 |

[51] Int. Cl.$^6$ ........................................ G03B 1/18
[52] U.S. Cl. ............................. 354/173.1; 354/288
[58] Field of Search ................... 354/173.1, 173.11, 354/212, 288

[56] References Cited

U.S. PATENT DOCUMENTS

| 4,994,828 | 2/1991 | Smart | 354/21 |
| 4,998,123 | 3/1991 | Smart | 354/275 |
| 5,231,438 | 7/1993 | Smart | 354/281 |

FOREIGN PATENT DOCUMENTS

| 54-128732 | 10/1979 | Japan. |
| 55-46732 | 4/1980 | Japan. |
| 63-305350 | 12/1988 | Japan. |
| 1-191836 | 8/1989 | Japan. |
| 1-191837 | 8/1989 | Japan. |
| 2-71258 | 3/1990 | Japan. |
| 2-181141 | 7/1990 | Japan. |
| 3-135536 | 6/1991 | Japan. |
| 3-267933 | 11/1991 | Japan. |
| 4-1621 | 1/1992 | Japan. |
| 4-75339 | 7/1992 | Japan. |

Primary Examiner—Howard B. Blankenship
Attorney, Agent, or Firm—Burns, Doane, Swecker & Mathis

[57] ABSTRACT

A cover-locking mechanism for locking a cover with respect to a cartridge compartment so that the cover is prevented from being opened when a film cartridge is accommodated inside the cartridge compartment with a film thereof being outside the film cartridge.

The cover-locking mechanism is operated by using a driving force to drive either a film-feeding mechanism or a light-intercepting door of the cartridge disposed at an entrance/exit of the film thereof. If the mechanism is of a type of being operated by the driving force of the film-feeding mechanism, it is constructed to be controlled by a driving force to drive the film-feeding mechanism so that the cover is prevented from being opened when the film is outside the cartridge. Meanwhile, if the mechanism is of a type of being operated by the driving force of the light-intercepting door, it is constructed so as to be synchronized with the operation of the light-intercepting door; namely, the light-intercepting door is opened and the compartment cover is prevented from being opened when the film is fed outside the film cartridge, while the light-intercepting door is closed and the compartment cover can be opened when the film is rewound inside the film cartridge.

35 Claims, 46 Drawing Sheets

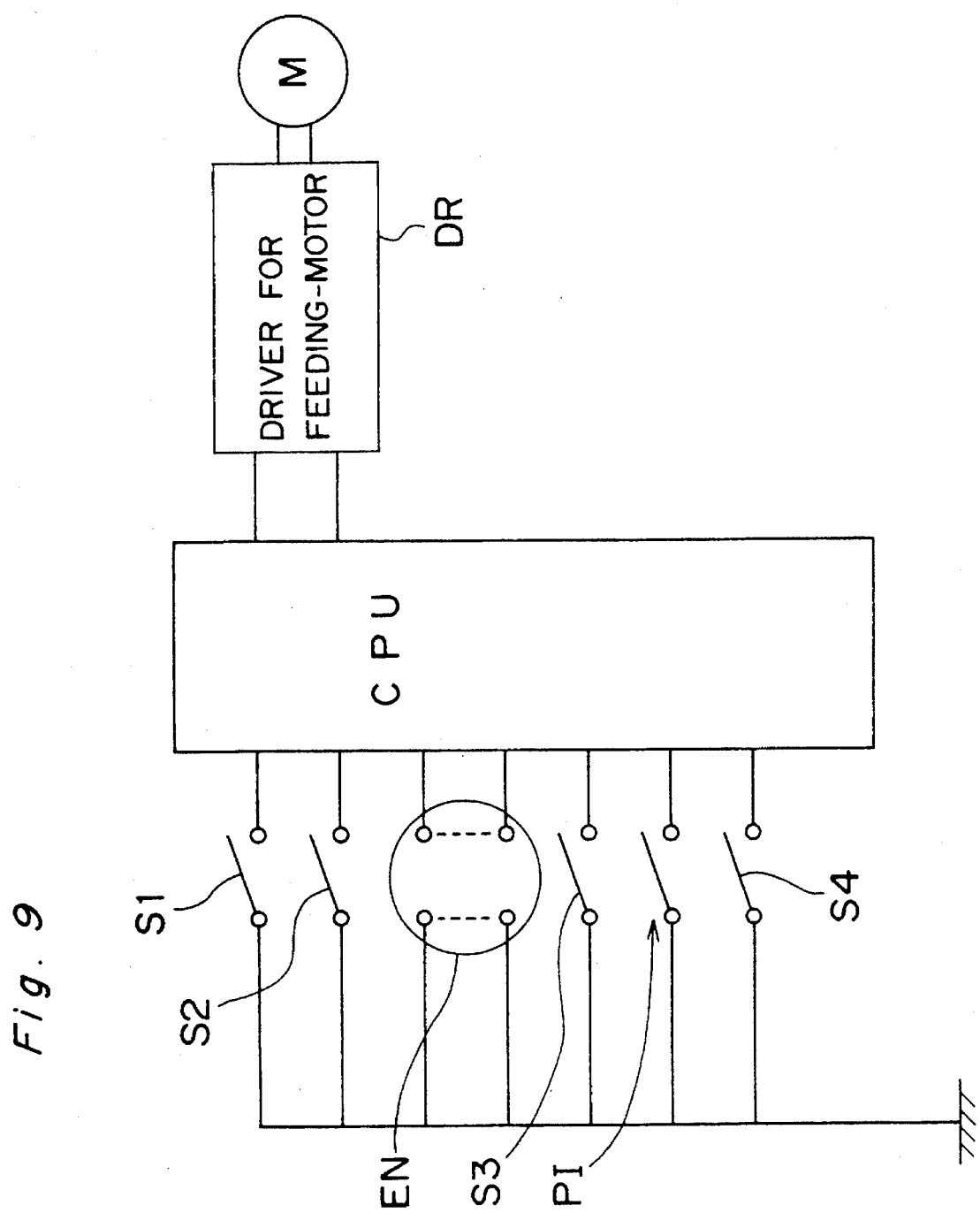

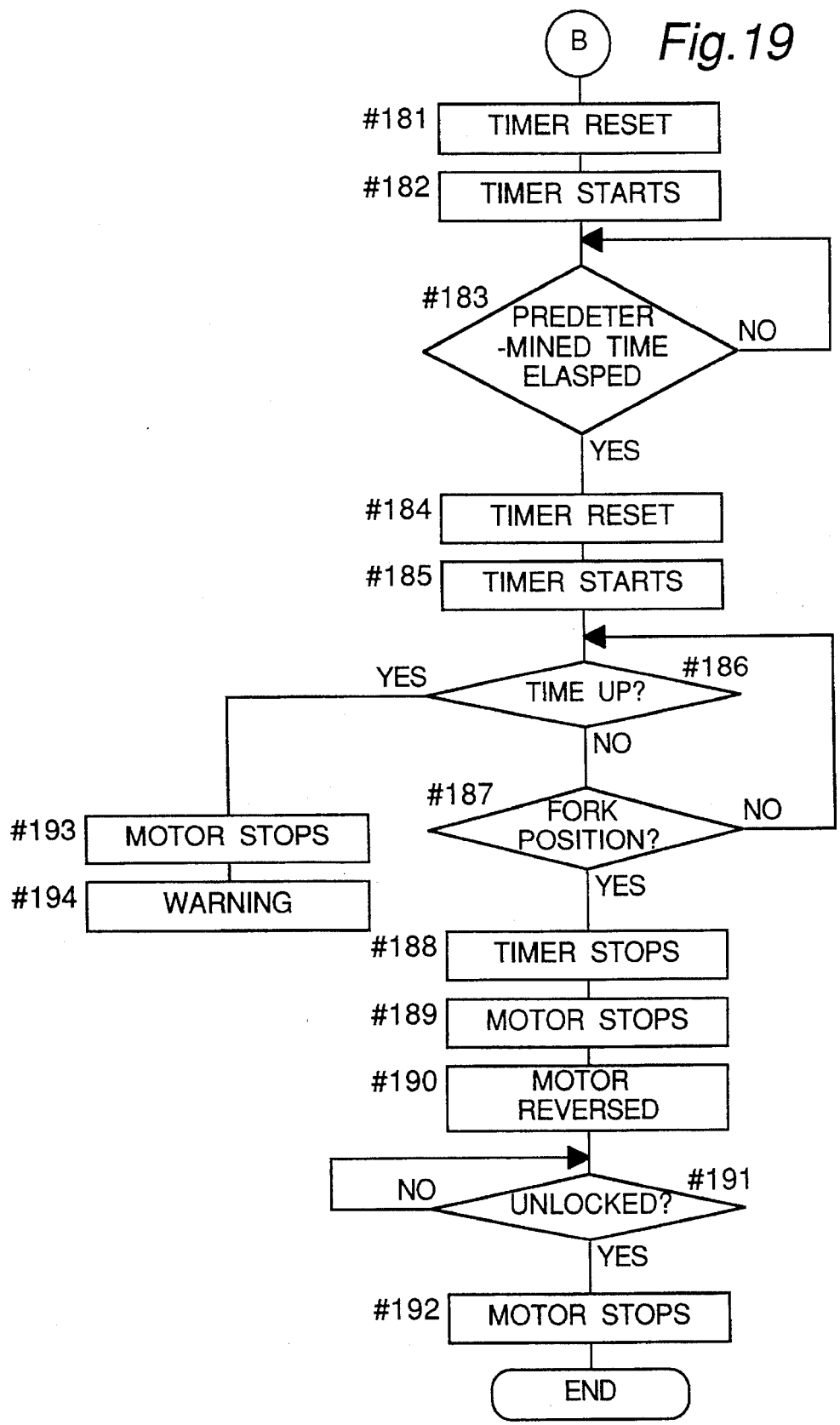

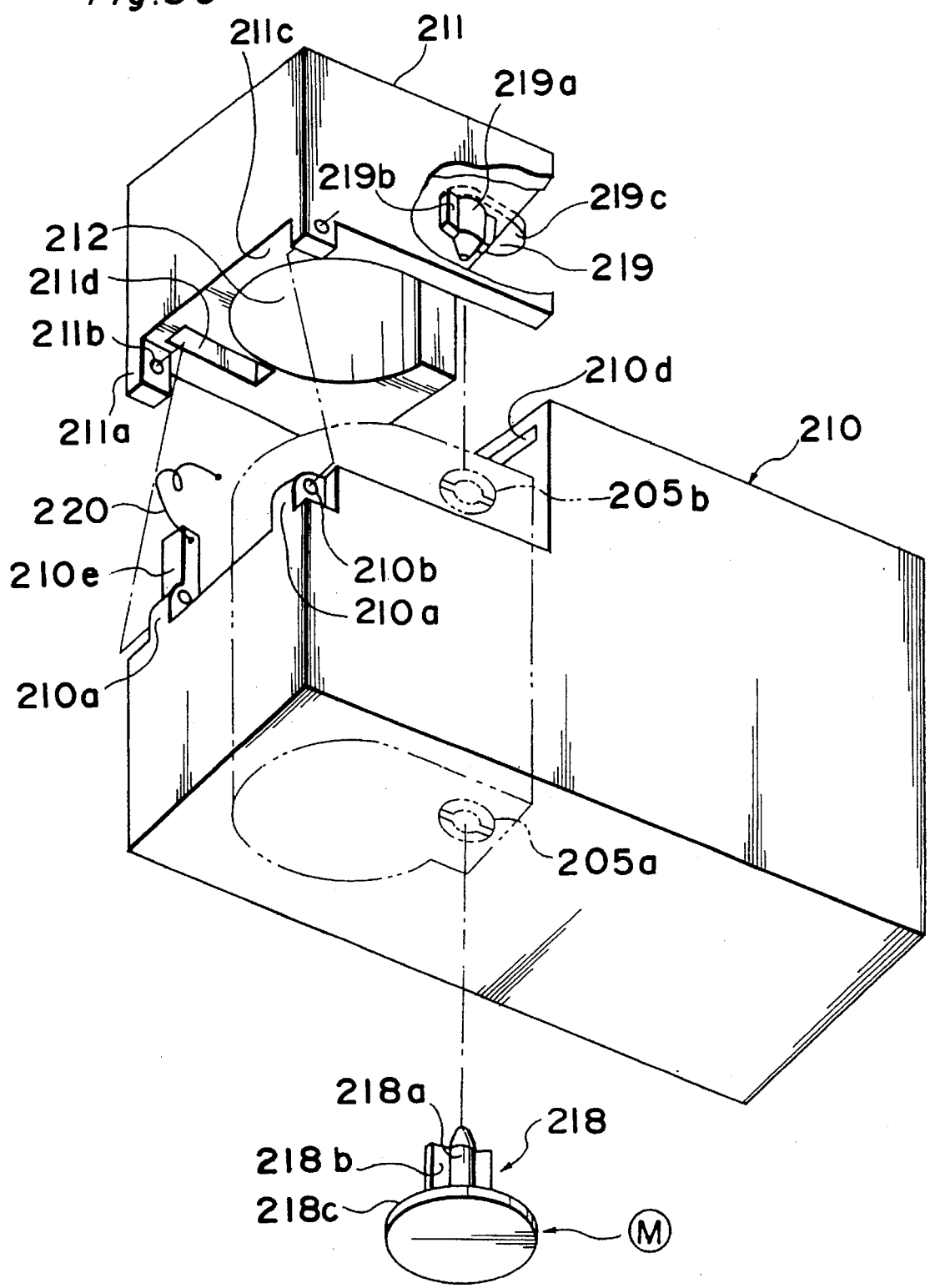

MECHANISM FOR LOCKING CARTRIDGE COMPARTMENT COVER OF CAMERA

This application is a continuation of application Ser. No. 08/244,656, filed Apr. 6, 1994, now abandoned.

BACKGROUND OF THE INVENTION

1. Field of the Invention

The present invention generally relates to an apparatus such as a camera, particularly relates to a camera employing a thrust-type of a cartridge, and more particularly relates to a mechanism, for locking a cover of a cartridge compartment of the camera, which prevents the cover from being opened when the camera is loaded with the cartridge, so that a film thereof is prevented from being exposed to light carelessly.

2. Description of the Related Arts

Conventionally, there have been provided various types of locking mechanisms for locking a cover of a film cartridge compartment in order to prevent the cover from unlocking carelessly, as shown in Japanese Laid-Open Patent (Unexamined) Publication Nos. 55-46732 and 54-128732.

According to the invention disclosed in the former Publication, the locking mechanism has a construction in which the spool for winding the film has a small diametric part and in which a lever is mounted in such a way that the lever is biased so that the small diametric part of the spool is pushed by the tip of the lever. With this construction, when the film is wound around the spool through the tip of the lever and the small diametric part of the spool, the lever tilts and the mechanism for opening and closing the cover is locked, moving with the lever.

On the other hand, according to the locking mechanism disclosed in the latter Publication, there is provided a sensor or the like, and the mechanism for opening and closing the cover is locked by employing a magnet or the like when the film is detected by the sensor.

The former locking mechanism, however, has a disadvantage that the cover may not be locked certainly, especially if the film does not have a uniform flexural strength, because as the film is wound around the spool, the film is pressed towards the outer surface of the small diametric part of the spool by the tip of the lever, thus letting the film bend. In addition, the former locking mechanism has another disadvantage that the film may get scratches on it or the frame set ready for picture taking is hard to get enough flatness because the film is pressed by the lever. On the other hand, because the latter locking mechanism employs an actuator like a magnet in exclusive use for it in order to lock the cover, such problems as a high cost of production and the camera becoming large-sized occur.

In a film cartridge of 135-type used conventionally, a leading end of the film is outside the film cartridge when the film is not used, and the leading end thereof is pulled out of the cartridge in winding the film around the cartridge spool.

This type of film cartridge has, however, such problems as it is not easy for a user to set the film cartridge inside the camera, and some load is necessarily exerted on the film during its movement because the film is prevented from being exposed to light by brush, sandwiching the film, mounted in the vicinity of the film entrance/exit of the film cartridge.

In order to secure the film cartridge in the cartridge compartment, the film cartridge is kept in the cartridge compartment with an outer wall of the film cartridge pressed against a wall of the cartridge compartment, as disclosed in Japanese Laid-Open Patent Publication No. 3-135536 and so on. That is, because the film is pressed by the inner wall of the outer shell of the film cartridge case, not only the film is hard to get enough flatness, but also a larger amount of driving force to feed the film is needed. In addition, unless the outer shell of the film cartridge is pressed firmly against the wall of the cartridge compartment, a rotational center of the cartridge spool may become out of position with respect to the camera body while the film is fed. At this moment, a load in feeding film may increase due to a drift or deviation of the film with respect to the position of the entrance/exit of the film cartridge in the vertical direction. Furthermore, if it happens that the position of the cartridge spool itself changes, the load in feeding film may also increase due to a frictional change in rotation. In order to solve this problem, a thrust-type of cartridge as disclosed in Japanese Laid-Open Patent Publication No. 2-181141 and a camera as disclosed in Japanese Laid-Open Patent Publication No. 4-1621 employing this type of cartridge have been proposed.

The thrust-type of cartridge is constructed so that the film thereof is wound up to the tip of the leader inside the film case when the cartridge is not set inside a camera and that the film is thrust and fed out of the film cartridge by a mechanism, for feeding the film, provided on the side of the camera when the cartridge is set inside the camera, and the film fed therefrom is wound around the spool of the camera. If the camera is of the type in use for the thrust-type of cartridge, it is possible to make the cartridge compartment cover relatively smaller and to provide this on either the upper or lower surface of the camera body because of being able to put the cartridge in and out the cartridge compartment in an axial direction of the spool. In case of using this type of camera, if the user opens the cartridge compartment cover and tries to take the film cartridge out of the cartridge compartment by force when the film is fed out of the cartridge, not only the film is exposed to light, but also there may arise such a possibility as the film tears and any torn pieces of the film remain inside the camera. If this happens, since the cartridge compartment cover is small, it is difficult for the user to remove the remains of film from the cartridge compartment, and it may be necessary to repair the camera.

Furthermore, as shown in Japanese Laid-Open (Unexamined) Patent Publication No. 3-267933, there has been proposed a cartridge, of the same thrust-type of cartridge, being constructed so that a member having an index or an indicator on it is integrally mounted to the cartridge spool and rotates together with it, that marks of "EXPOSED", "UNEXPOSED" or the like to display how the film is used are shown on the cartridge case, and that the indicator points to either of these displaying marks, depending upon the state thereof, by controlling the stopping position of the cartridge spool at the time of rewinding the film. In case of using this type of cartridge, if the cartridge is taken out of the camera before the positioning of the indicator with respect to a predetermined displaying mark is completed, the indicator points to a wrong display mark. In order to prevent this wrong indication of mark, it is preferable to prevent the cartridge compartment cover from being opened unnecessarily.

Meanwhile, a film cartridge as disclosed in Japanese Laid-Open Patent Publication Nos. 63-305350 and 1-191837 has a light-intercepting member or door, which can be opened and closed, provided in the film entrance/exit. In a type of camera employing this type of film cartridge having the light-intercepting door is provided a mechanism by which the door is opened before feeding the film after the film cartridge is set inside the cartridge compartment and by which the door is closed before taking the cartridge out of the compartment after the rewinding of the film is completed. With this construction, however, there is a possibility that the light-intercepting door thereof may open before the cartridge compartment cover is completely closed, and if this happens, the film is exposed to light carelessly. For example, the light-intercepting door disclosed in the Publication No. 63-305350 is pivotally mounted in the cassette case, and the door is biased in such a direction that the film exit is closed. In the cassette case, a side wall of the film entrance/exit has a hole formed therein, and a pin for pressing the door is slidably mounted in the hole so as not to be dropped off so that the pin presses the door to open, the film entrance/exit. On the other hand, in an opening and closing door of the camera is formed a projection to press and move the pin into the cassette case. Namely, when the pin is pushed in the cassette case by the projection of the opening and closing door, the light-intercepting door is opened. The light-intercepting door starts to open when the projection of the opening and closing door starts to press the pin; therefore, if the light-intercepting door starts to open before the opening and closing door is completely closed, the film may be exposed to light carelessly. That is, because the mechanism to open and close the light-intercepting door operates after the camera is loaded with the film cartridge and before the cartridge is taken out of the camera, the mechanism to open and close the door can be constructed so that it works with the locking and unlocking of the cartridge compartment cover through a linkage. However, in case that the linkage is provided in a camera, it is difficult to make a camera small-sized, because the mechanism to open and close the light-intercepting door is, generally, disposed opposite the mechanism to lock the cartridge compartment cover of the camera.

SUMMARY OF THE INVENTION

It is an object of the present invention to provide a locking mechanism, for locking a film cartridge compartment cover of an apparatus, such as a camera, employing a thrust-type of a film cartridge, by which not only the cover is surely prevented from being opened when the film is fed out of the film cartridge, but also the camera's becoming large-sized and high cost of production are surely prevented.

It is another object of the present invention to provide a locking mechanism which realizes the above object and which, if the film cartridge is of a type having a light-intercepting door at the film entrance/exit, realizes that it works with a mechanism for opening and closing the light-intercepting door without any complex linkage.

In accomplishing these and other objects of the present invention, there is provided a locking-mechanism for locking a cover for opening/closing a cartridge compartment in which a film cartridge is accommodated comprising: a lock mechanism selectively having a locking state that the cover is prevented from being opened and an unlocking state that the cover can be opened; a film feeding mechanism for feeding a film in and out the film cartridge; a driving mechanism for driving the film feeding mechanism; and an actuating mechanism, driven by the driving mechanism, for switching the lock mechanism between the locking state and the unlocking state.

With this construction, the locking-mechanism is constructed so that the actuating mechanism is controlled by the operations of the film feeding mechanism and the driving mechanism in such a way that the compartment cover is prevented from being opened as the film feeding mechanism feeds the film out of the film cartridge and that the compartment cover is allowed to be opened as the film is rewound inside the film cartridge by the film feeding mechanism, by which construction it is surely prevented that the film of the cartridge is exposed to light carelessly by mishandling the compartment cover when the film is outside the film cartridge with the film cartridge being inside the compartment. Furthermore, with this construction, because the actuating mechanism is actuated by the driving force of the driving mechanism, there is no need of a particular actuator such as employing a magnet, thus making the locking-mechanism compact and preventing high cost of production.

Preferably, the cartridge compartment has a detecting mechanism for detecting an opening/closing of the cover; and when the detecting mechanism detects that the cover closes with the film cartridge being accommodated inside the cartridge compartment, the driving mechanism operates so that the lock mechanism has the locking state.

According to this construction, if the detecting mechanism detects that the compartment cover is opened, the driving mechanism is not operated, thus preventing the timing that the film is exposed to light when the cover is opened.

In case that the cover-locking mechanism is provided in an apparatus in which a type of a film cartridge having a spool with which an indicator to provide an exposed/unexposed indication to the film rotates is used, the cover-locking mechanism can be constructed such that the film feeding mechanism has a fork which engages the spool of the film cartridge with which the indicator to provide the exposed/unexposed indication to the film rotates, and a rotation detecting mechanism for detecting a rotational amount of the spool, wherein an operation of the driving mechanism is stopped when the rotation detecting mechanism detects that the spool rotates by a predetermined amount of rotation after the film is rewound up to a tip thereof inside the film cartridge with the film being exposed to light completely or partially.

According to this construction, the compartment cover can be opened only after the positioning of the cartridge spool to display whether the film is used completely or partially is performed. If the cartridge is taken out of the film compartment before the positioning of the cartridge spool is performed, wrong indication to the film may be displayed on the side of the cartridge, which may cause such a problem as the user of the cartridge expose a once-exposed film to light once again.

The locking-mechanism according to the present invention can be constructed as follows. That is, the mechanism comprises: a locking member movable between a locking position at which the cartridge compartment cover is prevented from being opened and an unlocking position at which the cover can be opened; a first control member which is disposed, in a system for transmitting a force of a motor, between the motor and a fork for driving a cartridge spool of the film cartridge and which has an input gear driven by the motor; a second control member which is disposed between the fork and the first control member and which has an output gear; means for transmitting a rotation which connects the first and second control members so as to allow them to rotate relatively within a predetermined range of relative rotation thereof and which transmits a rotation of the first control member to the second control member with the first and second control members being at both extremities of the predetermined range of relative rotation thereof; cam means which at least one of the first or second control means has; and a cam follower which follows the cam means so that the cam follower moves the locking member to the locking position when the first and second control members are at both extremities of the predetermined range of relative rotation thereof and that the cam follower moves the locking member to the unlocking position when the first and second control members are within the extremities of the predetermined range of relative rotation thereof.

According to this construction, after the film compartment is loaded with the film cartridge and the motor starts rotating to feed the film out of the cartridge, the locking member is switched to the locking position, because at the time of winding or rewinding the film of the cartridge, the motor rotates only in one rotational direction which keeps both control members at either of the extremities of the predetermined range of relative rotation thereof with the cam follower following the cam means so as to make the locking member have the locking position. Meanwhile, after the film is rewound inside the film cartridge, the motor is controlled so as to position both control members within the extremities of the predetermined range of relative rotation thereof, so that the locking member is switched from the locking position to the unlocking position and the compartment cover can be opened.

With this construction, the compartment cover is surely prevented from being opened except any time when it is necessary to open the cover, thus preventing the film to be exposed to light carelessly when the film is outside the cartridge in the film compartment.

In case that the cover-locking mechanism is provided in an apparatus in which a type of a film cartridge having a light-intercepting door at an entrance/exit of the film thereof is used, the cover-locking mechanism can be constructed such that the mechanism comprises: a locking member movable between a locking position at which the cover is kept closed and an unlocking position at which the cover can be opened; and driving means for driving the light-intercepting door which interlocks with the locking member so as to open the door when the locking member is moved from the unlocking position to the locking position.

According to this construction, because the driving means for driving the light-intercepting door works with the locking member so that the light-intercepting door is opened when the locking member is moved from the unlocking position to the locking position and that the door is closed when the locking member is moved from the locking position to the unlocking position, the light-intercepting door is prevented from being opened when the compartment cover is opened, thus preventing the film from being exposed to light carelessly. In addition, because the driving means for the light-intercepting door is interlocked with the locking member, there is no need to provide separate power sources to drive them separately, thus making the mechanism compact and simple.

Preferably, the driving means has a safety mechanism for preventing a larger amount of driving force than a predetermined amount thereof from being transmitted to the light-intercepting door. The safety mechanism, for example, can comprise a pair of members movable with respect to each other and a biasing mechanism for biasing the pair of members to a predetermined relative position, or it can comprise a clutch disposed in a system for transmitting the driving force. And if the safety system comprises the clutch, it may comprise a pair of shafts disposed coaxially and a spring which connects the pair of shafts.

Preferably, the cover-locking mechanism has a detecting means for detecting an opening/closing of the light-intercepting door; and a locking control mechanism which switches the lock mechanism from the locking state to the unlocking state when the detecting means detects that the door is closed and which switches the lock mechanism from the unlocking state to the locking state when the detecting means detects that the door is opened.

The locking-mechanism according to the present invention can be constructed as follows. That is, the mechanism comprises: a lock mechanism selectively having a locking state that the cartridge compartment cover is prevented from being opened and an unlocking state that the cover can be opened; a cartridge-spool driving mechanism for driving the spool of the cartridge with engaging with the spool thereof; an opening/closing mechanism for opening/closing the light-intercepting door; and a lock control mechanism which switches the lock mechanism from the locking state to the unlocking state by a driving force of the opening/closing mechanism after driving the spool at a predetermined position to display an exposed/unexposed indication to the film by the cartridge-spool driving mechanism.

According to this construction, it is only after providing an exposed/unexposed indication to a film that the lock mechanism is switched from the locking state to the unlocking state in which the compartment cover can be opened; therefore, wrong indication to the film is surely prevented. Furthermore, because the lock mechanism is driven by the driving force of the opening/closing mechanism for opening/closing the light-intercepting door, it is not necessary to provide any particular actuators to drive the lock mechanism and the opening/closing mechanism separately, thus simplifying the mechanism.

BRIEF DESCRIPTION OF THE DRAWINGS

These and other objects and features of the present invention will become clear from the following description taken in conjunction with the preferred embodiments thereof with reference to the accompanying drawings, in which:

FIG. 9 is a block diagram showing a schematic construction of a circuit for controlling the cover-locking mechanism;

FIG. 19 is a flowchart showing the operation of rewinding the film;

FIG. 30 is a perspective view showing a cover-locking mechanism according to a fourth embodiment of the present invention;

DETAILED DESCRIPTION OF THE INVENTION

Figure 1:
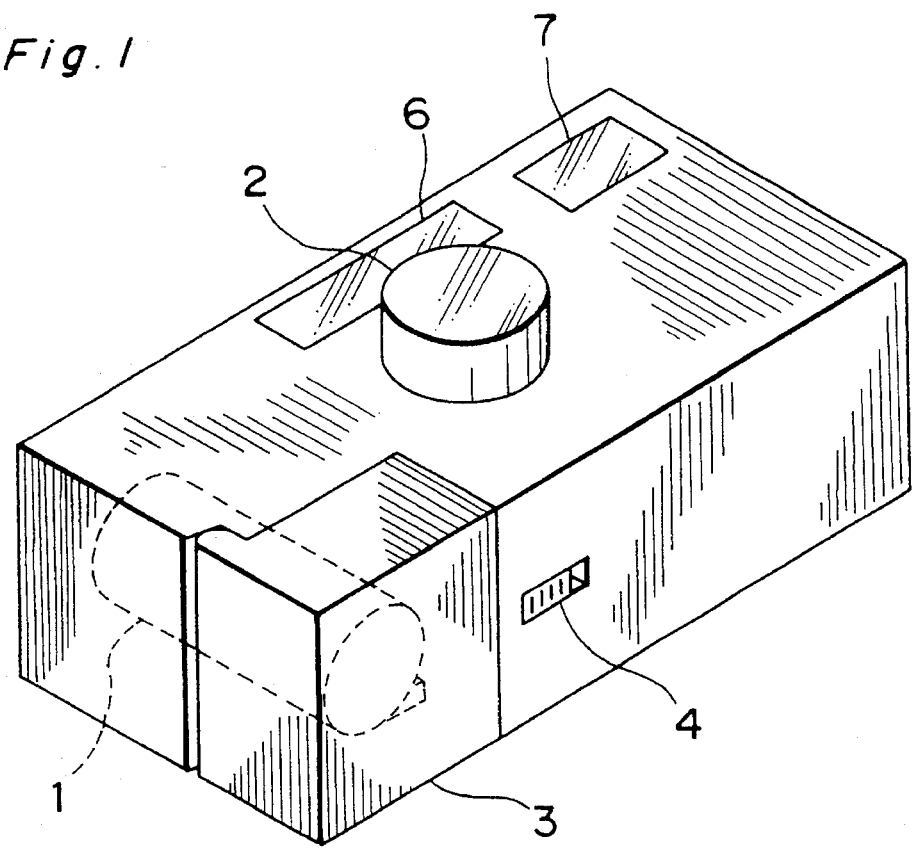
FIG. 1 is a perspective view showing a camera having a cover-locking mechanism for locking a cover of a cartridge compartment according to a first embodiment.

Before the description of the present invention proceeds, it is to be noted that like parts are designated by like reference numerals throughout the accompanying drawings.

First, a camera having a mechanism for locking a cartridge compartment cover, or a camera having a cover-locking mechanism, according to a first embodiment of the present invention is described below with reference to FIGS. 1 through 10.

A film cartridge 1 used in this camera is a thrusttype of cartridge being constructed so that the film thereof is wound up to the tip of the leader inside the film case when the cartridge is not set inside the camera and that the film is thrust and fed out of the film cartridge by a mechanism, for feeding the film, provided in the camera when the cartridge is set inside the camera, and the film fed therefrom is wound around a spool of the camera. In order to display if frames of the film are all unexposed, all exposed or partly exposed to light when the film cartridge is taken out of the camera, three displaying marks corresponding to the "all unexposed", "all exposed" and "partly exposed" are shown on a case of the film cartridge 1 while a member having an indicator on it is mounted in a spool of the film cartridge 1, though not shown in the figure. With this construction, it is made possible that the indicator of the spool points to either of the three displaying marks by controlling the stopping position of the cartridge spool by a mechanism for feeding the film at the time of rewinding the film.

Figure 2:
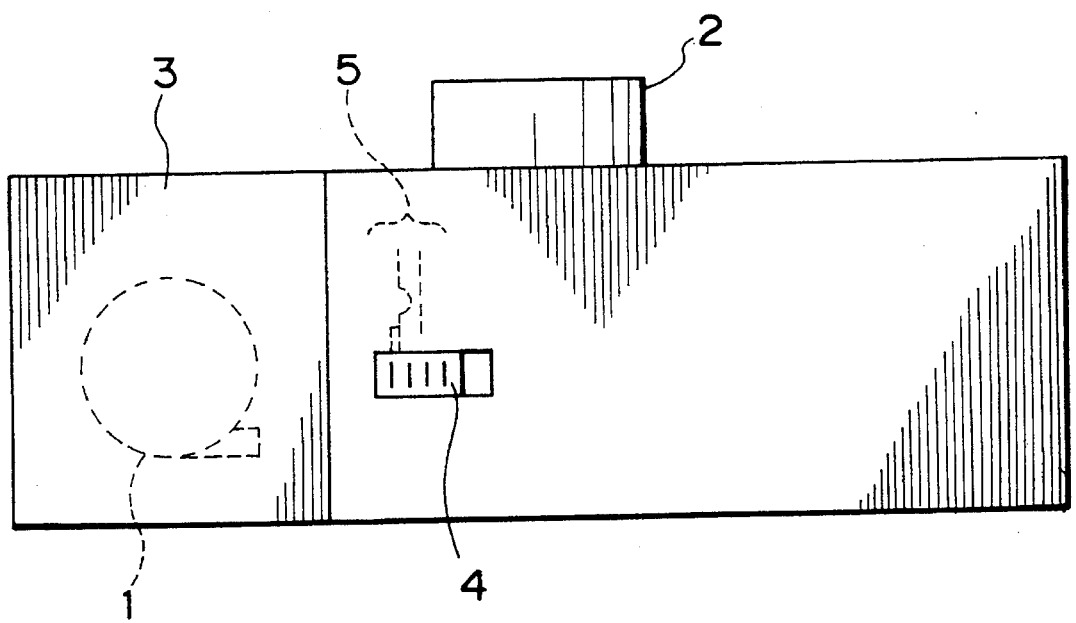
FIG. 2 is a bottom view showing the bottom of the camera.

FIG. 1 is a perspective view of the camera, and FIG. 2 is a bottom view of the camera shown in FIG. 1. The camera has a cartridge compartment cover 3 at a part of a left, lower corner of the camera body with respect to the front view thereof, and the film cartridge 1 is put in and out in an axial direction of the cartridge spool relative to a cartridge compartment positioned corresponding to the cover 3. This cover 3 is kept closed when an opening and closing lever 4, provided as an actuating member near the cover 3, for opening and closing the cover 3 is set in a position (a first position) as shown in the figure, while the cover 3 can be opened when the lever 4 is slided to a predetermined position (a second position) right of the first position. When moving the lever 4 to the second position, a left contact, as shown in FIG. 2, provided in a detection switch 5 for detecting the operation of the lever 4, is pushed to a right contact of the detection switch 5. As a result, an electric signal is generated, and this signal is used to control the operation of the camera. In the figures, a reference numeral 6 indicates a finder and a photometric/focusing unit, and a numeral 7 indicates a flash.

The cover-locking mechanism according to this first embodiment controls the opening and closing of the cover 3 by working with the film-feeding mechanism. Referring to FIGS. 3 through 7, the film-feeding mechanism is described below.

Figure 3:
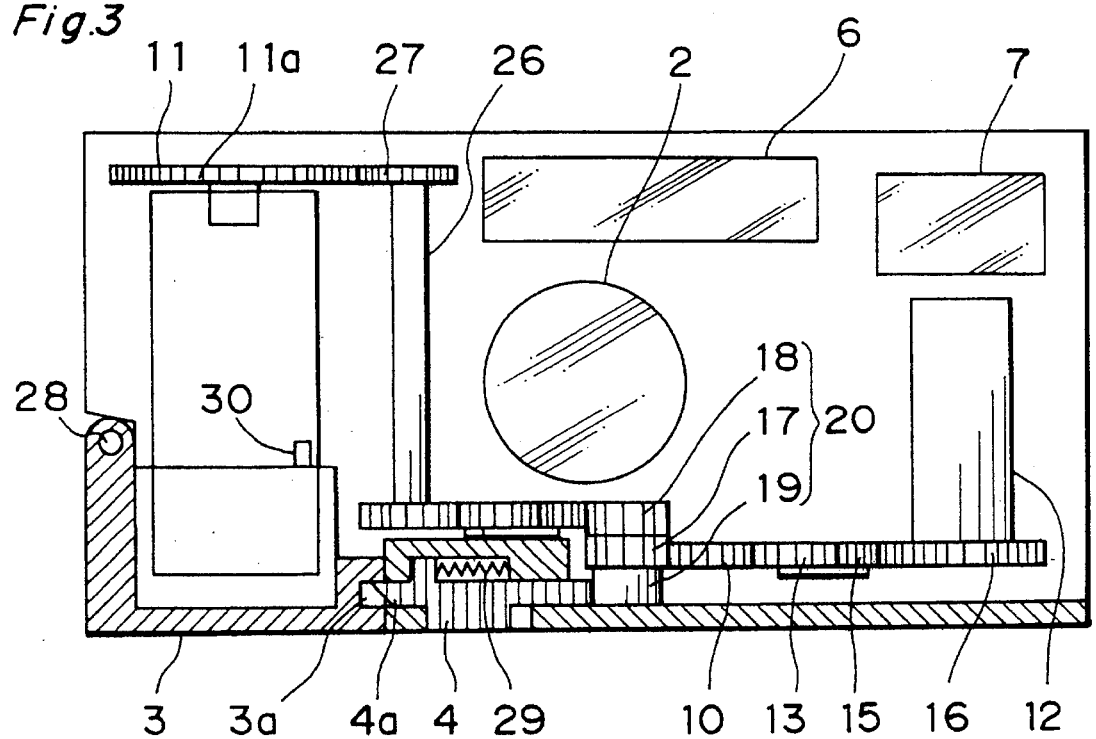
FIG. 3 is a sectional view showing the cover-locking mechanism with the cover closed.
Figure 4:
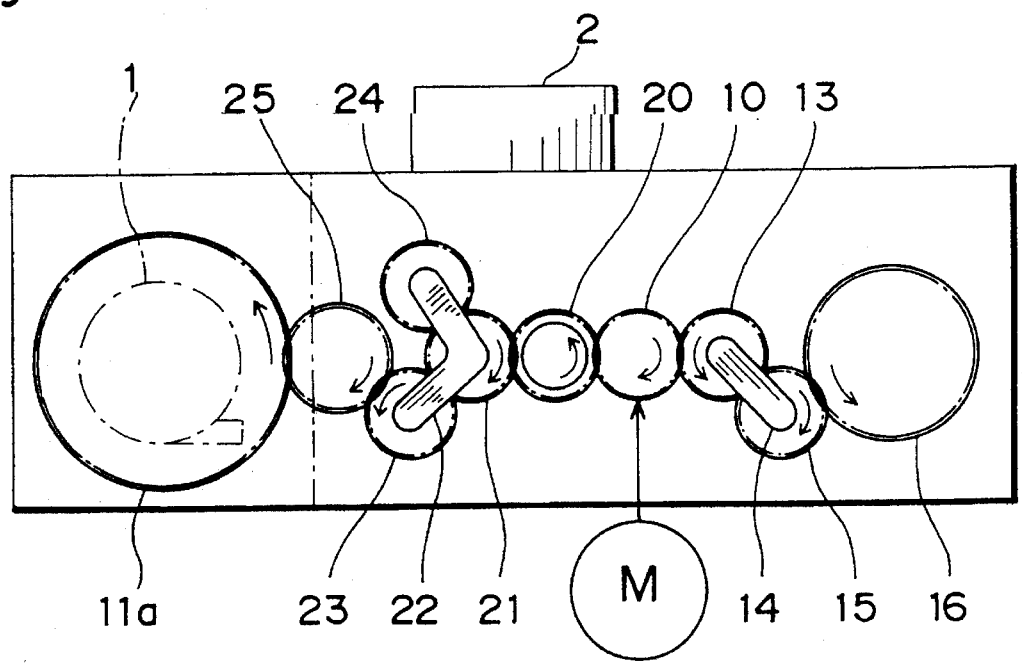
FIG. 4 is a bottom view showing a film-feeding mechanism, in winding a film of a cartridge, provided in the camera.
Figure 5:
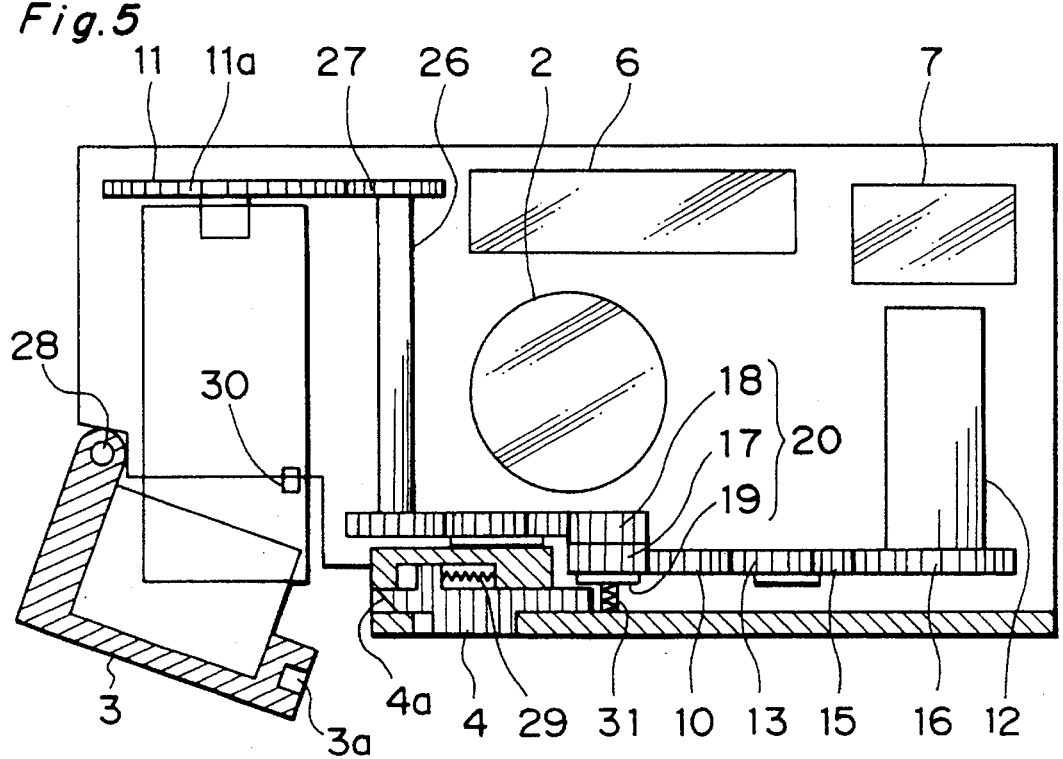
FIG. 5 is a sectional view showing the cover-locking mechanism with the cover opened.
Figure 6:
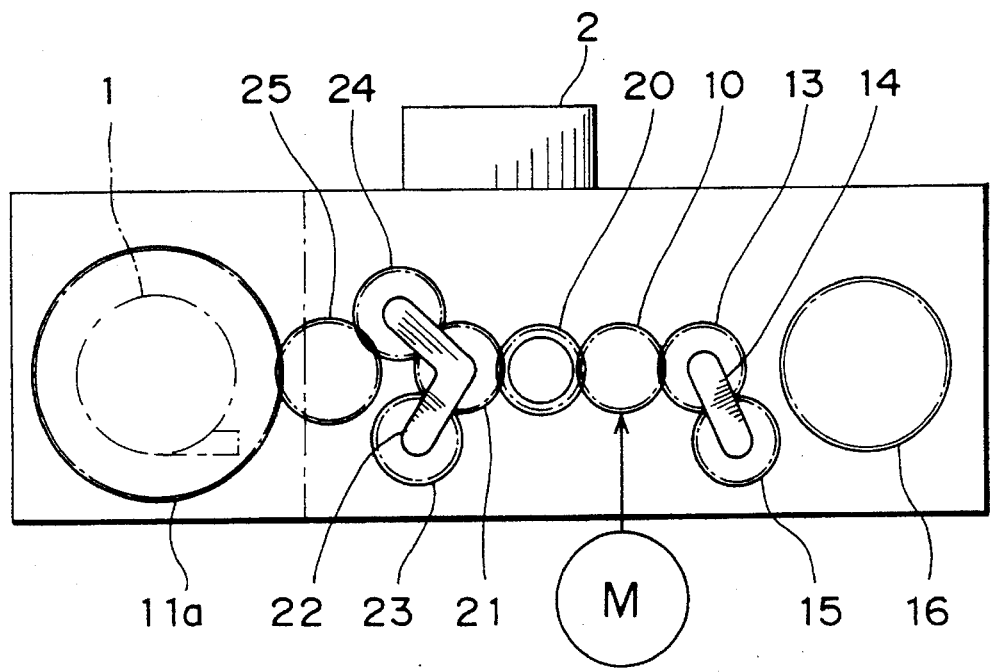
FIG. 6 is a bottom view showing the film-feeding mechanism in rewinding the film.

FIG. 3 is a sectional view showing the cover-locking mechanism with the cover 3 closed. FIG. 4 is a bottom view showing a film-feeding mechanism in winding the film. FIG. 5 is a sectional view showing the film-feeding mechanism and the cover-locking mechanism with the cover unlocked. FIG. 6 is a bottom view showing the film-feeding mechanism in rewinding the film.

The film-feeding mechanism comprises a motor (M); and a gear train for transmitting the rotation of the motor (M) to a fork 11 engaging a cartridge spool and to a film-winding spool shaft 12. The rotation of the motor (M) is transmitted to a gear 10 of the gear train and then transmitted to the fork 11 and the spool shaft 12.

On the side of the spool shaft 12, a sun gear 13 engages the gear 10 from the right side in the figure. The sun gear 13 supports a planetary carrier 14 pivotally on the shaft (not shown) of the sun gear 13. The planetary carrier 14 supports a planetary gear 15 engaging the sun gear 13 via a friction transmission mechanism. Depending upon the rotational direction of the sun gear 13, the planetary gear 15 takes a position at which the planetary gear 15 engages a spool gear 16 rotating together with the spool shaft 12 and a position at which the planetary gear 15 moves away from the spool gear 16. A stopper not shown provided in the camera body determines the pivotal range of the planetary carrier 14 when the planetary gear 15 pivots in the direction in which the planetary gear 15 moves away from the spool gear 16.

Referring to FIG. 3, a gear 17 a ( a first control member) engages the gear 10 from the left side in the figure. A gear 18 (a second control member) rotatable relative to the gear 17 in a predetermined range is provided coaxially with the gear 17. The film-feeding mechanism further comprises a locking member 19 movable in the coaxial direction of the gears 17 and 18. A locking gear 20 is composed of the gears 17 and 18 and the locking member 19. When the gear 17 rotates beyond the above movable range, the gear 18 rotates, thus transmitting the rotation of the motor (M) to a sun gear 21. That is, the gear 17 serves as an input gear of the locking gear 20 while the gear 18 serves as an output gear thereof.

An L-shaped planetary carrier 22 is pivotally supported on the shaft (not shown) of the sun gear 21. The planetary carrier 22 supports planetary gears 23 and 24 engaging the sun gear 21 via a friction transmission mechanism. Depending upon the rotational direction of the sun gear 21, either the planetary gear 23 or the planetary gear 24 engages a gear 25. The gear 25 is fixed to the lower end of a shaft 26 extending vertically in the camera body, and a gear 27 engaging a fork gear 11a integrated with the fork 11 is fixed to the upper end of the shaft 25.

As shown in FIGS. 3 and 5, the cover 3 of the cartridge compartment is pivotally supported by a shaft 28 provided in the camera body. The cover 3 has a locking concave 3a, and the lever 4 has a locking end 4a which removably engages the locking concave 3a. The lever 4 is biased by a spring 29 in such a direction that the locking end 4a projects from a side wall of the opening portion of the cartridge compartment, i.e., the lever 4 is biased toward the left direction of FIG. 3. When the locking end 4a engages the concave 3a as a result of the closing of the cover 3, the cover 3 is kept closed in position. When the lever 4 is slid toward the right direction in FIG. 3, the locking end 4a disengages from the concave 3a, thus opening the cover 3. In order to detect the opening/closing of the cover 3, the cartridge compartment is provided with a detection switch 30 which moves when the cover 3 is opened and closed.

The movement of the lever 4 is controlled by the change of a relative position between the gears 17 and 18 working with the film-feeding mechanism. The construction and operation of the locking gear 20 are described in detail below with reference to FIGS. 7 and 8.

Figure 7:
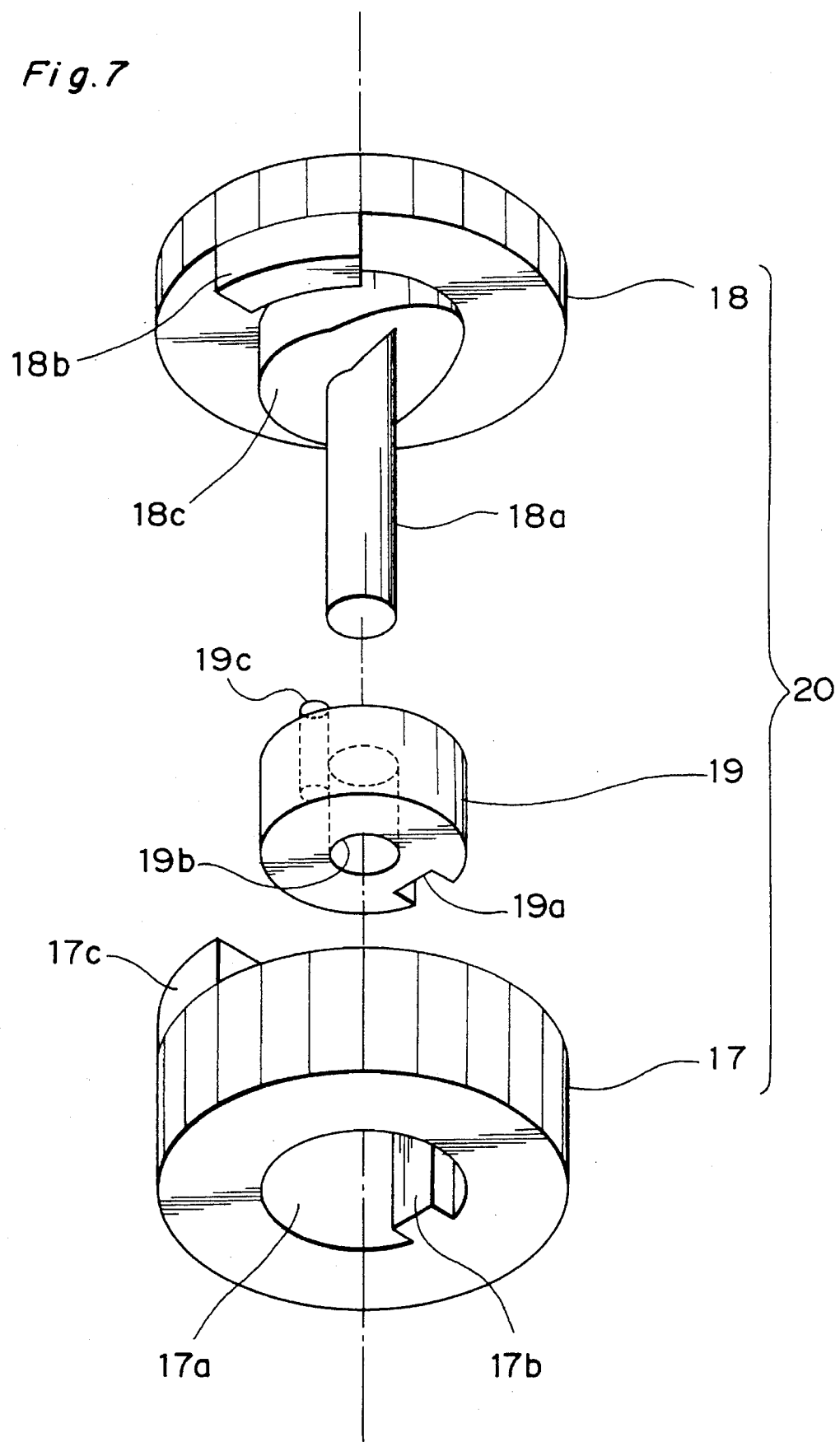
FIG. 7 is an exploded perspective view showing a locking gear.
Figure 8A:
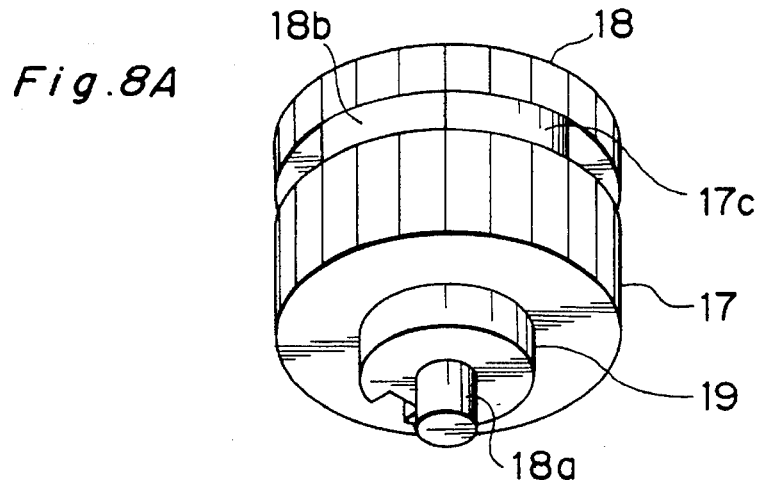
FIGS. 8A through 8C are perspective views each showing an operation of the locking gear.
Figure 8B:
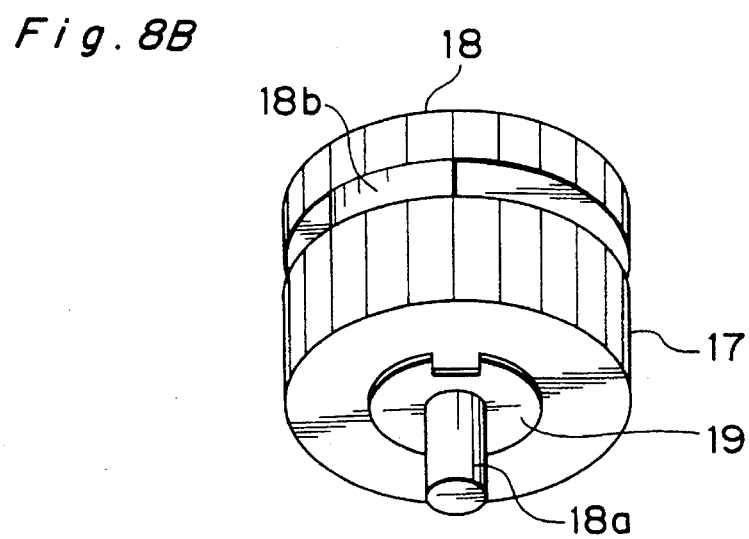
Figure 8C:
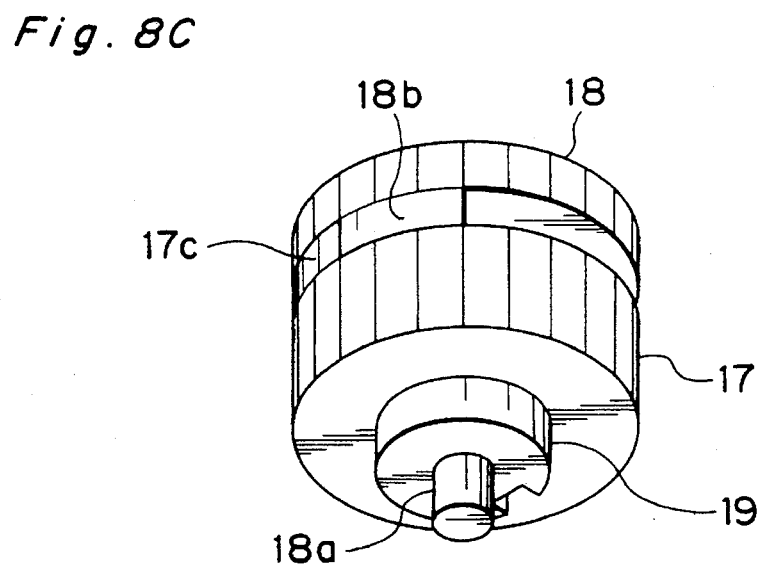

FIG. 7 is an exploded perspective view showing the locking gear 20. FIGS. 8A–8C show three different states of the locking gear 20. The input gear 17 has an approximately circular through-hole 17a in the center thereof. The locking member 19 is inserted into the through-hole 17a. The input gear 17 and the locking member 19 have a key-shaped projection 17b and a key way 19a, respectively. The projection 17b is inserted into the key way 19a so that the locking member 19 is allowed to move only in the axial direction of the input gear 17. The locking member 19 has a bearing hole 19b in the center thereof so that a shaft 18a integrated with the output gear 18 rotatably engages the bearing hole 19b.

The input gear 17 and the output gear 18 have projections (means for transmitting rotation) 17c formed upward and 18b formed downward, respectively, so that the input gear 17 and the output gear 18 are rotatable relative to each other only in a predetermined range in which the projections 17c and 18b are not brought into contact with each other. An inclined cam surface 18c is formed on the bottom surface of the output gear 18, and the locking member 19 has a pin 19c acting as a cam follower which moves along the cam surface 18c when the gears 17 and 18 rotate relative to each other. When the locking member 19 is installed on the camera body, the locking member 19 is biased upward by a spring 31 (shown in FIG. 5), thus bringing the pin 19c into contact with the cam surface 18c. The cam surface 18c is constructed so that when the projections 17c and 18b are brought into contact with each other at each of both extremities of the relative movable range of the projections 17c and 18b, the locking member 19 moves the most downward, while when the projections 17c and 18b are at the middle of the relative movable range, the locking member 19 moves the most upward to be wholly set inside the input gear 17.

The operation of the locking mechanism is briefly described below. When both gears 17 and 18 are in the middle of the relative movable range thereof as shown in FIG. 8B, only the input gear 17 rotates in the relative movable range, with the output gear 18 stationary, upon transmission of the rotation of the motor (M) to the input gear 17. This is because the cartridge spool engaging the fork 11 acts as a drive load on the output gear 18. As a result, the locking member 19 moves downward (See FIGS. 8A and 8C) due to the relative movement between the cam surface 18c and the pin 19c, because the locking member 19 rotates together with the input gear 17. Then, the locking member 19 moves to a position at which the locking member 19 prohibits the sliding movement of the lever 4, thus preventing the cover 3 from being opened or closed. While the upper end of the projection 17c and the lower end of the projection 18b are in contact with each other, the gears 17 and 18 rotate together, with the locking member 19 kept at the lowest position.

When the input gear 17 rotates in the opposite direction from the position shown in FIGS. 8A or 8C, the locking member 19 moves upward and is retracted inside the input gear 17 as shown in FIG. 8B. The locking gear 20 is set ready in this state before the cartridge 1 is put into the cartridge compartment, and the locking member 19 is not in a position at which it prohibits the sliding movement of the lever 4, thus allowing the cover 3 to be operated.

Referring to FIG. 9, a schematic construction of a circuit for controlling the cover-locking mechanism is described below. The circuit comprises a microcomputer CPU; a switch S1, shown by a reference numeral 5 in FIG. 2, for detecting the opening/closing of the lever 4; a switch S2, shown by a reference numeral 30 in FIGS. 3 and 5, for detecting the opening/closing of the cover 3; an encoder EN for detecting the position of the fork 11; a switch S3 for rewinding the film before all frames are exposed to light; a photo interrupter P1 for detecting the rotational amount of the film-feeding motor (M); a switch S4 for detecting whether the cartridge 1 has been put into the cartridge compartment; and a driver DR of the film-feeding motor (M). Upon reception of pulse signals corresponding to the number of rotations of the film-feeding motor (M) outputted from the photointerrupter P1, the CPU detects the rotational amount of the film-feeding motor (M).

Figure 10:
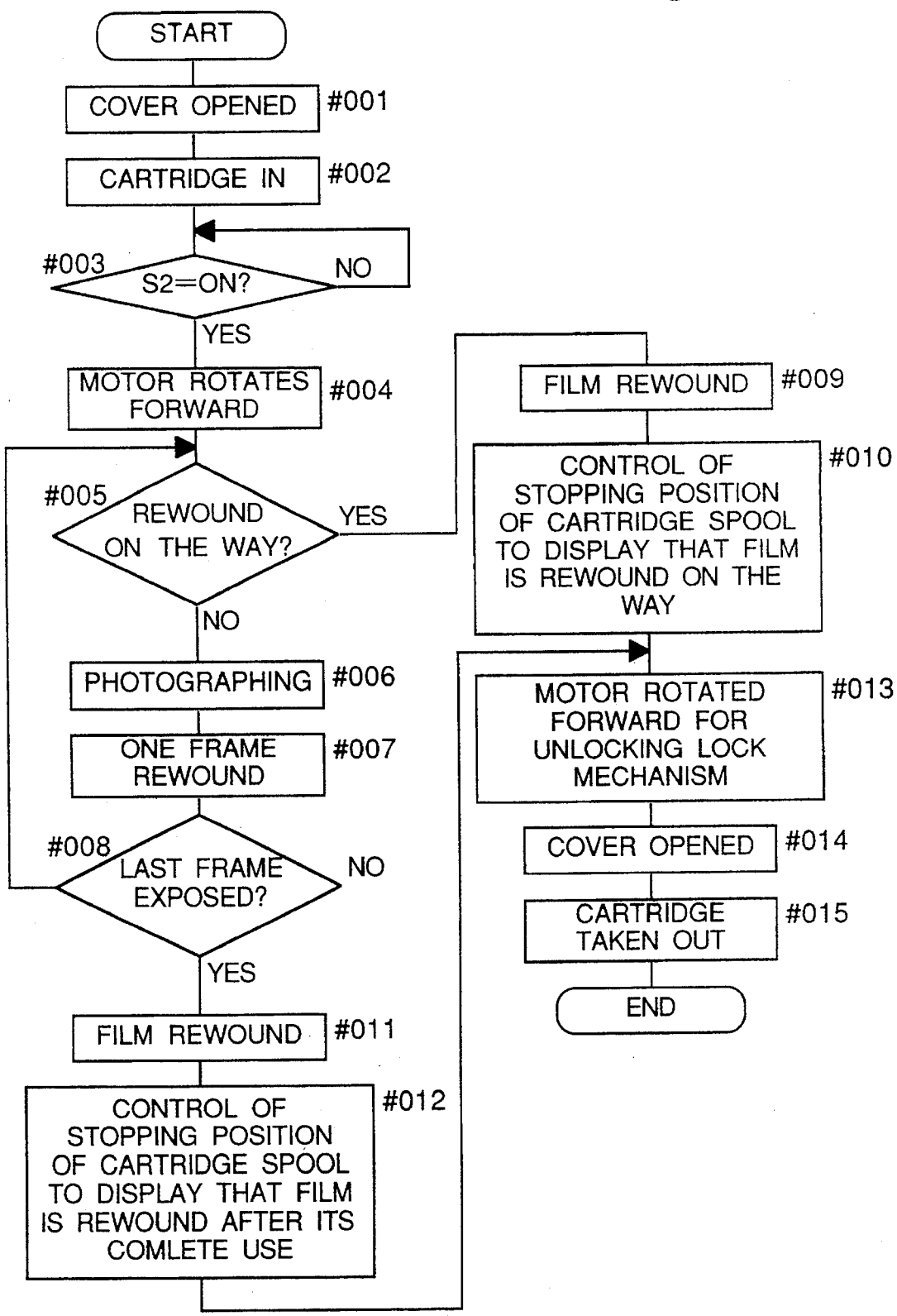
FIG. 10 is a flowchart showing principal operations of the camera.

The operation of the camera according to the first embodiment is described below with reference to the flowchart shown in FIG. 10. First, when the cover 3 is opened and the cartridge 1 is put in the cartridge compartment at step #001 and #002, the CPU waits at step #003 for the switch S2 being turned on; namely, it waits for the cover 3 being closed.

When it is decided that the cover 3 is closed, the motor (M) starts rotating forward at step #004. At this time, the gear rotates clockwise in FIG. 4. As a result, the locking member 19 moves downward from the input gear 17, thus preventing the operation of sliding the lever 4.

When the end surfaces of the projections 17c and 18b are brought into contact with each other due to a further rotation of the motor (M), the output gear 18 rotates together with the input gear 17. Consequently, the rotation of the motor (M) is transmitted to the cartridge spool via the output gear 18, the sun gear 21, the planetary gear 23, the gear 25, the gear 27, and the fork gear 11a. As a result, the spool rotates counterclockwise in FIG. 4, thus feeding out the film from the film cartridge 1 toward the film-winding spool shaft 12. The driving force of the motor (M) is transmitted to the fork gear 11a and the spool gear 16 in such a manner that the rotational speed of the former is lower than that of the latter. Thus, after the film is wound around the spool shaft 12, the film is pulled by the spool shaft 12. Hence, at this time, the rotational speed of the fork 11 is higher than that of the fork 11 when the fork 11 is driven by the motor (M). As a result, the gear 23 does not engage the gear 25, thus cutting off the transmission of the driving force of the motor (M).

It is decided at step #005 whether or not the switch S3 is operated. If not operated, photographing operation, namely, photometric operation, focusing and shutter control are performed when a release switch is operated. When one frame is exposed to light at step #006, the frame is wound at step #007. Then, it is decided at step #008 whether or not all the frames are exposed to light. If not, the program returns to step #005. In this manner, each time one frame is exposed to light, it is decided whether or not all the frames are exposed to light and it is decided whether or not the film-rewinding operation for rewinding the film on the way is performed before all the frames are exposed to light.

If it is decided at step #005 that the switch S3 is operated, the motor (M) is reversed at step #009 to start rewinding the film. After, the film is rewound into the cartridge case completely, at step #010, an output signal of the fork encoder EN is detected and the motor (M) is stopped when the stop position of the cartridge spool comes to a position corresponding to an indication of "PARTLY EXPOSED".

On the other hand, if it is decided at step #008 that all the frames are exposed to light, the motor. (M) is reversed at step #011 to start rewinding the film. In this case, after the film is rewound into the cartridge case completely, the output signal of the fork encoder EN is detected at step #012. Then, the motor (M) is stopped when the stop position of the cartridge spool comes to a position corresponding to an indication of "COMPLETELY EXPOSED".

After the stop position of the cartridge spool is controlled in this manner, at step #013, the motor (M) is rotated forward until the locking member 19 is retracted inside the input gear 17; i.e., the motor (M) is rotated until the projection 17C of the input gear 17 comes to a position opposite the projection 18b of the output gear 18 with respect to the shaft 18a. At this time, the fork 11 and the cartridge spool engaging the fork 11 act as a load on the output gear 18. Therefore, the output gear 18 does not rotate and the locking member 19 moves upward, thus permitting the operation of sliding the lever 4. Accordingly, at steps #014 and #015, the cover 3 is opened to take out the cartridge 1 from the cartridge compartment.

As described above, the lever 4 is prevented from being operated when the input gear 17 and the output gear 18 of the film-feeding mechanism are disposed at each of both extremities of the relative movable range; the lever 4 is allowed to be operated when the gears 17 and 18 are disposed within both extremities of the relative movable range; and the film feeding motor (M) is controlled so that the input gear 17 is disposed at each of both extremities of the relative movable range when the film is fed out of the cartridge 1. This mechanism enables the cover 3 to be locked without using a special actuator. Accordingly, the film can be prevented from being exposed to light carelessly. Further, the cartridge 1 can be prevented from being taken out of the cartridge compartment without displaying how the film of the film cartridge 1 is used by the user correctly.

A camera having a cover-locking mechanism according to a second embodiment of the present invention is described below with reference to FIGS. 11 through 22. Similarly to the first embodiment, the camera uses a thrust-type of a cartridge, and the cover-locking mechanism is interlocked with a film-feeding mechanism.

Figure 11:
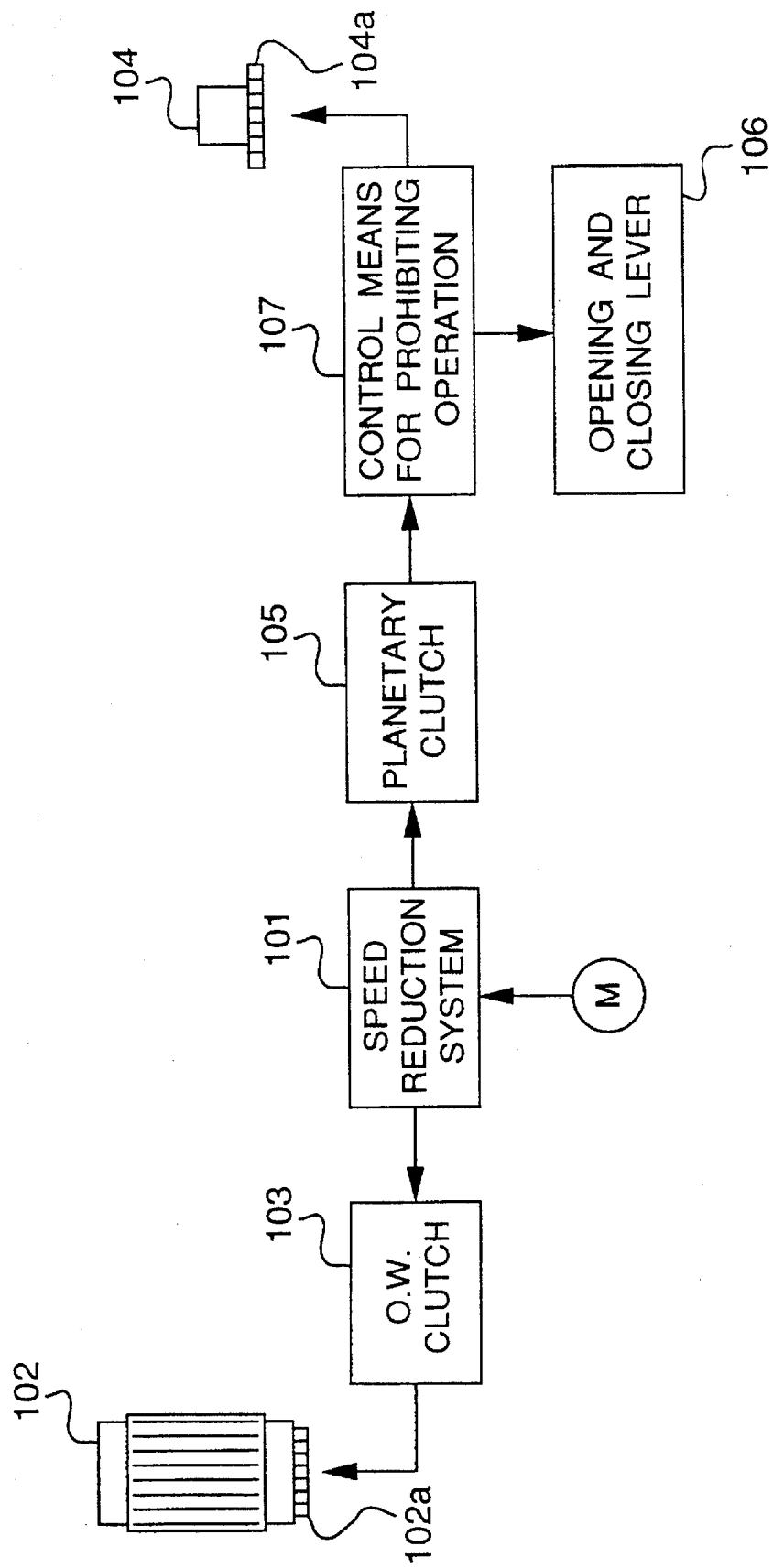
FIG. 11 is a block diagram showing a film-feeding system of a camera having a cover-locking mechanism according to a second embodiment of the present invention.

FIG. 11 is a block diagram showing the construction of the film-feeding system of the camera schematically. As shown in FIG. 11, the output of a film-feeding motor (M) is transmitted to a film-winding spool shaft 102 via a speed reduction system 101, a one way clutch 103, and a spool gear 102a. In this manner, the spool shaft 102 is rotated only in one direction. The output of the film-feeding motor (M) is transmitted to a fork 104 engaging a cartridge spool via a planetary clutch 105 and a control means 107 for preventing the operation of an opening/closing lever 106 when it is necessary to lock a cover. The fork 104 can be rotated in both ways in accordance with the rotational direction of the motor (M).

Figure 12:
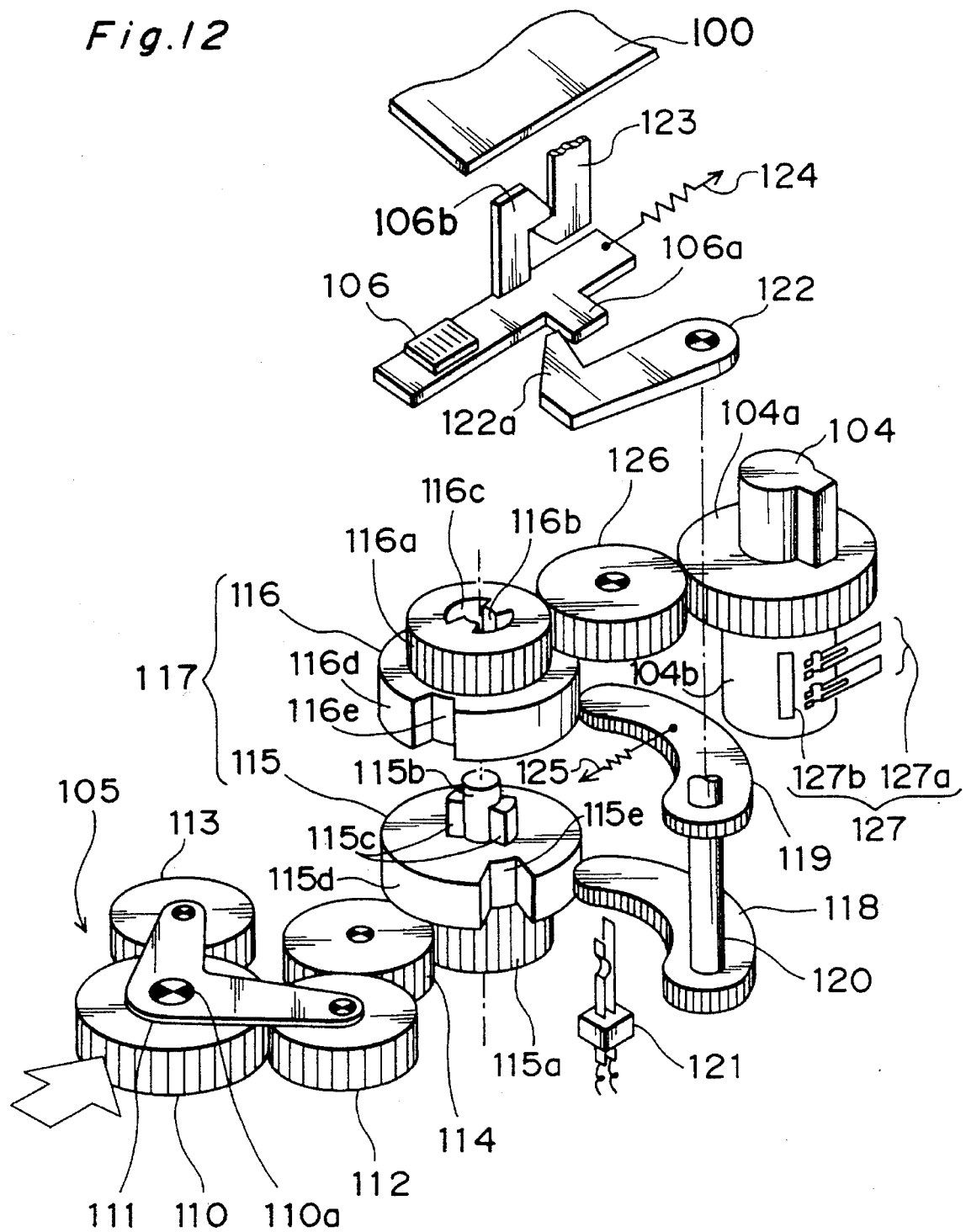
FIG. 12 is a perspective view showing main parts of the film-feeding system and the cover-locking mechanism.

FIG. 12 shows the detailed construction of the film-feeding system between the planetary clutch 105 and the fork 104. The planetary clutch 105 comprises a sun gear 110; an L-shaped planetary carrier 111 pivotally supported by a shaft 110a of the sun gear 110; planetary gears 112 and 113 held on each end of the planetary carrier 111 via a frictional transmission mechanism so that the planetary gears 112 and 113 engage the sun gear 110; and a gear 114 engaging either the planetary gear 112 or the planetary gear 113 in accordance with the rotational direction of the sun gear 110.

An input gear 115a formed on a first control member 115 engages the gear 114. A locking gear 117 (corresponding to the control means 107 shown in FIG. 11) is comprised of the first control member 115 and a second control member 116 having an output gear 116a. The first control member 115 and the second control member 116 rotate relative to each other in a predetermined range. That is, the first control member 115 has a shaft 115b inserted into a bearing hole 116b of the second control member 116; key-shaped projections 115c opposed to each other with respect to a center of the shaft 115b are formed thereon; and a groove 116c is formed around a part of the bearing hole 116b so that the projections 115c are rotatable with respect to the output gear 116a in a predetermined range. Disc-shaped control portions 115d and 116d are formed on each of the first control member 115 and the second control member 116. Control grooves (cam means) 115e and 116e are formed on each of the control portions 115d and 116d in such a manner that the control grooves (cam means) 115e and 116e coincide with each other when the first control member 115 is disposed at the middle of the movable range relative to the second control member 116.

The film-feeding system further comprises driven levers (cam followers) 118 and 119 biased by a spring 125 so that the leading end of each of the levers 118 and 119 enters into each of the control grooves 115e and 116e when the control grooves 115e and 116e coincide with each other. When the control grooves 115e and 116e do not coincide with each other, the leading end of the levers 118 and 119 is out of the control grooves 115e and 116e, respectively, thus contacting the peripheral surface of the control portions 115d and 116d, respectively. The levers 118 and 119 are fixed to a shaft 120 so that the lever 118 rotate together with the lever 119. A lock detection switch 121 is provided in the vicinity of the lever 118 disposed below the lever 119. The lock detection switch 121 is turned on when the leading end of each of the levers 118 and 119 enters into each of the control grooves 115e and 116e.

A control lever (locking member) 122 shown at an upper portion of FIG. 12 is fixed to the shaft 120. The control lever 122 rotates together with the levers 118 and 119. An operation lever 106 for opening/closing the cover 100 of the cartridge compartment has a projection 106a engaging a claw 122a formed at the leading end of the control lever 122. The lever 106 also has an engaging claw 106b, which can engage a claw 123 provided on the side of the cover 100. The claws 106b and 123 serve as a means for keeping the cover 100 of the cartridge compartment closed when the claw 122a of the control lever 122 is in engagement with the projection 106a of the operation lever 106. The operation lever 106 is biased by a spring 124 in a direction in which the claws 106b and 123 are kept to be engaged.

The output gear 116a engages a gear 126 which engages a fork gear 104a integrated with the fork 104. The fork gear 104a has a boss 104b on which an encoder 127 for controlling the stop position of the boss 104b is formed. The encoder 127 comprises two contacts 127a and a conductive plate 127b fixed to a predetermined position of the peripheral surface of the boss 104a. The stop position of the boss 104b can be controlled by controlling the rotational amount of the motor (M), by means of the number of pulses for example, with respect to a reference position detected by the encoder 127.

Figure 13:
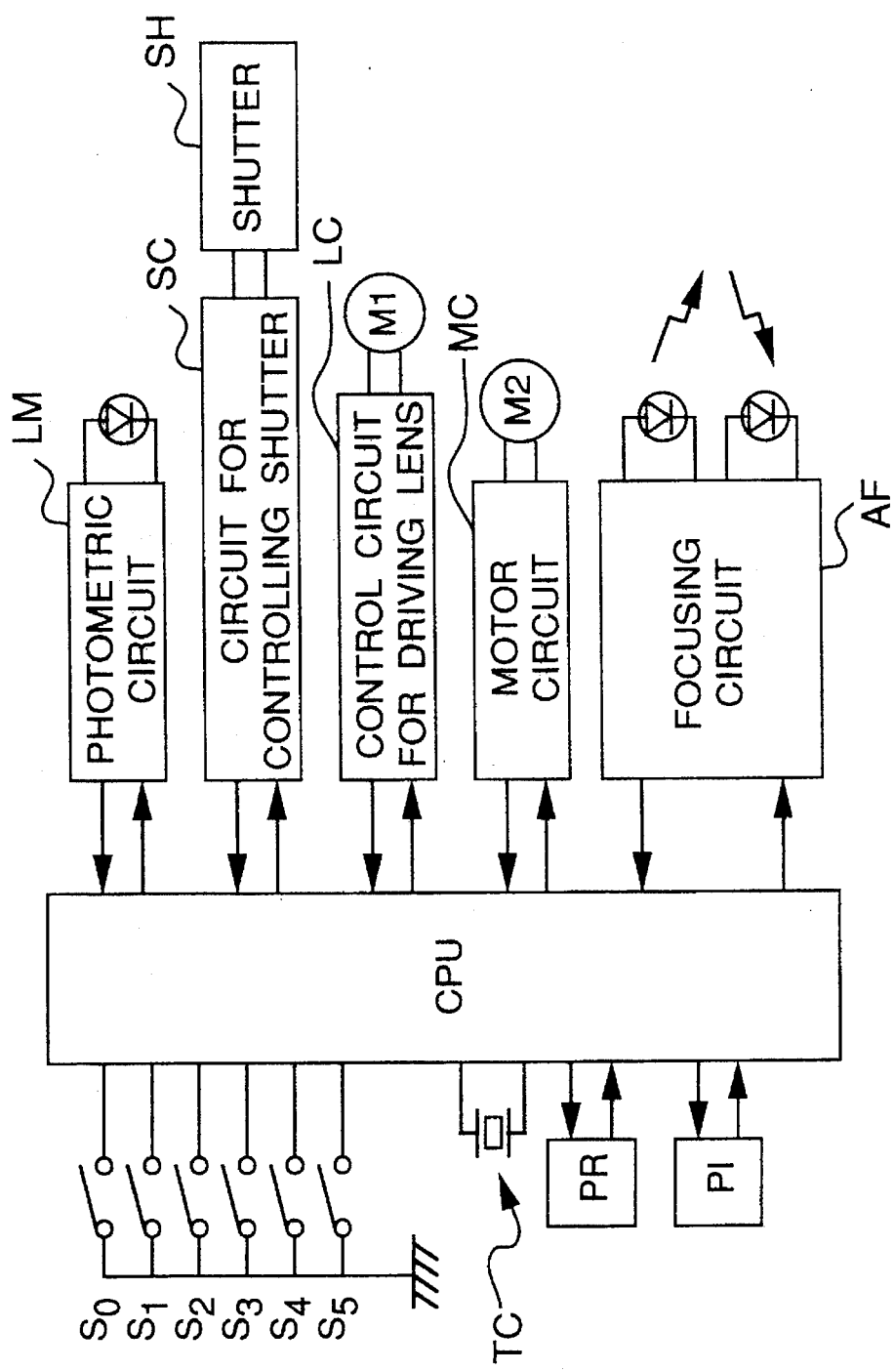
FIG. 13 is a block diagram showing a schematic construction of a circuit of the camera.

FIG. 13 is a block diagram showing the construction of the circuit of the camera. A microcomputer CPU is connected with the following circuits and devices: a photometric circuit LM for measuring the luminance of an object to be photographed; a shutter control circuit SC for opening/closing a shutter SH according to the luminance of the object measured by the photometric circuit LM; a lens drive control circuit LC for focusing a photographic lens by driving a lens drive motor M1; a motor circuit MC for controlling the rotation of a feeding motor M2 (shown by M in FIG. 11); and a distance measuring circuit AF for measuring the distance between the photographic lens and the object.

The CPU is connected with the following switches and devices: a power switch so; a photometric/distance measuring switch S1; a release switch S2; a cover detection switch S3 for detecting the opening/closing of the cover of the cartridge compartment; a fork position switch S4 (corresponding to the encoder 127); a cover locking detection switch S5; a timer circuit TC; a photo reflector PR disposed alongside an aperture to detect the film position by the passage of perforations formed therein; and a photo interrupter PI for outputting pulse signals corresponding to the rotational amount of the feeding motor M2 to the CPU so that the CPU detects the number of rotations of the feeding motor M2.

Figure 14:
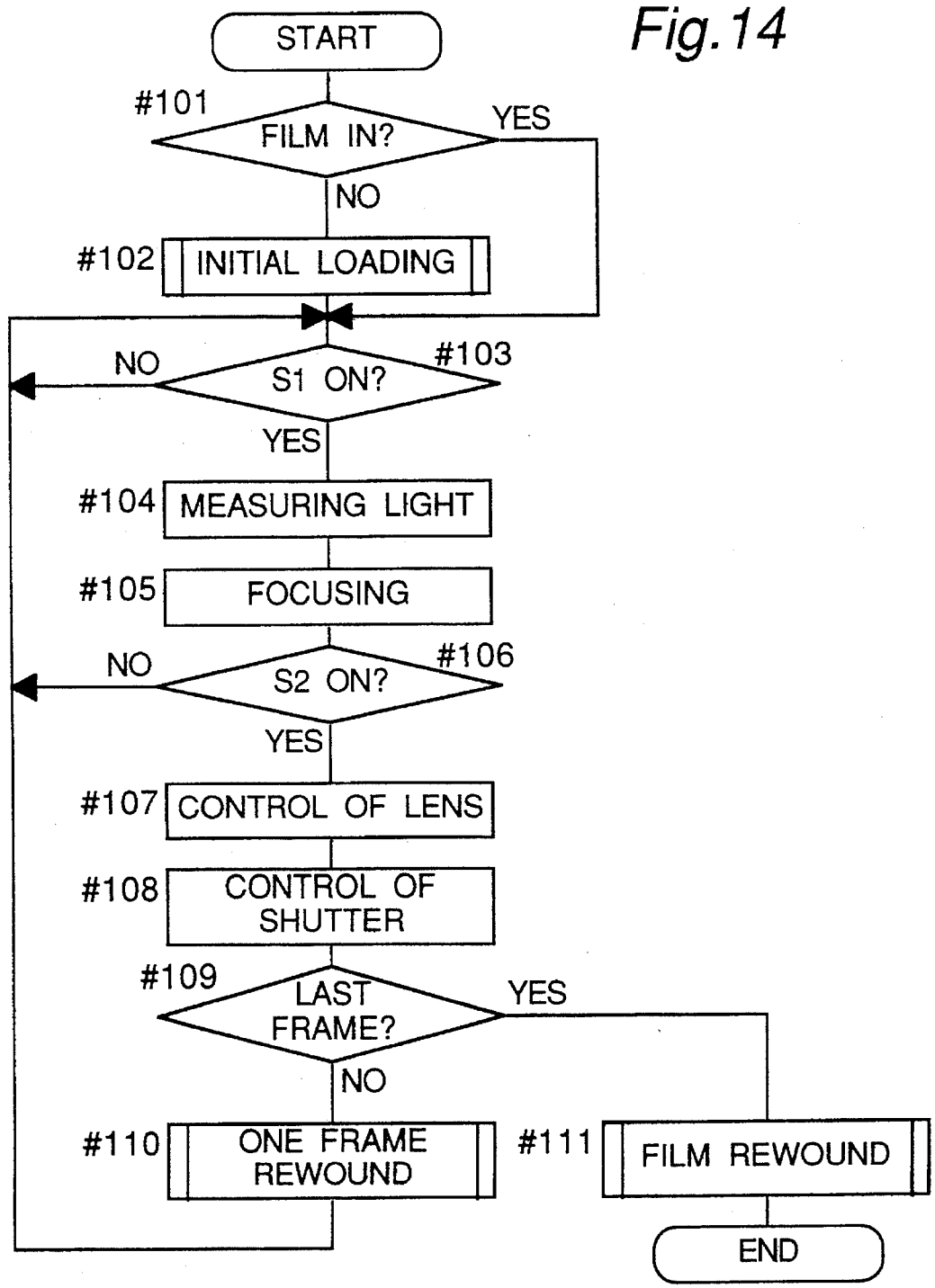
FIG. 14 is a flowchart showing a main sequence of the camera.
Figure 15:
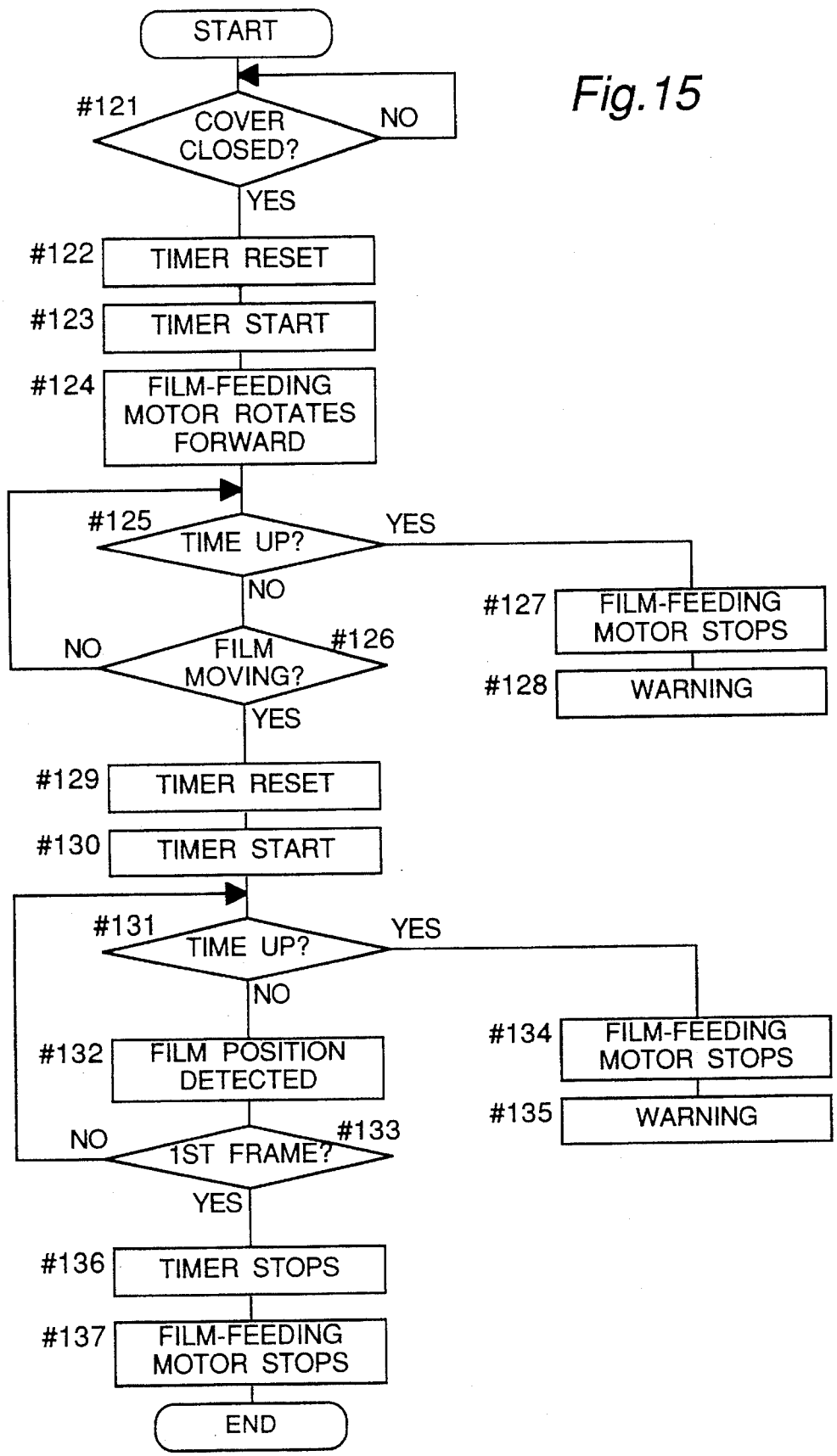
FIG. 15 is a flowchart showing an initial loading operation.
Figure 16:
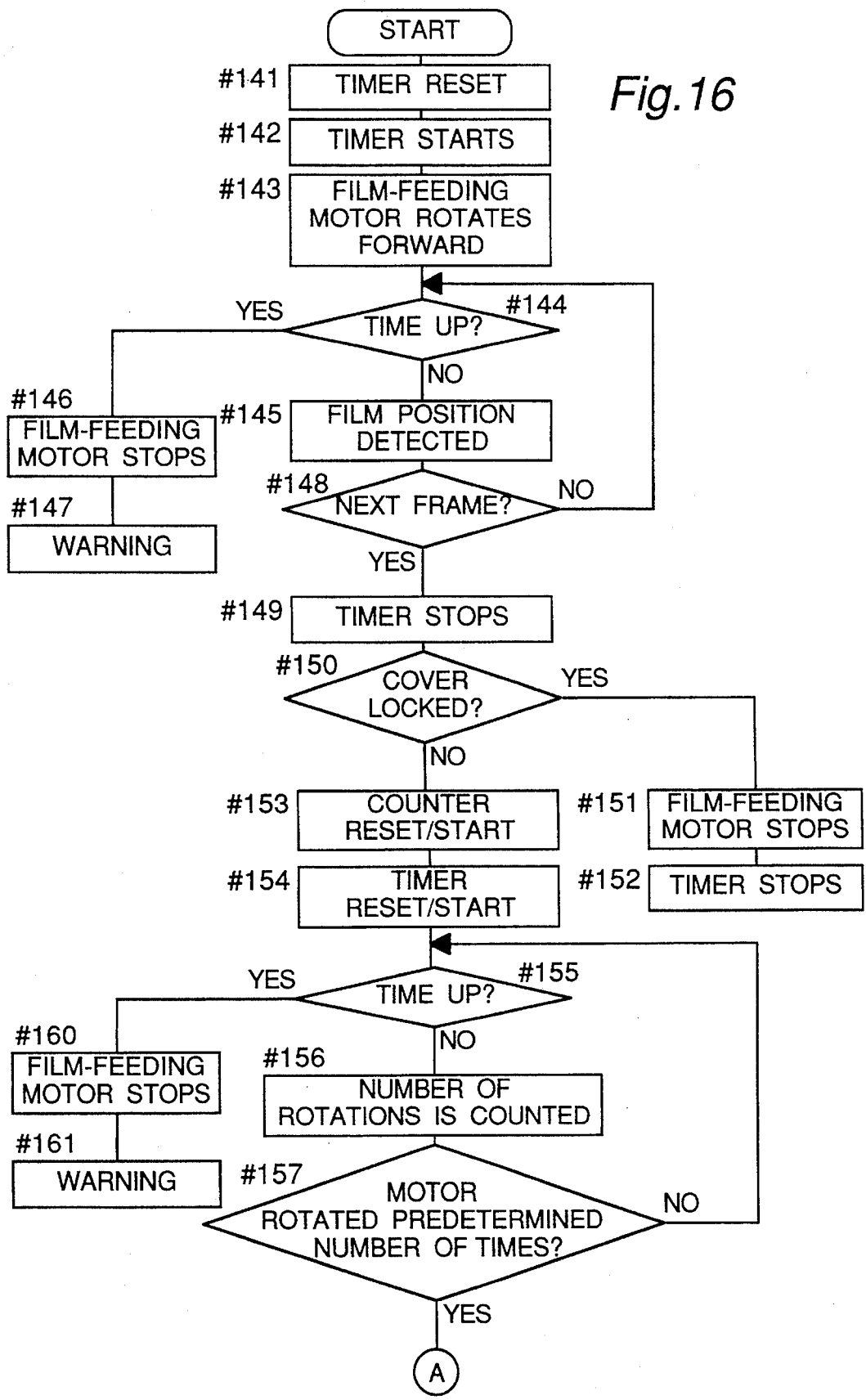
FIG. 16 is a flowchart showing an operation of winding one frame of a film.
Figure 17:
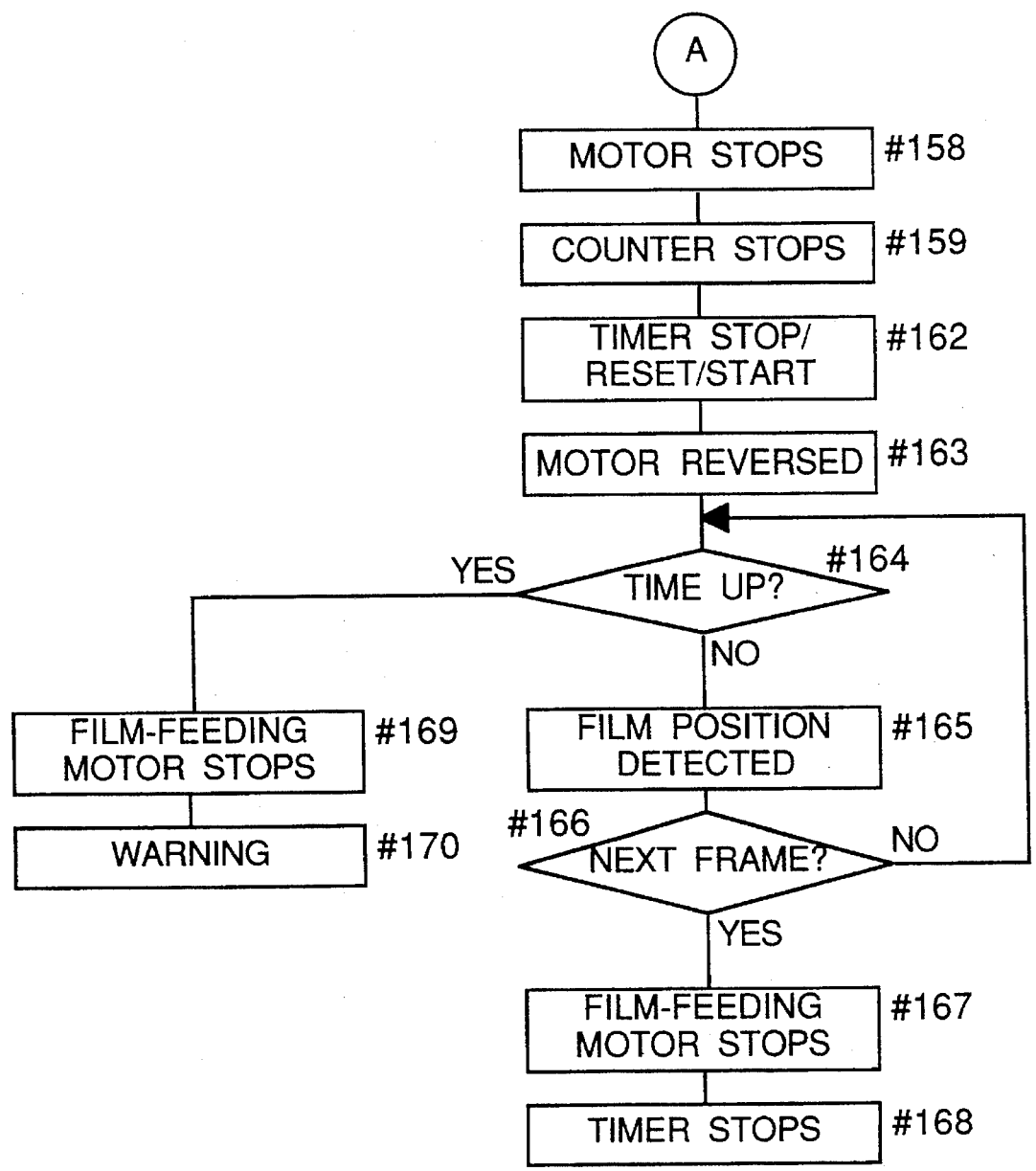
FIG. 17 is a flowchart showing the operation of winding one frame of the film.
Figure 18:
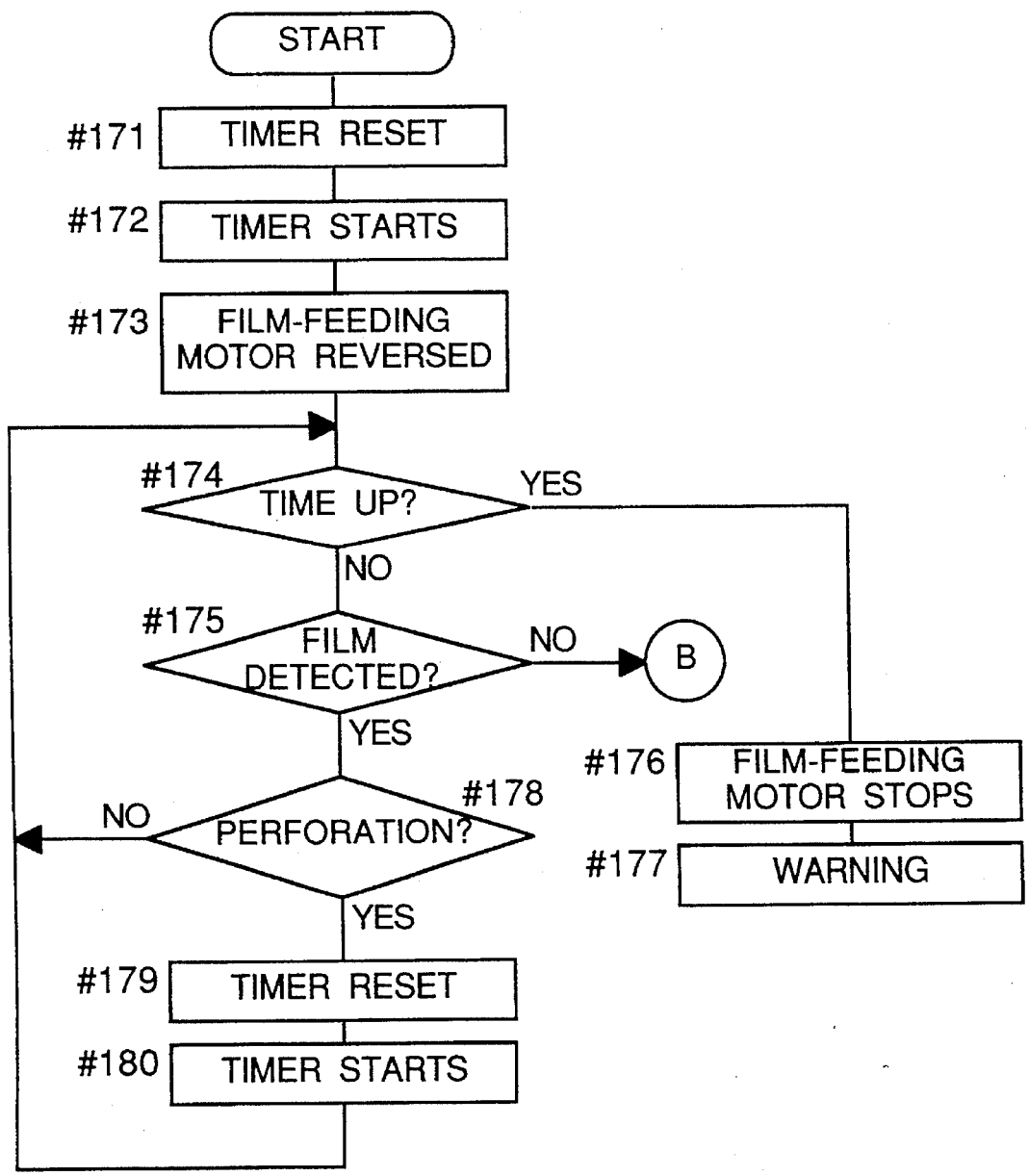
FIG. 18 is a flowchart showing an operation of rewinding the film.

The operation of the camera is described below with reference to FIGS. 14 through 22. FIG. 14 is a flowchart showing the main sequence of the camera. FIG. 15 is a flowchart showing an initial loading operation. FIGS. 16 and 17 are flowcharts showing an operation of winding one frame of the film. FIGS. 18 and 19 are flowcharts showing a film rewinding operation. FIG. 20–22 are views showing the operation of the cover-locking mechanism. Each figure of FIGS. 20 through 22 is shown a little bit different from that of FIG. 12, in regard of the disposition and configuration of members, to clarify the operation of the cover-locking mechanism.

When a power switch S0 is turned on, the main sequence starts. At step #101, it is decided whether or not the film is outside the cartridge, namely, whether or not the film is wound around the spool shaft, based on, for instance, output signals of the photo reflector. If not, it is decided that a new cartridge is loaded in the cartridge compartment. Thus, at step #102, an initial loading operation of the film, which is shown in FIG. 15 in detail, is performed to set an unexposed frame at a photographing position (position of aperture). At step #103, the CPU waits for the switch S1 being turned on.

On the other hand, at step #101, if it is decided that the film is outside the film cartridge, the CPU waits for the switch S1 being turned on without performing the sequence of the initial loading.

When the switch S1 is turned on, the luminance of the object and the distance between the photographic lens and the object are measured at steps #104 and #105, respectively. At step #106, the CPU waits for the switch S2 being turned on. If it is decided that the switch S2 is ON, a lens control and a shutter control are performed at steps #107 and #108, respectively, to expose the film based on the photometric data and the data of the distance between the object and the photographic lens. If it is decided that the switch S2 is not or at step #106, the photometric data and the distance data are reset, and the program returns to step #103 at which the CPU waits for the switch S1 being turned on. That is, at the time of the shutter release, the photometric data and the distance data obtained immediately before the switch S2 is turned on are used.

When the shutter control has been completed at step #108, it is decided at step #109 whether or not a frame which has just been exposed is the last frame. If not, the sequence of winding one frame up as shown in FIGS. 16 and 17 is executed at step #110. Then, the next unexposed frame is set at the position of the aperture, and the CPU waits for the switch S1 being turned on. If it is decided that the frame is the last one at step #109, the sequence of rewinding the film, which is shown in detail in FIGS. 18 and 19, is executed at step #111 in order to rewind the film into the cartridge. Then, the operation terminates.

The initial loading of the main sequence to be executed at step #102 is described below with reference to FIG. 15. In this sequence, first, at step #121, the CPU waits for the closing of the cartridge compartment cover, based on the change in the level of a signal outputted from the switch S3. When the cover has been closed, a timer of a timer circuit TC is reset at step #122. Then, at step #123, the timer is started, and at step #124, the feeding motor M2 is rotated forward.

Figure 20A:
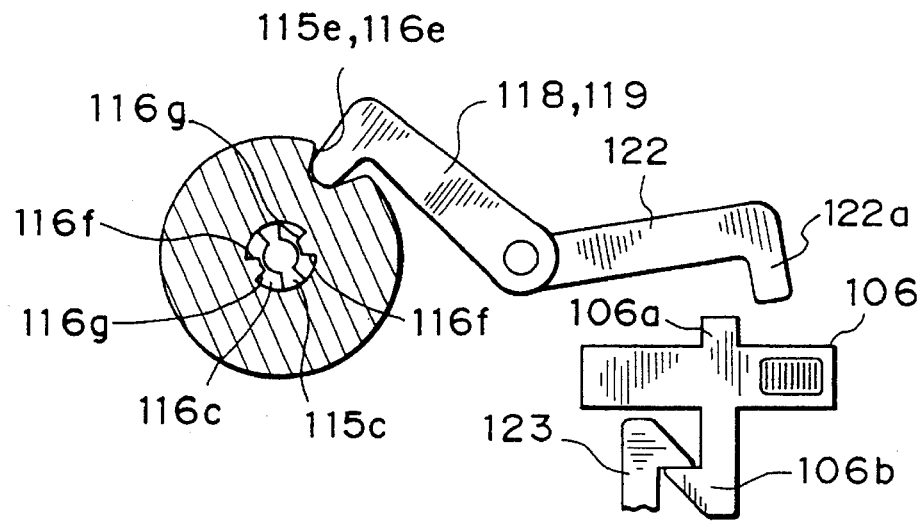
FIGS. 20A through 20C are views showing the operations of the cover-locking mechanism at the time of initial loading.
Figure 21A:
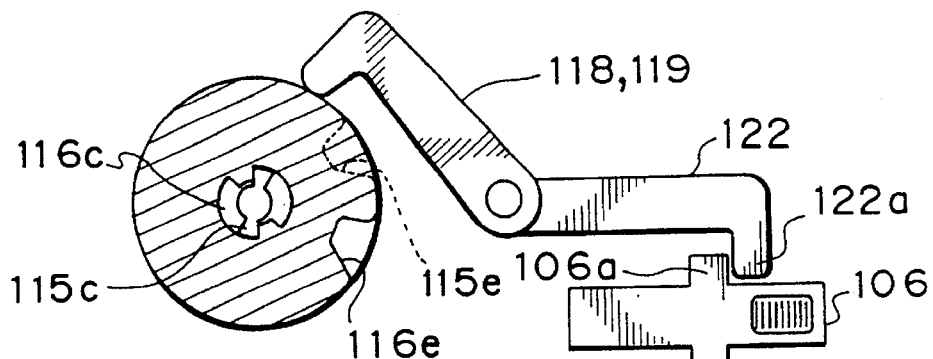
FIGS. 21A through 21D are views showing the operations of the cover-locking mechanism at the time of winding one frame of the film.

Before the feeding motor M2 rotates, the projection 115c of the first control member 115 is disposed at the middle of the groove 116c of the second control member 116 as shown in FIG. 20A. Under this condition, the control grooves 115e and 116e of the first and second control portions 115d and 116d coincide with each other, and both leading ends of the levers 118 and 119 engage with both control grooves 115e and 116e of the first and second control members 115 and 116, respectively. That is, the claw 122a of the control lever 122 is away from the projection 106a of the operation lever 106, and the cover 100 of the cartridge compartment can be opened by operating the operation lever 106.

Figure 20B:
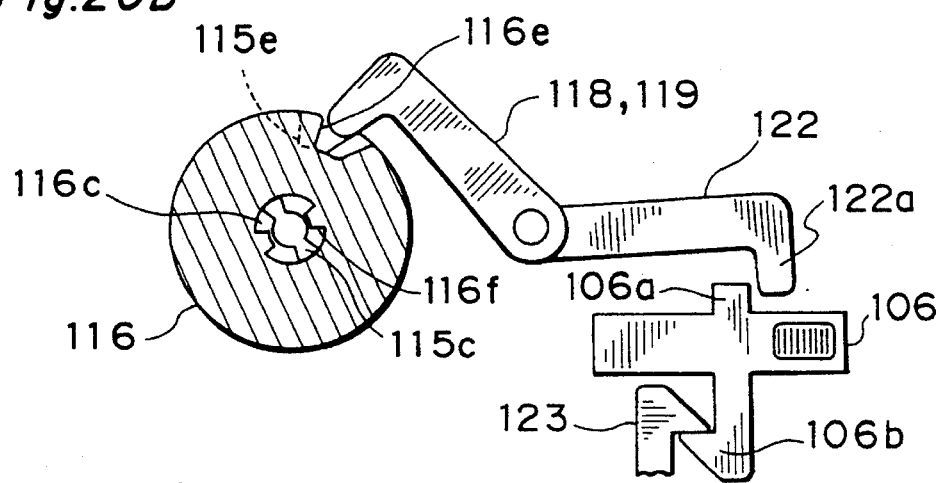

When the motor (M) starts to rotate forward, only the first control member 115 rotates, with the second control member 116 kept stationary until the projection 115c is brought into contact with a peripheral side surface 116f of the groove 116c, because the fork 104 acts as a load on the output gear 116a. As a result, the control groove 115e of the first control member 115 moves away from the control groove 116e of the second control member 116, and consequently, the leading end of the levers 118 and 119 move away from each of the control grooves 115e and 116e, and, at the same time, the claw 122a of the control lever 122 approaches the projection 106a of the operation lever 106, as shown in FIG. 20B.

Figure 20C:
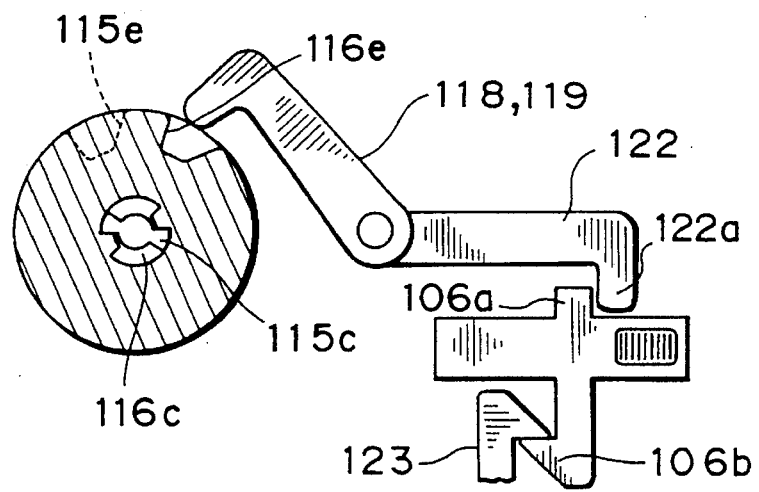

Then, the first and second control members 115 and 116 rotate simultaneously after the projection 115c of the first control member 115 contacts the peripheral side surface 116f of the groove 116c of the second control member 116, as shown in FIG. 20C. Accordingly, the fork 104 rotates to feed the firm with the operation of the lever 106 being prohibited.

The feeding of the film at this time is monitored, for instance, on the basis of an output signal from the photo reflector PR. If a predetermined period of time elapses without detecting the movement of the film, the motor (M) is stopped, and a warning is given (steps #125, #127, #128). If it is decided at step #126 that the film is in motion, the timer is reset again at step #129, and the timer is started at step #130. Then, the first frame of the film is detected by the output signal of the photo reflector PR at steps #132 and #133. If the first frame is detected within a predetermined time at step #133, the timer is stopped at step #136, and the film-feeding motor is stopped at step #137. If it is decided at step #131 that the first frame is not detected within a predetermined time, the motor is stopped at step #134, and a warning is given at step #135.

After the initial loading is completed, the first frame is exposed to light, and then, the next frame is wound as shown in the flowcharts of FIGS. 16 and 17. Before describing the operation, the relationship between the rotational speed of the spool gear 102a and that of the fork gear 104a (see FIG. 11) is described first.

In this camera, when the cartridge is put in the cartridge compartment, the film is fed out therefrom. Therefore, the film cannot be wound tightly around the spool shaft 102 if the film-feeding speed is faster than the film-winding speed of the spool shaft 102. In order to make sure that the film is wound tightly around the spool shaft 102 in the initial loading operation, gear ratio is set so that the film winding speed of the spool shaft 102 is faster than the rotational speed of the fork 104 which feeds out the film from the cartridge case. Premising the gear ratio, the operation of the mechanism for winding one frame of the film is described below with reference to FIGS. 16 and 17.

The timer of the timer circuit TC is reset at step #141, and it is started at step #142. Then, the motor M2 is rotated forward at step #143. As a result, as shown in FIG. 21a, the second control member 116 starts to rotate with the state shown in FIG. 20C. Thereafter, the speed of the output gear 116 which rotates together with the fork 104 pulled by the spool shaft 102 via the film becomes higher than the rotational speed of the input gear 115 driven by the motor M2, resulting in the relationship between the groove 116e and the groove 115e being reversed as shown in FIG. 21B and FIG. 21C.

At steps #144 and #145, it is decided whether or not the photo reflector PR detects the perforation of the next frame within a predetermined time period. If it does not, the motor M2 is stopped and a warning is given at steps #146 and #147, respectively. If the photo reflector PR detects the perforation of the next frame, the timer is stopped at step #149. Then, at step #150, it is decided whether or not the cover of the cartridge compartment is locked, and if it is decided that the cover is locked, the motor and the timer are stopped at steps #151 and #152, respectively.

Figure 21B:
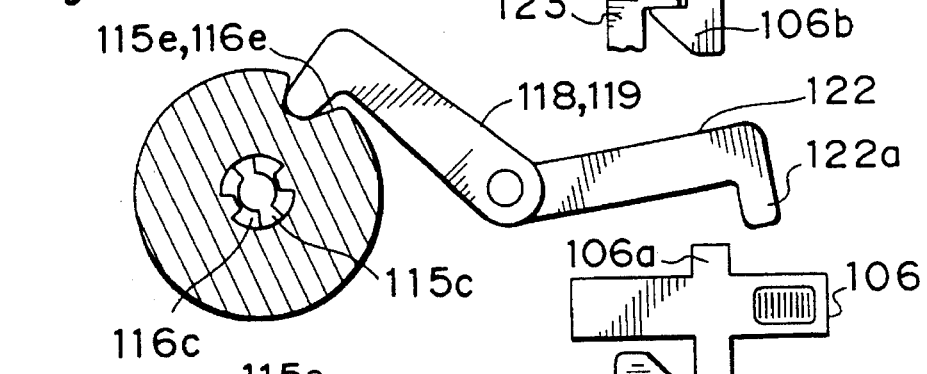
Figure 21C:
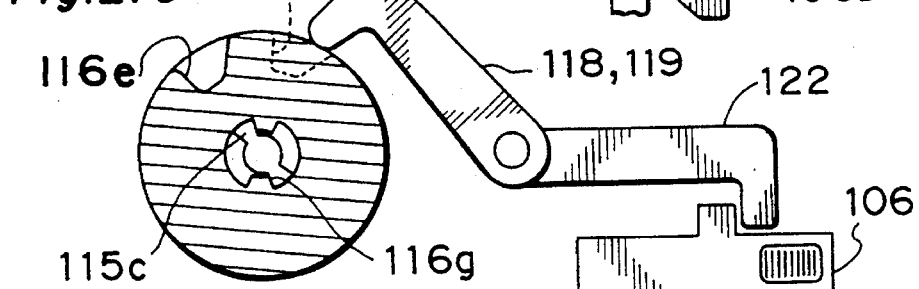
Figure 22A:
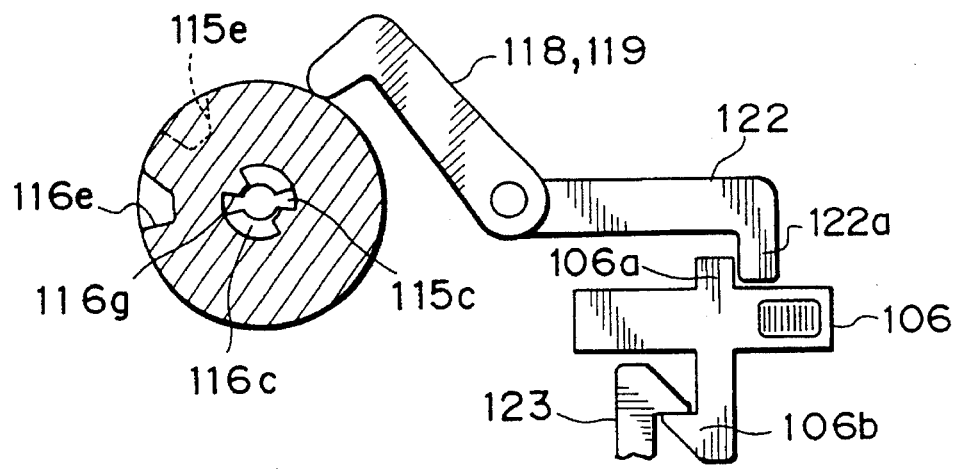
FIGS. 22A through 22C are views showing the operations of the cover-locking mechanism at the time of rewinding the film.
Figure 22B:
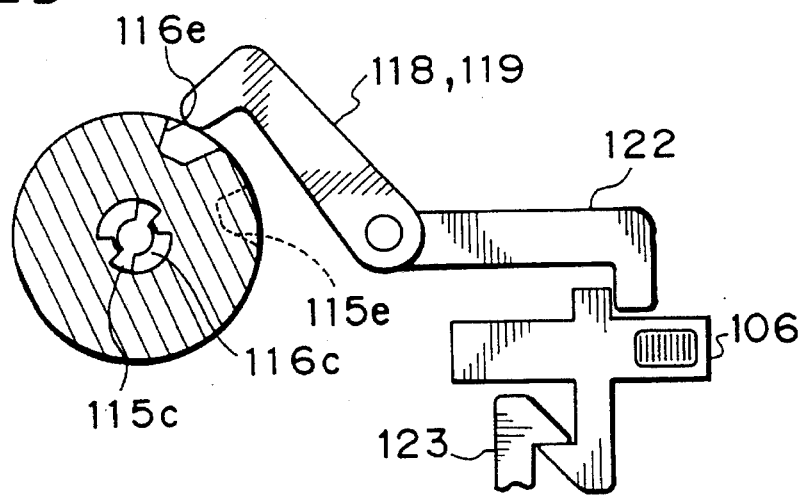
Figure 22C:
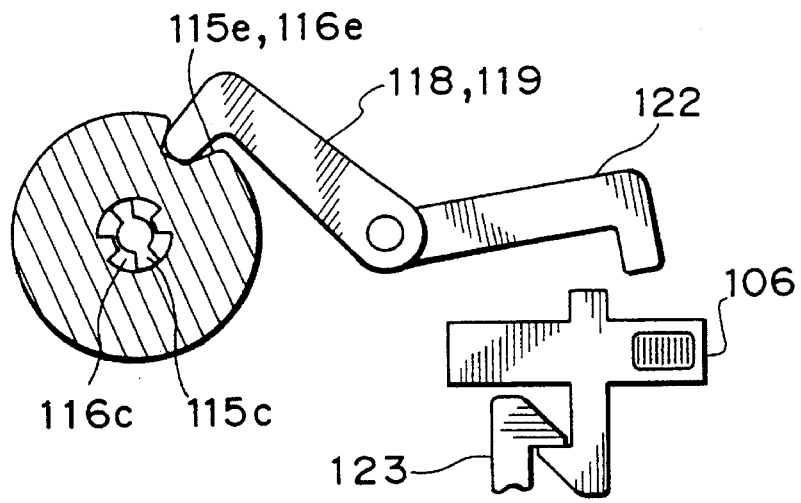

If it is decided at step #150 that the cover is not locked, i.e, the input gear 115 and the output gear 116 are stationary with the state shown in FIG. 21B, the counter for counting the number of rotations of the motor is reset and then started without stopping the motor M2 at step #153. Then, at step #154, the timer is reset and started. Then, it is decided at steps #155, #156, and #157 whether or not the motor rotates a predetermined number of times within a predetermined time period. If it does, the motor and the counter are stopped at steps #158 and #159.

On the other hand, if it is decided at step #155 that the predetermined time period elapses before the motor rotates the predetermined number of times, it is decided that an abnormality occurs, and the motor M2 is stopped and a warning is given at steps #160 and #161, respectively.

Figure 21D:
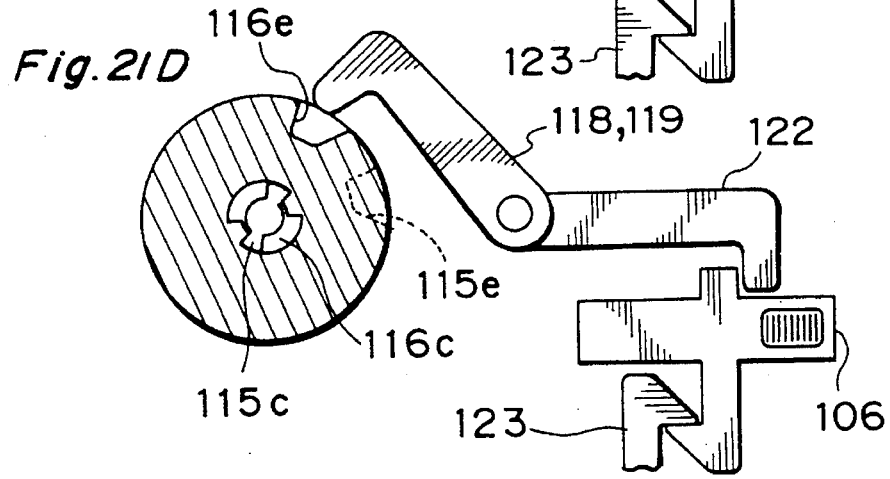

When the motor and the counter are stopped at steps #158 and #159, the cover-locking mechanism is in the state shown in FIG. 21C, i.e., the cover is locked and the frame to be exposed to light passes the aperture of the camera. Therefore, at steps #162 through #166, the motor M2 is rotated backward for a predetermined time period, and at steps #167 and #168, the motor M2 is stopped after it is decided that the frame to be exposed is set at the photographing position. This state is shown in FIG. 21D. If it is decided at step #164 that the predetermined time period elapses before the frame to be exposed is set at the photographing position, the motor is stopped at step #169 and a warning is given at step #170.

Normally, the motor (M) hardly stops with the cover unlocked as shown in FIG. 21B when one frame is wound. In order to make sure that the motor (M) never stops with the cover unlocked, operations after steps #153 are performed. The cover is not unlocked when the film is rewound although the film is rewound after it is advanced forward of the aperture. This is because the gear 115a rotates faster than the gear 116a and the positional relation between the grooves 115e and 116e is maintained.

The film rewinding operation is performed in accordance with the flowcharts shown in FIGS. 18 and 19. First, at step #171, the timer is reset, and at step #172, the timer is started. At step #173, the motor M2 is rotated backward (See FIG. 22A). At steps #174 and 175, a time period in which the leading end of the film passes the position of the photo reflector PR is monitored. If it is decided that it takes more than a predetermined time period in the movement of the film, the motor M2 is stopped and a warning is given at steps #176 and #177, respectively. Until the leading end of the film passes the position of the photo reflector PR, the passage of the perforation is repeatedly detected at step #178. That is, during this period of time, the timer is repeatedly reset and started at steps #179 and #180 each time the perforation of one frame passes the photo reflector PR in order to confirm that the perforation of each frame passes the photo reflector PR within a predetermined time period. This operation continues until, the passage of the leading end of the film is detected.

If it is decided at step #175 that the leading end of the film passes the position of the photo reflector PR, the following operation is performed to stop the cartridge spool at a predetermined position in accordance with the condition of how the film of the cartridge is used. That is, the timer is reset at step #181 and a predetermined time period for rewinding the leading end of the film into the cartridge case is set at step #182. The CPU waits at step #183 for the predetermined time period elapsing. If the predetermined time elapses, the timer is reset at step #184 again, and a time in which the cartridge spool makes one rotation is set at step #185. Then, it is decided at steps #186 and #187, based on a signal outputted from the switch S4, whether or not the fork is disposed at a correct position before the predetermined time elapses.

If it is decided that the fork is disposed at a correct position, the timer is stopped at step #188, and the motor M2 is stopped at step #189. Then, at step #190, the motor M2 is rotated backward. It is then decided at step #191, based on a signal outputted from the switch S5, whether or not the cover of the cartridge compartment is unlocked. If it is, the motor M2 is stopped at step #192. Then, the film rewinding operation terminates.

On the other hand, if it is decided at step #186 that the time is up, the motor M2 is stopped at step #193, and then a warning is given at step #194.

As described above, the input gear and the output gear provided in the film feeding system are rotatable relative to each other in the predetermined range, and the cartridge compartment cover is opened and closed by utilizing the relative motion of the input gear and the output gear. This mechanism enables the cover to be locked without using any special actuator when necessary. Accordingly, the film is prevented from being exposed to light carelessly because the lever cannot be operated by mistake. Further, the cartridge can be prevented from being taken out from the cartridge compartment with no correct display of how the film of the cartridge is used.

In the camera employing a thrust-type of cartridge as shown in each of the abovementioned embodiments, when a user opens the cartridge compartment cover and then forcibly takes out the cartridge from the cartridge compartment with the film being pulled outside the cartridge case, the film may be broken. But the mechanism of the second embodiment prevents this breakage of the film.

In the second embodiment, an index rotating together with the cartridge spool is provided to show whether the film is exposed or unexposed; a display corresponding to "exposed" and "unexposed" is provided on the cartridge case; and the stop position of the cartridge spool is controlled. With this construction, the film cartridge can be taken out of the cartridge compartment only after the positioning of the index with respect to the display is completed, thus preventing any incorrect indication of how the film is used by a user.

The mechanism according to the first and second embodiments can be applied to a camera using a film cartridge accommodating a 35 mm film.

A camera having a cover-locking mechanism according to a third embodiment of the present invention is described below in detail with reference to FIGS. 23 through 29.

Figure 24:
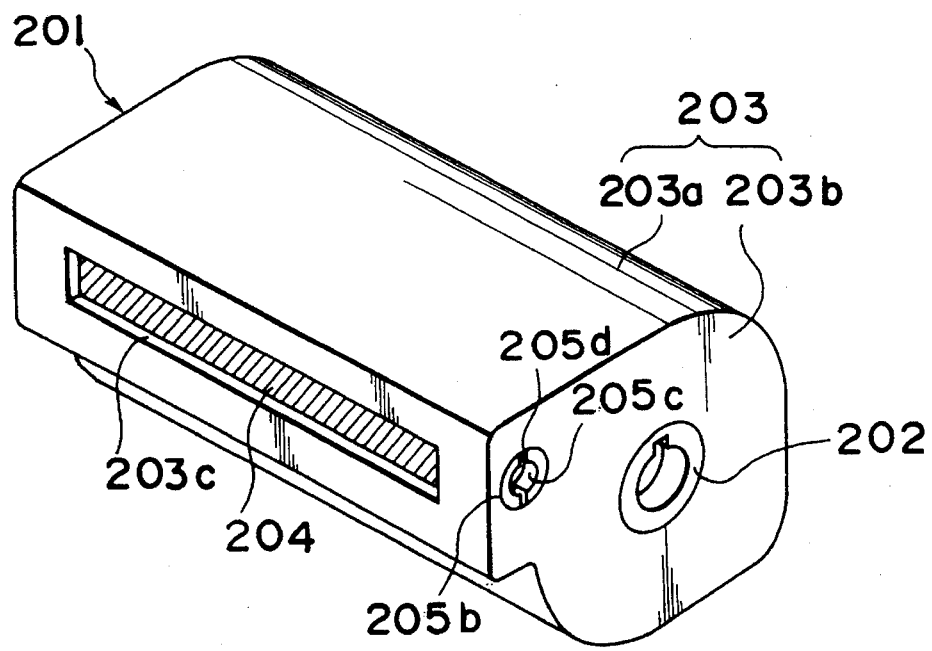
FIG. 24 is a perspective view showing the other end surface of the film cartridge shown in FIG. 23.
Figure 25:
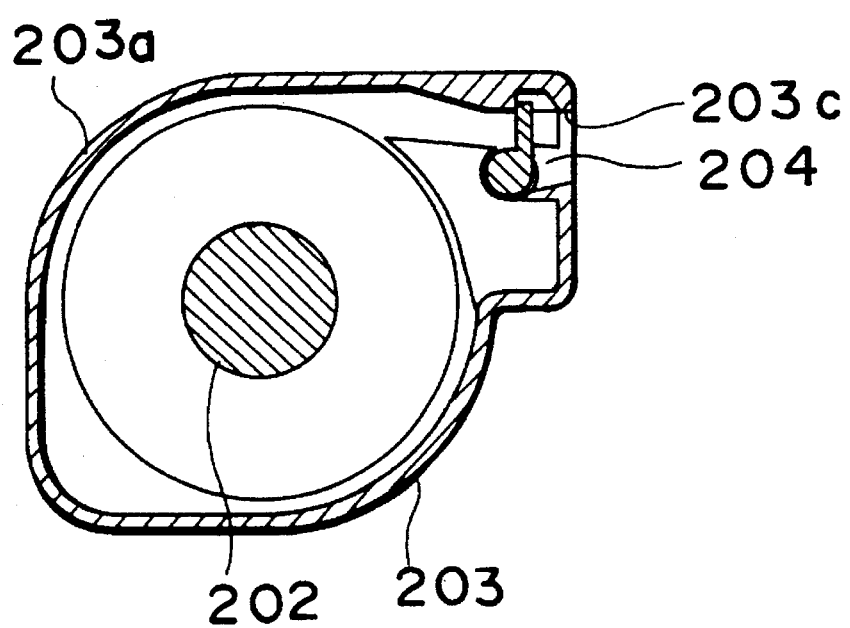
FIG. 25 is a sectional view taken along a line perpendicular to the axis of a cartridge spool of the cartridge in FIG. 23.

A cartridge 201 of the camera is described below with reference to FIGS. 23 through 25. The cartridge 201 comprises a cartridge spool 202 around which a film is wound, and a cartridge case 203 comprises an approximately cylindrical peripheral wall 203a, and top and bottom walls 203b holding both ends of the cartridge spool 202 rotatably. This cartridge 201 is a thrust-type of cartridge. That is, when the cartridge 201 is not in the cartridge compartment, the film is wound around the spool 202 up to its leading end thereof inside the cartridge case 203. When the cartridge 201 is put in the cartridge compartment, the film is fed out from the cartridge case 203 by a film-feeding mechanism provided in the camera in order to wind the film around a spool shaft of the camera.

The cartridge 201 has a light-intercepting door 204 for intercepting a film insertion opening 203c. When the film is pushed out from the cartridge case 203 in the cartridge compartment, the light-intercepting door 204 is opened, and when the film is wound around the spool 202 up to its leader inside the cartridge case 203, the light-intercepting door 204 is closed with respect to the film insertion opening 203c. The light-intercepting door 204 rotates together with sockets (interlocked members) 205a and 205b which are rotatably inserted into holes of the top and bottom walls 203b and held by them. The light-intercepting door 204 is opened and closed by rotating one of the sockets 205a and 205b. Each of the sockets 205a and 205b has a center hole 205c and a keyway-shaped slit 205d. The slit 205d is substantially parallel to the film inserting direction when the light-intercepting door 204 is opened while it is perpendicular to the film inserting direction when the light-intercepting door 204 is closed.

Figure 23:
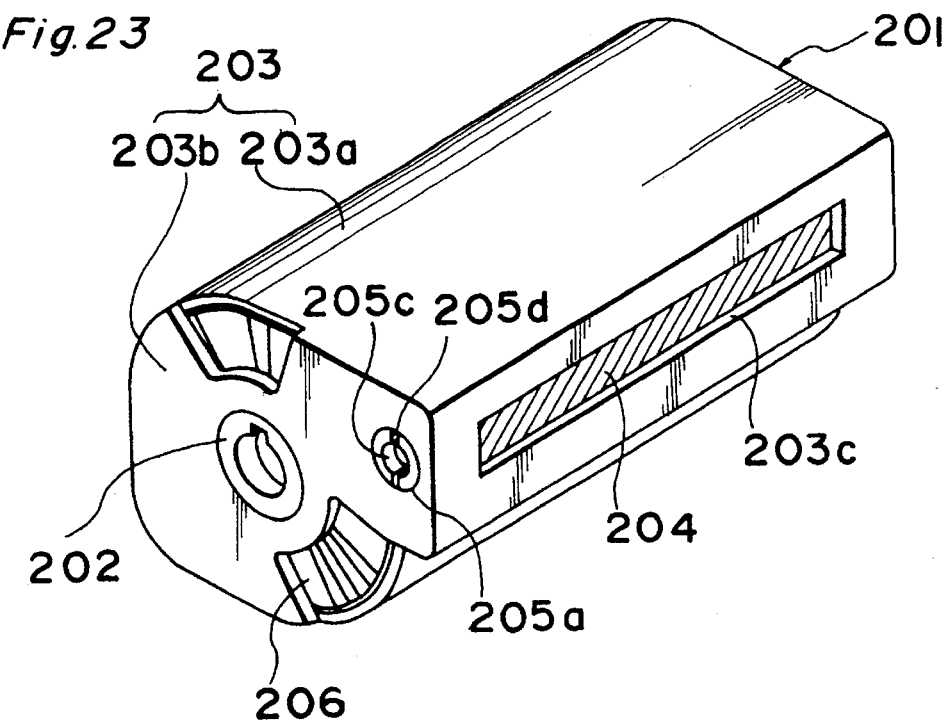
FIG. 23 is a perspective view showing one end surface of a film cartridge used by a camera having a coverlocking mechanism according to a third embodiment of the present invention.

As shown in FIG. 23, there is provided, on one of the top and bottom walls 203b of the cartridge case 203, a data disk 206 on which a bar code indicating the sensitivity of the film, the number of frames, etc. is shown. The data disk 206 rotates together with the cartridge spool 202 so that a sensor provided in the camera body reads a bar code signal of the data disk 206 at the time of initial feeding of the film. Though not shown, an index is shown on the data disk 206 while three kinds of marks of "UNEXPOSED", "PARTLY EXPOSED" and "COMPLETELY EXPOSE" are shown on the cartridge case 203 to display how the film is used by a user. And, at the time of rewinding the film, the index points to either of these displaying marks, depending upon the state thereof, by controlling the stop position of the cartridge spool 202.

Figure 26:
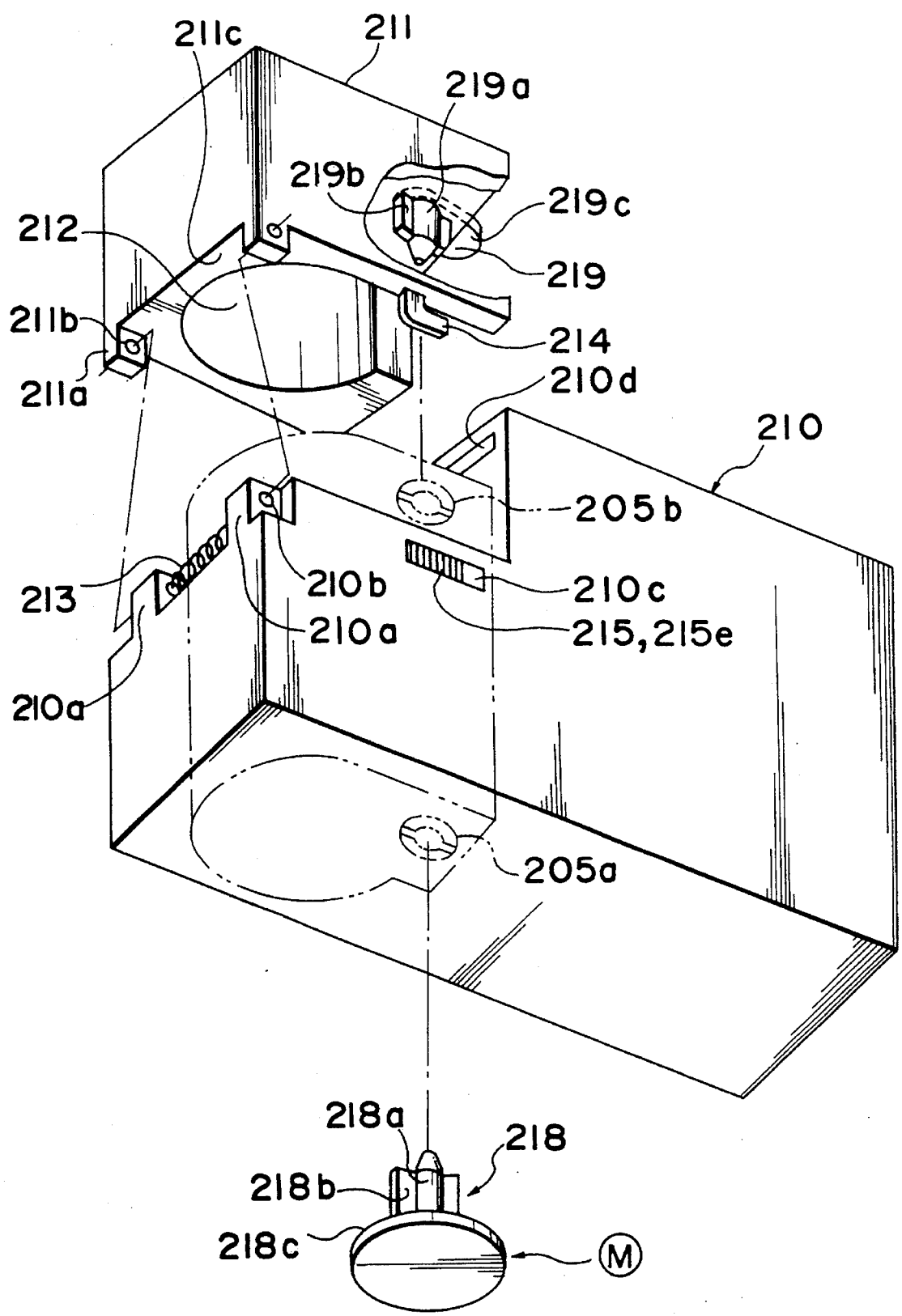
FIG. 26 is a perspective view showing a mechanism for opening and closing a light-intercepting door of the cartridge and the cover-locking mechanism.

FIG. 26 is an exploded perspective view showing a mechanism for opening and closing the intercepting door 204 and the cover-locking mechanism. Reference numeral 210 in FIG. 26 shows a camera body, and 211 shows the cover of the cartridge compartment. The cover 211 is constructed so that it is disposed on an upper left cover of the camera body as shown in FIG. 26 when the camera body 210 is viewed from the bottom surface thereof. A cartridge compartment 212 is composed of a counterpart opening formed inside the cover 211 and a counterpart opening formed inside the camera body 210. The camera body 210 and the cover 211 have connecting projections 210a and 211a, respectively. Each projection 210a and 211a has holes 210b and 211b into which a pin not shown is inserted. The cover 211 is pivoted around the pin inserted into the holes 210b and 211b. A torsion coil spring 213 mounted between the projections 210a and 210a of the camera body 210 biases the cover 211 in the cover-opening direction.

The construction of an operation section for opening/closing the cover 211 of the cartridge compartment 211 is described below. An L-shaped engaging claw 214 is formed on the bottom surface 211c of the cover 211. An operation member 215 disposed in the camera body 210 engages the engaging claw 214 and disengages therefrom, thus regulating the opening/closing of the cover 211.

Figure 27A:
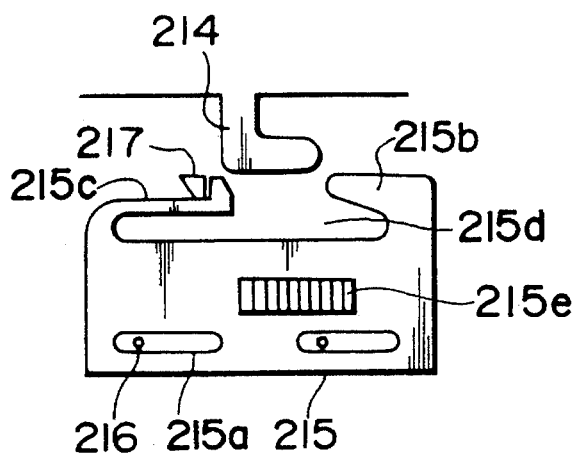
FIG. 27A is a view showing a state in which an engaging claw of the cartridge compartment cover disengages from an operation member.
Figure 27B:
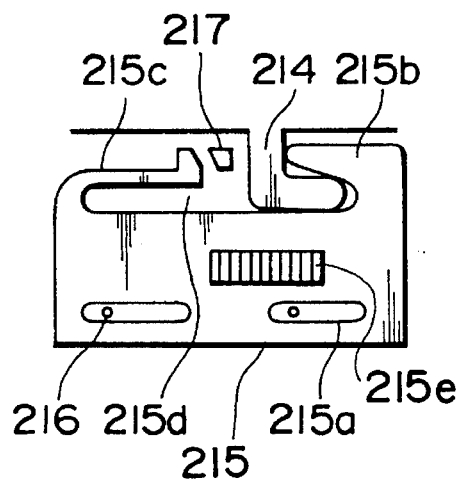
FIG. 27B is a view showing a state in which an engaging claw of the cover engages the operation member.

FIGS. 27A and 27B show that the engaging claw 214 is in engagement with the operation member 215 and in disengagement therefrom, respectively. The operation member 215 formed as a rectangular plate is held by the camera body 210 with pins 216 inserted in slots 215a so that the operation member 215 is movable in the right and left direction in FIG. 27A and 27B. The operation member 215 has an operation portion 215e projecting from the center thereof. The operation portion 215e can be operated by a user through a slit 210c of the camera body 210.

The operation member 215 comprises an engaging claw 215b formed on an upper right side thereof; a long, narrow stopper 215c flexible vertically, disposed on an upper left side thereof and extending toward the right direction in FIG. 27A and 27B; and a groove 215d, formed between the engaging claw 215b and the stopper 215c, for receiving the engaging claw 214 of the cover 211. The camera body 210 has a fixed stopper 217. The operation member 215 is biased leftward in FIG. 27A and 27B by a spring not shown. Thus, when a hand is released from the operation member 215 after operating it toward the right direction in FIG. 27, the leading end of the stopper 215c is stopped by contacting with the fixed stopper 217 as shown in FIG. 27A.

In closing the cover 211, the stopper 215c of the operation member 215 is placed in position in contact with the fixed stopper 217. While the cover 211 is closed with this state, the leading end of the stopper 215c of the operation member 215 is pressed downward by the engaging claw 214. As a result, the engaging claw 214 moves into the groove 215d, and the stopper 215c is disengaged from the fixed stopper 217. When the stopper 215c is completely disengaged from the fixed stopper 217, the spring moves the operation member 215 leftward. Then, the operation member 215 stops at the position at which the engaging claws 214 and 215b are in contact with each other as shown in FIG. 27A, and the cover 211 is kept at the closed position.

Upon moving the operation member 215 toward the right direction from the position shown in FIG. 27B, the engaging claw 215b of the operation member 215 disengages from the engaging claw 214 of the cover 211. With a further move of the operation member 215 toward the right direction, the inclined surface disposed on the leading end of the stopper 215c is brought into contact with the inclined surface of the fixed stopper 217, which makes it possible that the leading end of the stopper 215c is pressed downwards to pass under the fixed stopper 217, while the stopper 215c is flexing downward. At this moment, the cover 211 is opened by the coil spring 213, and the operation member 215 is positioned as shown in FIG. 27A.

Meanwhile, in order to open and close the light-intercepting door 204 of the cartridge 201, a driving member 218 (See FIG. 26.) for driving the light-intercepting door 204 is disposed below the cartridge compartment. The driving member 218 comprises a shaft 218a engaging the center hole 205c of the socket 205 and a pair of key-shaped projection 218b engaging the slit 205d so as to open and close the light-intercepting door 204 by rotating the socket 205a of the cartridge 201. The driving member 218 further comprises a gear 218c (teeth are not shown in FIG. 26) integrated with the driving member 218. The rotation of the motor (M) is transmitted to the driving member 218 via a reduction mechanism not shown.

An engaging member 219 working with the socket 205b disposed on the top surface of the cartridge 1 is provided in the cover 211. Similarly to the driving member 218, the engaging member 219 comprises a first engaging portion comprising a shaft 219a engaging the center hole 205c of the socket 205b and a pair of key-shaped projection 219b engaging the slit 205d. The engaging member 219 projects from the right end surface of the cover 211 when the light-intercepting door 204 is opened. The engaging member 219 has an engaging strip 219c (a second engaging portion) which is retracted inside the cover 211 when the light-intercepting door 204 is closed. The camera body 210 has a concave 210d for receiving the engaging strip 219c when the engaging strip 219c projects from the cover 211, for locking the cover with respect to the camera body 210.

Figure 28:
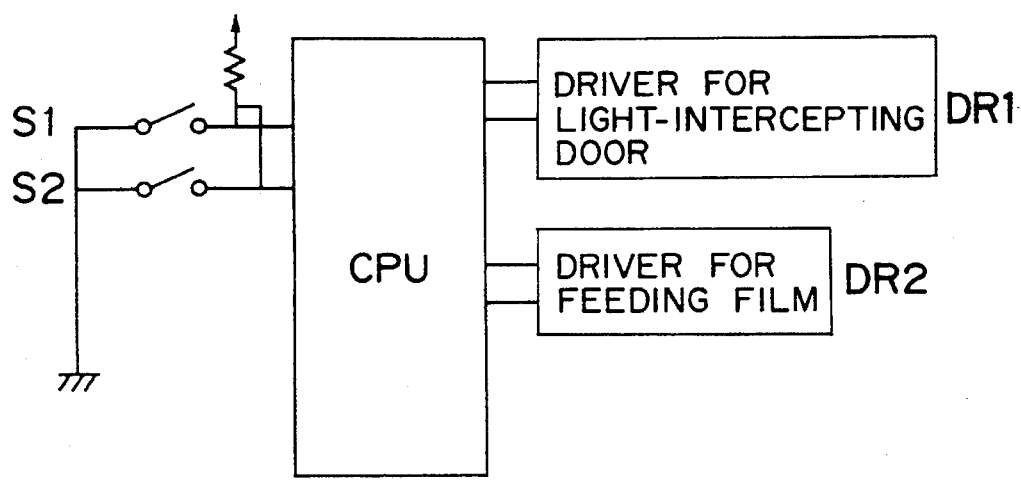
FIG. 28 is a block diagram showing a schematic construction of an electric circuit relating to an operation for opening and closing the light-intercepting door and to the locking operation performed by the cover-locking mechanism.

FIG. 28 is a block diagram schematically showing the construction of an electric circuit relating to the above-described mechanism. The camera comprises a microcomputer CPU controlling the entire operation of the camera. The CPU is connected with a driver DR1 for driving the light-intercepting door; and a driver DR2 for driving the film-feeding motor. The CPU is further connected with a detection switch S1 for detecting whether or not the cartridge 201 is put in the cartridge compartment; and a detection switch S2 for detecting whether or not the cover 211 has been opened or closed.

Figure 29:
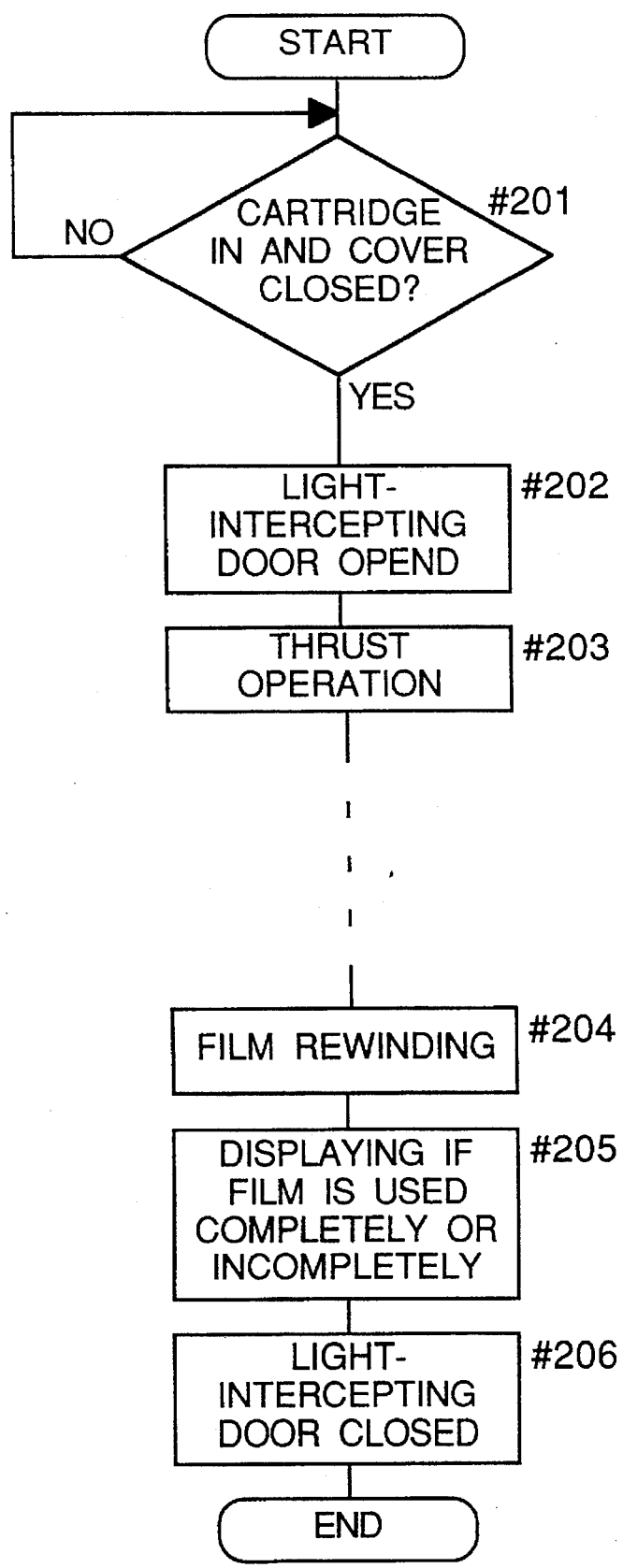
FIG. 29 is a flowchart showing an operation of the camera.

The operation of the camera is described below with reference to the flowchart shown in FIG. 29. If it is decided at steps #201, based on the result detected by the switches S1 and S2, that the cartridge 1 is put in the cartridge compartment 212 and that the cover 211 is closed, the motor (M) is driven to open the light-intercepting door 204 at step #202. At this time, the engaging strip 219c of the engaging member 219 is inserted into the concave 210d of the camera body 210. As a result, the cover 211 is kept to be closed.

At step #203, the film-feeding motor is driven to perform the initial feeding (thrust operation) of the film. After the film is wound around the spool shaft, one frame is wound each time the frame is exposed to light, although this operation is not shown in the flowchart. The film is rewound at step #204 when the last frame is exposed to light or when pressing an unshown switch for use in rewinding the film before all the frames are not exposed to light. Display to show how the film is used by the user is set at step #205 by controlling the stop position of the cartridge spool 202. At step #206, the operation to close the light-intercepting door 204 is performed. At this time, the engaging strip 219c disengages from the concave 210d, and the cover 211 of the cartridge compartment 212 is unlocked. Then, the operation member 215 is operated to take out the cartridge 201 from the cartridge compartment 212.

As described above, according to the third embodiment of the present invention, the cover 211 of the cartridge compartment 212 is locked or unlocked by utilizing the mechanism for opening/closing the light-intercepting door 204. Therefore, it is unnecessary to provide the camera body with a motor for locking or unlocking the cover 211. Further, because the engaging strip 219c is in engagement with the concave 210d when the film is fed out from the cartridge 201, the cover 211 can be prevented from being opened carelessly.

Figure 31A:
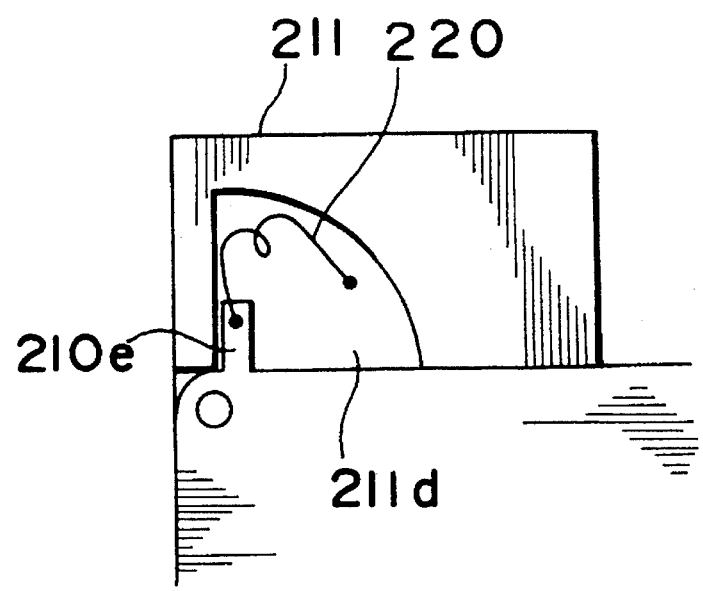
FIG. 31A is a view showing a state in which a cover of a cartridge compartment is closed.
Figure 31B:
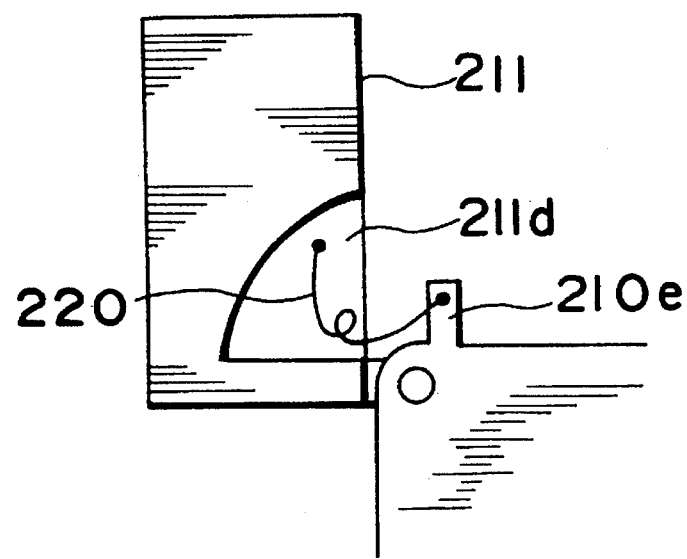
FIG. 31B is a view showing a state in which the cover of the cartridge compartment is opened.

A cover-locking mechanism according to a fourth embodiment of the present invention is described below with reference to FIGS. 30, 31A, and 31B. Different from the cover-locking mechanism according to the third embodiment, in the cover-locking mechanism according to the fourth embodiment, the cover 211 is opened and closed directly without using the operation member 215. Other members are the same as those of the third embodiment; therefore, the same members are denoted by the same reference numerals as those used in the third embodiment, and the detailed descriptions thereof are omitted herein.

In this camera, in order to connect the cover 211 with the camera body 10, a connecting portion 210e for connecting one end of a spring 220 is formed on one of projections 210a and 210a formed on the camera body 210. A cut-out 211d is formed in the bottom surface 211c of the cover 211, and another end of the spring 220 is connected with the cut-out 211d by fixing the end of the spring 220 to the inside of the cut-out 211d. The spring 220 biases the cover 211 in its closing direction with the state shown in FIG. 31a. While the cover 211 is opened, the biasing direction of the spring 220 is revered at a certain point, i.e., the cover 211 is biased in its opening direction. Thus, with the state shown in FIG. 31B, the cover 211 is kept to be opened.

In the fourth embodiment, the film cartridge 201 is put into the cartridge compartment 212 by opening the cover 211 first, putting it therein, and then closing the cover with hands. Thereafter, the motor (M) is driven to open the light-intercepting door 204 and lock the cover 211, similarly to the third embodiment. After the film is rewound and the display to show how the film is used by the user is completed, the light-intercepting door 204 is closed and the cover 211 is unlocked. Then, the cartridge 201 can be taken out from the cartridge compartment 212 by opening the cover 211.

Similarly to the third embodiment, the cover-locking mechanism according to the fourth embodiment is constructed small and compact. Further, the cover 211 can be reliably prevented from being opened carelessly when the film is fed out from the cartridge 201.

The cover-locking mechanism according to the third and fourth embodiments can be applied to not only a camera, but also a device using a film cartridge. The constructions of the cover-locking mechanisms are not limited to the third and fourth embodiments mentioned above.

A cover-locking mechanism according to a fifth embodiment of the present invention is described below with reference to FIGS. 32 through 46. The cover-locking mechanism according to the fifth embodiment is characterized in such mechanisms, related to a cartridge compartment 303 (See FIG. 32.) which is used for a film cartridge 370 having a light-intercepting door 375 (See FIGS. 36 through 38.) at a film entrance thereof, as a film winding mechanism, a mechanism for driving a cartridge spool, a mechanism for driving the light-intercepting door 375, a cover 301 of the cartridge compartment 303, and a mechanism for detecting the opening/closing of the cover 301 of the cartridge compartment 303.

Figure 32:
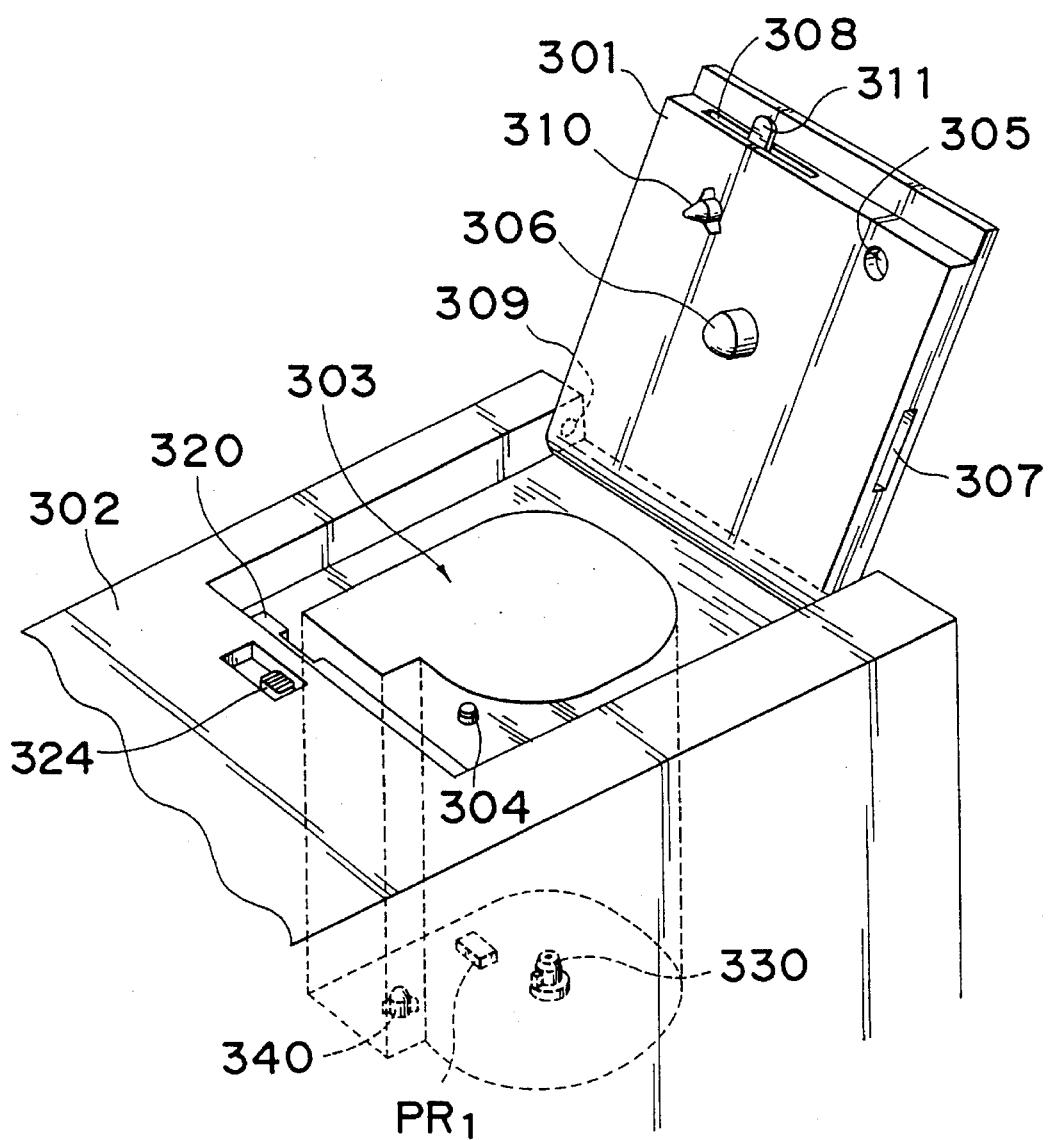
FIG. 32 is a perspective view showing a cover-locking mechanism of a camera according to a fifth embodiment of the present invention.
Figure 36:
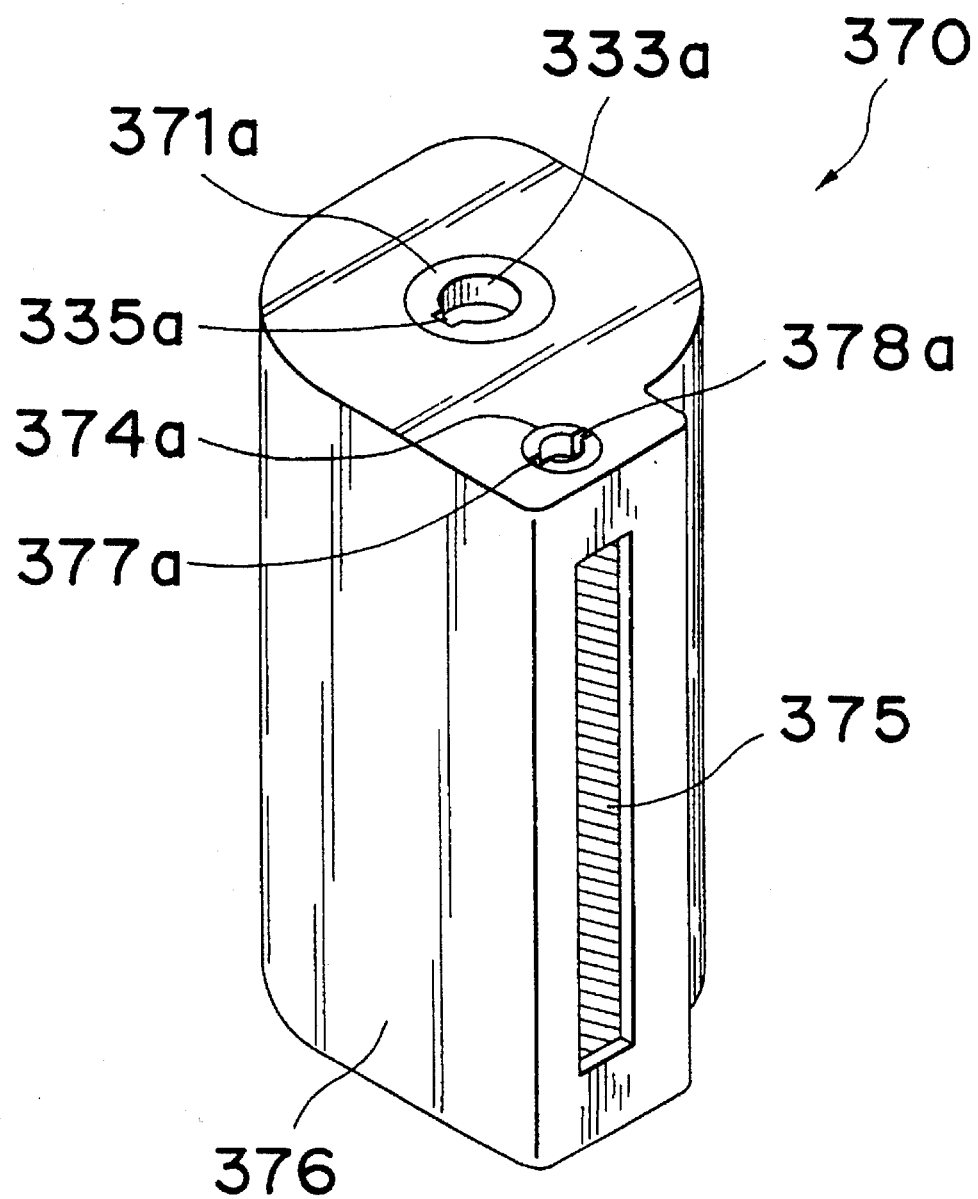
FIG. 36 is a perspective view showing a film cartridge used in the camera shown in FIG. 32, viewed from a top side of the film cartridge.
Figure 37:
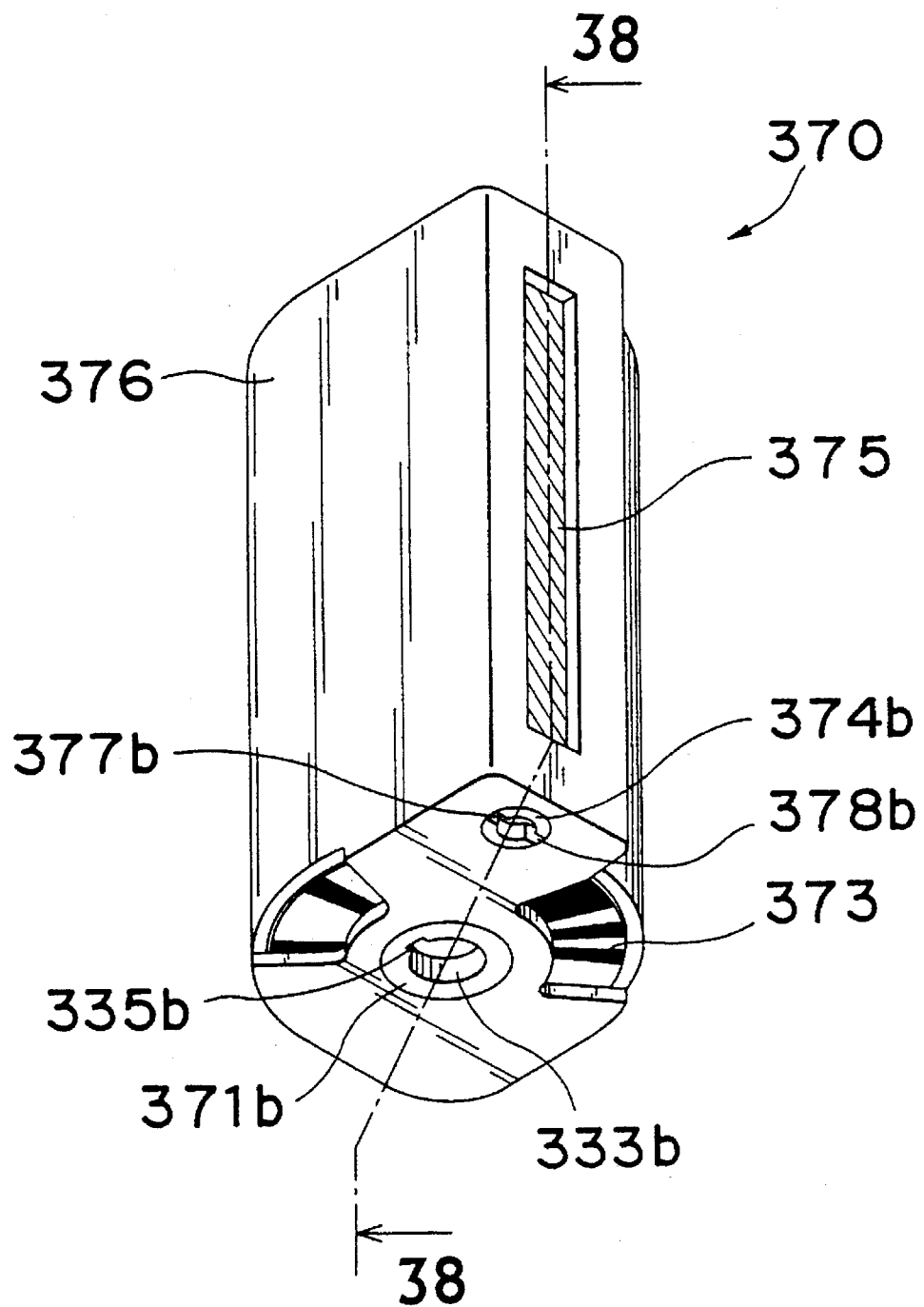
FIG. 37 is a perspective view showing the film cartridge used in the camera shown in FIG. 32, viewed from a bottom side of the film cartridge.
Figure 38:
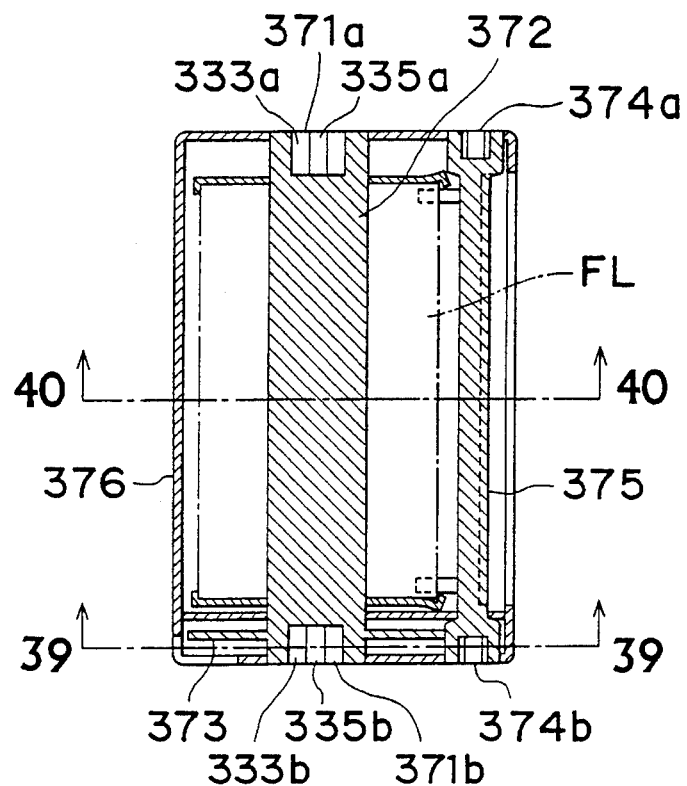
FIG. 38 is a sectional view, showing the film cartridge, taken along a line 38—38 of FIG. 37.
Figure 39:
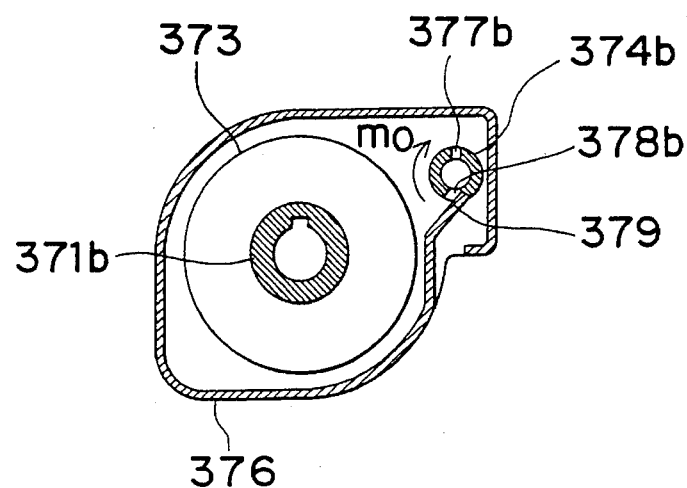
FIG. 39 is a sectional view, showing the film cartridge, taken along a line 39—39 of FIG. 38.
Figure 40:
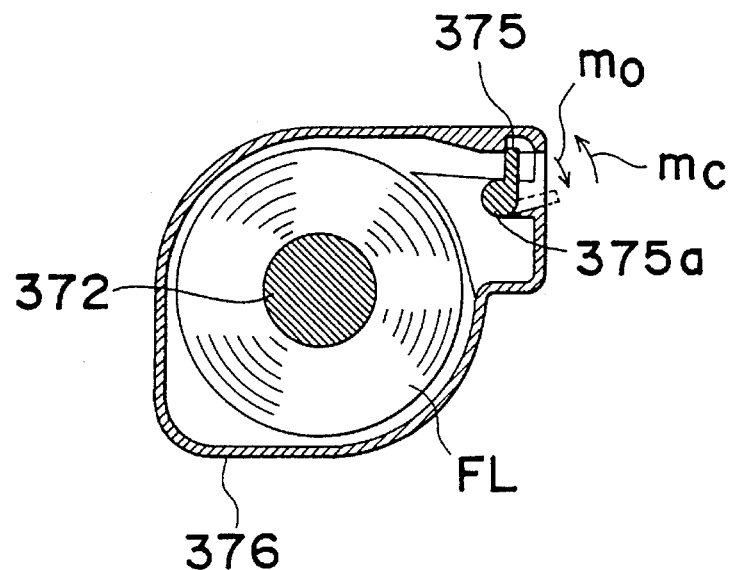
FIG. 40 is a sectional view, showing the film cartridge, taken along a line 40—40 of FIG. 38.

The construction of the film cartridge 370 is described below with reference to FIGS. 36 through 40. FIG. 36 is a perspective view of the film cartridge, used in the camera shown in FIG. 32, shown from the top side thereof, and FIG. 37 is a perspective view of the film cartridge shown from the bottom side thereof. FIG. 38 is a sectional view, showing the film cartridge, taken along a line 38—38 of FIG. 37. FIG. 39 is a sectional view, showing the film cartridge, taken along a line 39–39 of FIG. 38 (The bar code on the bar code disk 373 is omitted for simplicity.). FIG. 40 is a sectional view, showing the film cartridge, taken along a line 40—40 of FIG. 38.

The cartridge 370 is a thrust-type of a cartridge having a hard shell composed of an outer shell 376 (See FIGS. 36 through 40.) made of plastic. The outer shell 376 accommodates a cartridge spool 372 (See FIGS. 38 and 40.) and a rotary bar code disc 373 (See FIGS. 37 and 38.) on which film information is recorded and which rotates together with the cartridge spool 372.

Figure 43:
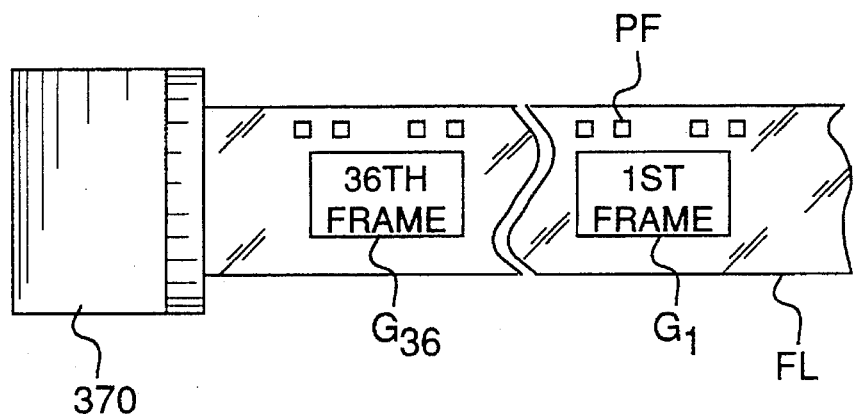
FIG. 43 is a plan view showing a state in which a film is fed out from the film cartridge shown in FIG. 36.

As shown in FIGS. 38 and 40, the cartridge 370 10 accommodates a film FL inside the outer shell 376 with the film FL wound around the cartridge spool 372 when the cartridge 370 is not put in the cartridge compartment 303. Except when the cartridge 370 is in the cartridge compartment 303, the spool 372 is locked whether or not the film FL is exposed to light. That is, the spool 372 is unlocked and thrust out from the cartridge 370 when the cartridge 370 is put in the cartridge compartment 303 as shown in FIG. 43. As shown in FIG. 43, perforations PF are formed on one edge of the film FL with intervals between adjacent perforations PF (consisting of a pair of perforations) being uneven, and photographing regions such as a first frame G1 and a 36th frame G36 of the film FL are assigned by a pair of perforations spaced with a wider internal.

As shown in FIG. 38, interfaces 371a and 371b for thrusting the film FL are integrated with the top and bottom surfaces of the cartridge spool 372. Referring to FIGS. 36, 37 and 39, the interfaces 371a and 371b are constructed rotation-unsymmetrical in its sectional configuration so that the stop position of the cartridge spool 372 can be controlled by a control circuit 380 described later.

Referring to FIG. 37, on the interface 371b formed on the bottom surface of the cartridge spool 372, a key way 35b engaging a key 334 of a thrust driver 330 (See FIG. 34.) and a shaft-engaging hole 333b (See FIG. 37.) engaging a tip portion of a cylindrical engaging portion 332 (FIG. 34) thereof are formed. The thrust driver 330 and the engaging portion 322 thereof will be described later in detail. The cartridge spool 372 engages the thrust driver 330 and can be rotated by it when the tip portion of the engaging portion 322 of the thrust driver 330 engages the shaft-engaging hole 333b and the key 334 of the thrust driven 330 engages the key way 335b of the cartridge spool 372.

Meanwhile, referring to FIG. 36, a shaft-engaging hole 333a which engages a holding shaft 306 (See FIG. 32.) provided on the cartridge compartment cover 301 is formed in the interface 371a of the top surface of the cartridge spool 372. In order to increase the degree of freedom for assembling the cartridge 370, both interfaces 371a and 371b have the same configuration. That is, in the fifth embodiment, a key way 335a formed on the interface 371a do not have any particular function.

Referring to FIG. 37, a bar code indicating various information of the film FL (corresponding to DX code, for example) such as the ISO sensitivity of the film FL, the number of frames, and the latitude is shown on the disc 373. A photo reflector $PR_1$ (See FIGS. 32 and 42.), which will be described later, reads such an information from the bar code during the rotation of the disc 373, thus outputting a signal indicating the information to a memory or the like (not shown). In addition to the information included in the DX code, the disc 373 may include the information of the type of the film indicating whether the film is a negative film or a reversal film, an X-ray film or an infrared film; and the information of the production date of the film and the duration of use thereof.

Similarly to a film cartridge disclosed in U.S. Pat. No. 4,998,123, the cartridge 370 comprises a film-thrusting mechanism corresponding to the interface 371a shown in FIG. 36 and so on; a display mechanism (a mechanism for displaying whether or not the film is used) not shown in the drawings; the light-intercepting door 375 (See FIGS. 36 through 38.) disposed in the vicinity of a film entrance/exit; interfaces 374a and 374b (See FIGS. 36 and 38.) for opening and closing the door 375; and a locking means (a locking claw 379 shown in FIGS. 39 and 41) for locking the light-intercepting door 375 so that the film FL accommodated in the cartridge 370 is prevented from being exposed to light when the door 375 is closed. The film-thrusting mechanism and the display mechanism according to this fifth embodiment are essentially similar to those of the U.S. Pat. No. 4,998,123. Therefore, the description of the same constituent members of the film-thrusting and display mechanisms as those disclosed in the U.S. Pat. No. 4,998,123 are omitted herein.

Referring to FIGS. 36, 37 and 38, the interfaces 374a and 374b for opening and closing the light-intercepting door 375 are integrated with the upper and lower ends of the door 375 in such a manner that the door 375 is sandwiched between the interfaces 374a and 374b. The interface 374a engages a driver 310 (See FIGS. 32 and 33.) functioning as a means for driving the door 375, whereas the interface 374b engages an unlocking driver 340 (See FIGS. 32 and 33.) functioning as a means for unlocking the door 375. The door 375 is held by the interfaces 374a and 374b both pivotally supported by the outer shell 376 of the cartridge 370 and rotated in a predetermined rage of angle on a shaft 375a, as shown by arrow $m_o$ and $m_c$ of FIG. 40. The broken line of FIG. 40 shows an opening position of the door 375.

Two grooves 377a and 378a (See FIG. 36.) are formed in each of the interfaces 374a (See FIG. 36.) and 374b (See FIGS. 37, 39, 41.) radially oppositely with respect to the rotational center thereof. Two projections 311 formed on the driver 310 (See FIG. 33.) engage the grooves 377a and 378a of the interface 374a. When the driver 310 rotates with the interface 374a engaging the driver 310, the interface 374b rotates and the door 375 is opened or closed.

Figure 41:
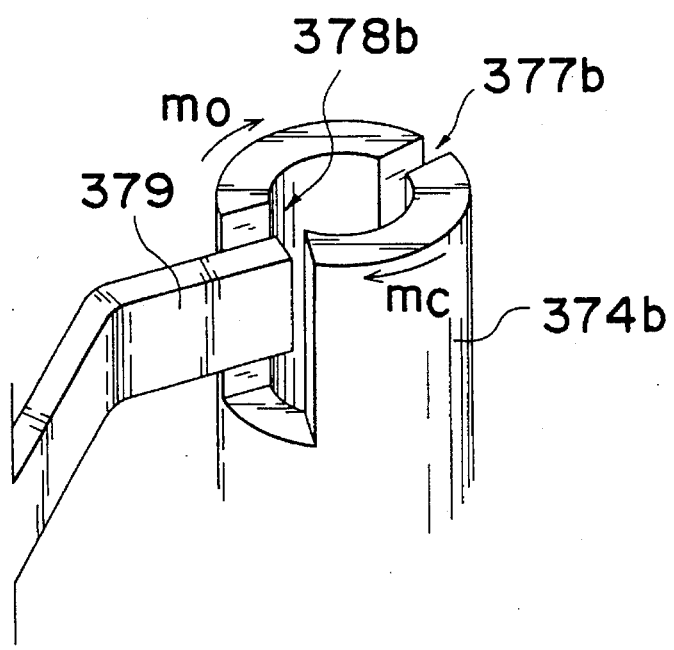
FIG. 41 is an enlarged perspective view showing a state of engagement between a locking claw and an interface for opening and closing the light-intercepting door of the cartridge.

A groove 378b of the interface 374b shown in FIGS. 37, 39, and 41 serves as a means for locking the interface 374b, i.e., as a means for keeping the door 375 close (as shown by the solid line in FIG. 40). As shown in FIGS. 39 and 41, when the locking claw 379 extending from the outer shell 376 toward the interface 374b is inserted into the groove 378b, the interface 374b is locked by the claw 379. When two projections 341 formed on the unlocking driver 340 (See FIG. 33.) engage the grooves 377b and 378b, the locking claw 379 which can be elastically deformed is pressed out from the groove 378, thus unlocking the interface 374b. As a result, the door 375 can be opened with the locking claw 379 being elastically brought into contact with the peripheral surface of the interface 374b.

The reason that the locking claw 379 is not formed on the side of the interface 374a is that the cartridge compartment 303 is made to coincide with that of the cartridge 370 so that the interface 374b engages the unlocking driver 340 (See FIGS. 32 and 33.) when the cartridge 370 is put in the cartridge compartment 303. Thus, the groove 378a formed on the interface 374a does not have a particular function, similar to the key way 335a of the interface 371a. But the provision of the groove 378b has a significance in that the degree of freedom in assembling the film cartridge 370 is enhanced by making both the interfaces 374a and 374b the same in configuration, similar to the key way 335a of the interface 371a.

The construction relating to the cartridge compartment 303 is described below. The cartridge compartment 303 conforming to the cartridge 370 in configuration is provided inside the camera body 302, and the cartridge compartment cover 301 supported pivotally by a shaft 309 is provided on the body 302 as shown in FIG. 32. Upon putting the cartridge 370 into the cartridge compartment 303 and taking it out therefrom, the cover 301 is rotated on the shaft 309 so as to open and close the cartridge compartment 303.

Referring to FIG. 32, a pin 304 for positioning the cover 301 with respect to the camera body 302 is mounted on the top surface of the body 302, and a positioning hole 305 for receiving the pin 304 is formed in the cover 301 which constitutes the upper surface of the cartridge compartment 303 when the cover 301 is closed.

As described above, one of the features of the fifth embodiment is that the camera adopting a drop-in loading system in which the cartridge 370 having the cartridge spool 372 each end of which has the shaft-engaging hole 333a and 333b is used comprises: the camera body 302 having the cartridge compartment 303 into which the cartridge 370 is set; the cover 301 of the cartridge compartment 303 for closing the cartridge compartment 303; the thrust driver 330 disposed on the bottom side of the cartridge compartment 302 and engaging one interface 371b comprising the engaging hole 333b and the key way 335b, thus driving the cartridge spool 372; the holding shaft 306 provided on the cover 301 and engaging another interface 371a comprising the engaging hole 333a and the key way 335a, thus holding the spool 372; and the pin 304 and the positioning hole 305, formed on the camera body 302 and the cover 301, respectively, for positioning the cartridge compartment cover 301 with respect to the camera body 302 so that the thrust driver 330 and the holding shaft 306 are opposed to each other on the axis of the spool 372 when the cover 301 is closed. Needless to say, the positioning hole 305 may be formed on the side of the camera body 302 and the pin 304 may be formed on the side of the cover 301, respectively.

When the cover 301 is closed, the pin 304 engages the positioning hole 305. In this manner, the cover 301 is placed in position on the camera body 302. This construction makes sure that the cover 301 is positioned with respect to the camera body 302 and that the axis of the holding shaft 306 and that of the thrust driver 330 are aligned with each other. Consequently, the cartridge spool 372 is prevented from being loose or shaky, and a load exerted on the film FL is made constant while the film is being fed.

Figure 33:
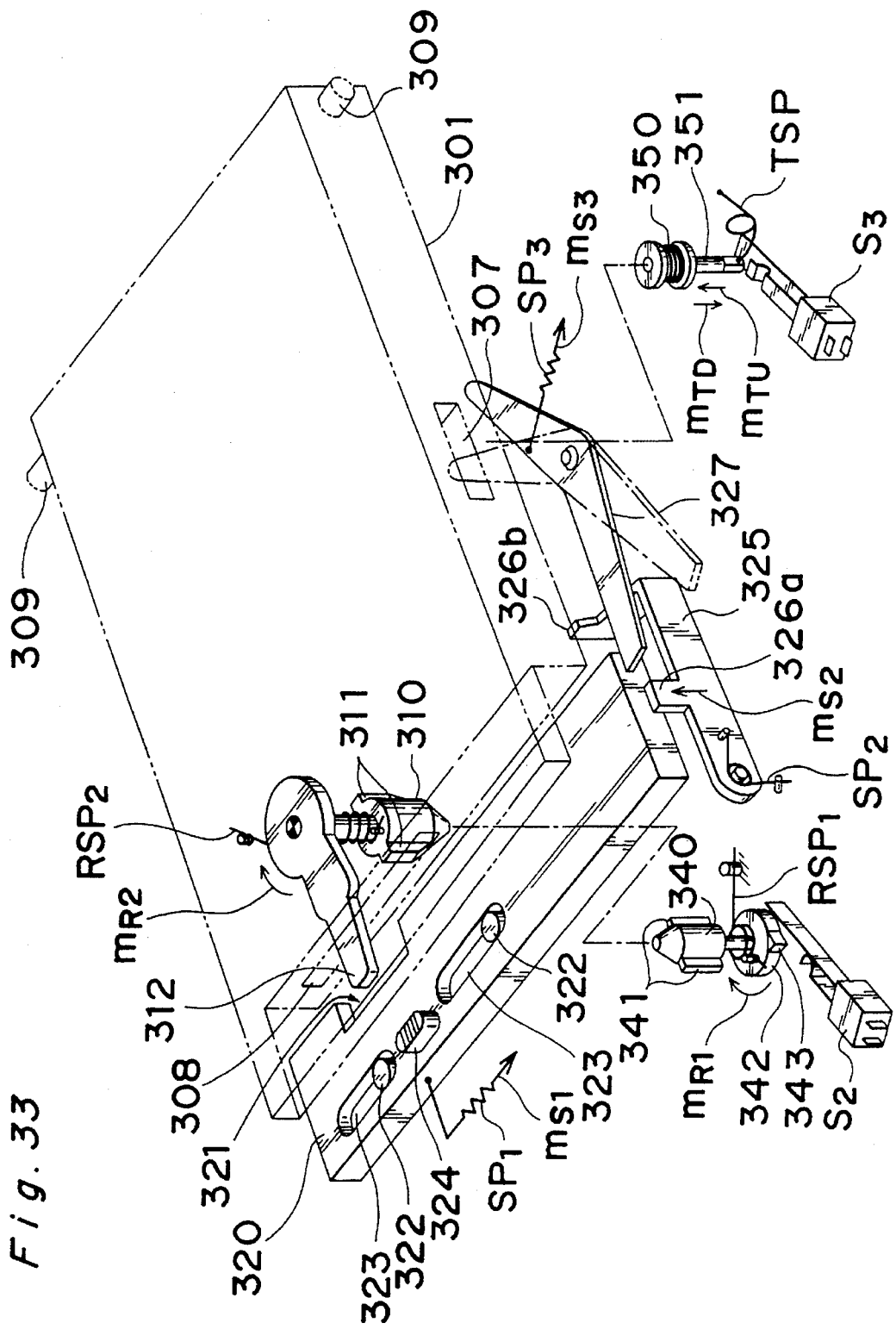
FIG. 33 is a perspective view showing in detail a mechanism for driving a light-intercepting door of a cartridge put in a cartridge compartment of the camera.

Referring to FIGS. 32 and 33, an operation lever 320 is slidably supported by the camera body 302. When a user slides an operation portion 324, the cover 301 can be opened or closed if predetermined conditions, which will be described later, are satisfied. Referring to FIG. 33, the operation lever 320 is biased in the closing direction of the cover 301 by a spring $SP_1$. A pair of slots 323 are formed on the operation lever 320, and a pair of projections 322 each engaging each slot 323 are formed on the camera body 302. The slidable direction and slidable distance of the operation lever 320 are regulated because each projection 322 can move in each slot 323 only in the longitudinal direction thereof.

Referring to FIG. 33, a holding lever 327 is rotatably supported by the main body 302. The holding lever 327 has at one end thereof a spring $SP_3$ having a biasing force weaker than that of the spring $SP_1$, and biasing the holding lever 327 in the direction (shown by an arrow $m_{s3}$) opposite to the biasing direction of the spring $SP_1$, and the other end of the holding lever 327 is followed and moved by one end of the operation lever 320 with both contacted with each other. Thus, when the operation lever 320 is unlocked from a release lever 325, which will be described later, the spring-mounted end of the holding lever 327 is inserted into an opening 307 formed on a side surface of the cover 301, thus holding the cover 301 in position.

Referring to FIG. 33, the release lever 325 is pivotally mounted on the camera body 302. On the release lever 325 is mounted a spring $SP_2$ for biasing the release lever 325 in the direction (shown by arrow $m_{s2}$) in which the operation lever 320 is locked by a projection 326a formed on the release lever 325. The projection 326a of the release lever 325 locks the operation lever 320 at a predetermined position when the cover 301 opens. When the projection 326b of the release lever 325 is pressed downward by the bottom surface of the cover 301, the projection 326a is located below the sliding locus of the operation lever 320, thus unlocking the operation lever 320.

Referring to FIG. 33, a solenoid 350 is mounted in the camera body 302. A plunger 351 is provided in the solenoid 350. When the solenoid 350 is energized positively, the plunger 351 moves upward (shown by arrow $m_{TU}$), thus entering in the rotational locus of the holding lever 327 and preventing the holding lever 327 from pivoting. At this time, the holding lever 327 is locked by the plunger 351 with the spring-mounted end of the holding lever 327 being inserted into the opening 307. On the other hand, when the solenoid 350 is energized negatively, the plunger 351 moves downward (shown by arrow $m_{TD}$), thus moving away from the rotational locus of the holding lever 327. At this time, the holding lever 327 is unlocked and allowed to pivot, and as a result, the spring-mounted end thereof moves away from the opening 307 by the biasing force of the spring $SP_3$.

Referring to FIG. 33, there are provided, on the solenoid 350, a toggle spring TSP for stabilizing the operation of the plunger 351 in both the upward and downward directions and a plunger switch $S_3$ for detecting the position of the plunger 351. The plunger switch $S_3$ turns on when the plunger 351 is moved into the rotational locus of the holding lever 327. At this time, the holding lever 327 is locked by the plunger 351 with the holding lever 327 locking the cover 301. The plunger switch $S_3$ is turned off when the plunger 351 moves away from the rotational locus of the holding lever 327. At this time, the holding lever 327 is unlocked from the plunger 351 with the holding lever 327 unlocking the cover 301. Because the plunger switch $S_3$ detects whether or not the cover 301 is locked by the holding lever 327, it can be decided whether or not it is necessary to unlock the cover 301.

Figure 34:
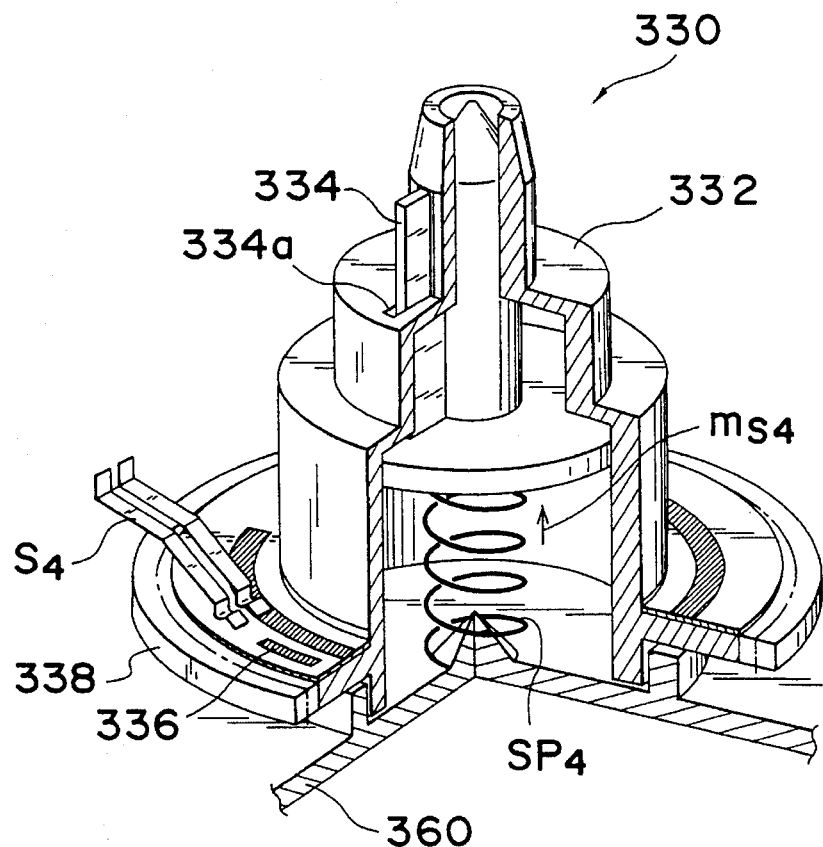
FIG. 34 is an enlarged, partially cutaway perspective view showing a thrust driver shown in FIG. 32.
Figure 35:
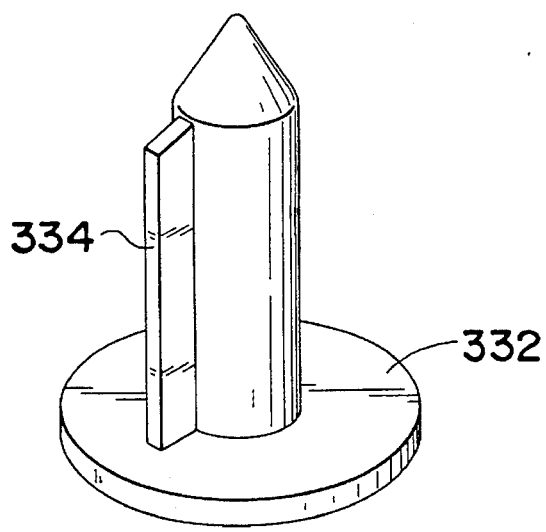
FIG. 35 is an enlarged perspective view of the thrust driver shown in FIG. 34.

As described previously, the thrust driver 330 is provided on the side of the bottom surface of the cartridge compartment 303 as shown in FIGS. 32 and 34. As shown in FIG. 34, the thrust driver 330 is an engaging member having the cylindrical engaging portion 332 and the key 334. FIG. 35 is a perspective view showing the key 334. In regard of this thrust driver 330, only the upper portion thereof (the portion shown in FIG. 32) projects above the bottom surface of the cartridge compartment 303 while the lower portion thereof is located below the cartridge compartment 303.

Figure 42:
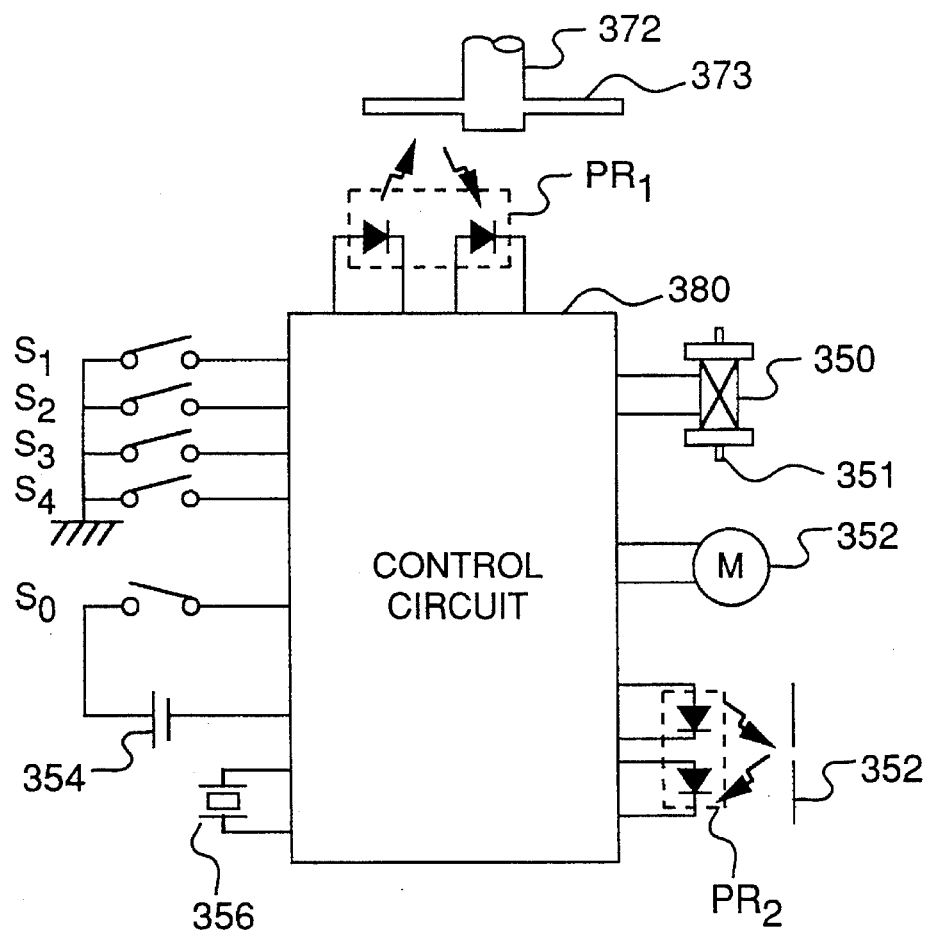
FIG. 42 is a block diagram showing a construction of a circuit of the camera shown in FIG. 32.

Under the bottom surface of the cartridge compartment 303, the cylindrical engaging portion 332 is rotatably positioned with respect to a case 360, a part of the camera body 302. An encoder switch $S_4$ is in contact with an encoder pattern 336 formed on the bottom of the engaging portion 332. A motor for winding/rewinding the film FL (not shown) indicated by a reference numeral 352 in FIG. 42 is provided below the bottom wall of the cartridge compartment 303. The rotation of the motor is transmitted to a gear 338 formed on the periphery of the bottom of the engaging portion 332. The rotationally angular position of the thrust driver 330 is detected by the encoder switch $S_4$ which slidably contacts the encoder pattern 336 at the time of rotation of the engaging portion 332.

As shown in FIG. 34, the key 334 is mounted in penetration into the engaging portion 332 with a part of the key 334 in engagement with a key hole 334a. The feeding motor allows the key 334 to rotate together with the engaging portion 332 while the key 334 is slidable only in a vertical direction or in the axial direction of the thrust driver 330. A spring $SP_4$ is mounted below the key 334 so as to bias the key 334 toward the cartridge compartment 303. The spring $SP_4$ is pressed downward when the cartridge 370 is put in the cartridge compartment 303. That is, the key 334 is biased upward in the direction shown by an arrow $ms_4$ by the spring $SP_4$. Therefore, unless the position of the key 334 coincides with that of the key way 335b of the interface 371b (See FIG. 37.) in loading the cartridge 370 in the cartridge compartment 303, the engaging portion 332 engages the engaging hole 333b of the interface 371b with the key 334 pressed downward by the cartridge 370.

As described above, one of the features of the fifth embodiment of the present invention is that in the camera having the cartridge spool driving mechanism for driving the film cartridge 370 which comprises the cartridge spool 372 having the rotation-unsymmetrical engaging hole composed of the sectionally circular shaft-engaging hole 333b and the key way 335b and which comprises the indication mechanism for displaying how the film FL is used by the user, i.e., whether the film FL is completely used, partly used or new, at the stop position of the cartridge spool 372, there is provided the thrust driver 330 which comprises the cylindrical engaging portion 332, which has a circular section and rotates, for positioning the cartridge spool 372 in engagement with the shaft-engaging hole 333b of the cartridge spool 372 and which comprises the key 334 biased in the axial direction of the cartridge spool 372 and rotating together with the engaging portion 332 in engagement with the key way 335b of the cartridge spool 372, thus transmitting the rotation of the engaging portion 332 to the cartridge spool 372. This construction makes sure that the cartridge 370 is stabilized in the cartridge compartment 303 and that the thrust driver 330 reliably engages the cartridge spool 372, thus driving the cartridge spool 372 stably and reliably.

As described above, the cartridge compartment cover 301 has the holding shaft 306 (See FIG. 6.) which engages the shaft-engaging hole 333a of the interface 371a of the cartridge 370, thus holding the cartridge 370 in position with respect to the cover 301. Consequently, the cartridge spool 372 is prevented from being shaken and feeds the film FL with a load applied thereto uniformly, thus sawing energy and preventing the occurrence of troubles. The holding shaft 306 may be formed on the bottom of the cartridge compartment 303 and the thrust driver 330 may be formed on the side of the cover 301.

As shown in FIGS. 32 and 33, the unlocking driver 340 is formed on the bottom surface of the main body 302. The unlocking driver 340 engages the interface 374b, thereby unlocking the light-intercepting door 375; i.e., the unlocking driver 340 unlocks the interface 374b from the locking claw 379. The unlocking driver 340 is rotatable in a predetermined angular range corresponding to the range of the opening/closing operation (shown by the arrows $m_O$ and $m_c$ of FIG. 40) of the door 375.

As shown in FIG. 33, a return spring $RSP_1$ biases the unlocking driver 340 in a direction shown by an arrow $m_{R1}$, in which the door 375 is closed, thus returning the unlocking driver 340 to a predetermined initial position thereof. When the interface 374b rotates the unlocking driver 340 against the biasing force of the return spring $RSP_1$, a projection 343 of a cam 342 rotating together with the unlocking driver 340 turns off a switch $S_2$. Accordingly, the switch $S_2$ detects the rotational stop position of the unlocking driver 340. That is, when the switch $S_2$ is turned off, the cartridge 370 is put in the cartridge compartment 303 and the cover 301 is closed, and it is detected that the door 375 is opened. When the switch $S_2$ is turned on, other states are detected.

The driver 310 for opening the door 375 is provided on the cover 301, as shown in FIGS. 32 and 33. The driver 310 is rotatable in a predetermined angular range corresponding to the range of the opening/closing operation (shown by the arrows $m_O$ and $m_c$ of FIG. 40) of the door 375. As shown in FIG. 33, a return spring $RSP_2$ biases the driver 310 in the direction shown by an arrow $m_{R2}$ in which the light-intercepting door 375 is closed, thus returning the driver 310 to the predetermined initial position.

A transmission arm 312 (See FIG. 33.) rotating together with the driver 310 is provided on the upper end of the driver 310. As shown in FIGS. 32 and 33, the end of the arm 312 projects through an opening 308 formed on a side surface of the cover 301 into a notch 321 made on the side wall of the operation lever 320, thus the arm 312 being pivoted at the time of sliding the operation lever 20 and rotating the driver 310. When the cartridge 370 is in the cartridge compartment 303, the projections 311 of the driver 310 engage the grooves 377a and 378a of the interface 374a. As a result, the rotation of the driver 310 is transmitted to the unlocking driver 340 via the shaft 375a of the door 375 shown in FIG. 40.

In the fifth embodiment, the driver 310 is disposed on the cover 310, and the driving force of the driver 310 is transmitted to the unlocking driver 340 via the shaft 375a of the door 375. Because it is unnecessary to provide a special connecting member on the holding lever 327 for locking the cover 301 when it is closed, even though the holding lever 327 is operated by the driving source for opening and closing the light-intercepting door 375, such a problem as the camera's becoming large-sized is prevented. Further, because the driving source for opening and closing the light-intercepting door 375 is interlocked with the cover-locking mechanism, the cover 301 is prevented from being opened with the door 375 being open. As described above, although the unlocking driver 340 is operated by the driving force transmitted from the driver 310, the unlocking driver 340 is returned to the predetermined initial rotational angular position by the force of the return spring $RSP_1$ after the film cartridge 370 is taken out from the cartridge compartment 303. Therefore, it is unnecessary to drive only the unlocking driver 340.

As shown in FIG. 32, the photo reflector $PR_1$ is mounted on the bottom surface of the cartridge compartment 303. As described previously, the photo reflector $PR_1$ reads various kinds of film information from the bar code of the disc 373 which is rotated together with the cartridge spool 372 by the thrust driver 330.

FIG. 42 shows a circuit construction of the camera according to the fifth embodiment. In addition to the members already described, the camera has the circuit comprising a power source 354; a power switch $S_0$, a release switch $S_1$ for outputting a start signal of exposure; a photo reflector $PR_2$ for detecting the position of the film FL by means of the position of its perforations PF; a control circuit 380 for performing the control of the entire operation of the camera; a quartz oscillator 356 constituting a part of a clock generation circuit; and a timer. When the control circuit 380 is composed of a microcomputer, the timer can be constructed in a software manner in the microcomputer.

The operation from putting the cartridge 370 into the cartridge compartment 303 to taking it therefrom is described below, with an initial state that the cover 301 is open. The state shown in FIG. 32 illustrates the initial state, and while the state shown in FIG. 33 illustrates a state immediately before the cover 301 is closed with respect to the camera body 302.

As shown in FIG. 33, because the release lever 325 is biased by the spring $SP_2$ in the direction shown by the arrow $m_{S2}$, in the initial state, the projection 326a of the release lever 325 is within the range of the sliding movement of the operation lever 320, thus holding the operation lever 320 at the position shown in FIG. 33. The holding lever 327 is in contact with one end of the operation lever 320 by the biasing force of the spring $SP_3$. At this time, the holding lever 327 is out of the pivotal locus of the cover 301 which is opened or closed.

In the initial state, the plunger 351 is out of the rotational locus of the holding lever 327. That is, the plunger 351 is disposed at its downward position with the plunger switch $S_3$ being turned off. In the initial state, the vertical locus (shown by the arrows $m_{TD}$ and $m_{TV}$ in the figure) of the plunger 351 is sandwiched between the end of the holding lever 327 on which the spring $SP_3$ is mounted and the opening 307 of the cover 301.

In the initial state, by the biasing force (direction shown by the arrow $m_{R1}$) Of the return spring $RSP_1$, the unlocking driver 340 is kept in the position at which the unlocking driver 340 is able to engage the interface 374b of the cartridge 370 with the door 375 being closed. At this time, the switch $S_2$ is turned on, and by the biasing force of the return spring $RSP_2$, the driver 310 provided on the cover 301 is biased to the position at which the driver 310 is able to engage the interface 374a of the cartridge 370.

With this initial state, the cartridge 370 is put into the cartridge compartment 303. Similar to a thrust-type of cartridge disclosed in U.S. Pat. No. 4,998,123, the cartridge 370 is put into the cartridge compartment 303 by the drop-in loading method. The door 375 of the cartridge 370 put in the cartridge compartment 303 is completely closed as shown in FIG. 36, and the interface 374b is locked with the locking claw 379 engaging the groove 378b as shown in FIGS. 39 and 41. When the cartridge 370 is put into the cartridge compartment 303, the engaging portion 332 of the thrust driver 330 starts to engage the shaft-engaging hole 333b of the interface 371b is located with.

In the camera according to the fifth embodiment when the film FL is rewound into the cartridge 370, the rotational stop position of the thrust driver 330 is determined based on the rotational angular position thereof detected by the encoder switch $S_4$, and the cartridge spool 372 is set to the position corresponding to the display mark showing that all the frames of the film FL is exposed to light. According to the fifth embodiment, because the initial position of the thrust driver 330 is not set, the unused cartridge 370 is put into the cartridge compartment 303 with the above-described initial state. Further, similar to the cartridge as disclosed in U.S. Pat. No. 4,994,828, the cartridge 370 whose films FL are partly or completely exposed to light are prevented from being put into the cartridge compartment 303. Thus, only the unused cartridge 370 can be put into the cartridge compartment 303. Hence, the engaging portion 332 of the thrust driver 330 engages the engaging hole 333b, but the key 334 does not engage the key way 335b of the interface 371b and is retracted inside the engaging portion 332 of the thrust driver 330. That is, the thrust driver 330 does not engage the interface 371b in the initial state.

Description is made below in more detail. Supposing that the rotational angular position of the thrust driver 330 is maintained after the cartridge 370 is taken out from the cartridge compartment 303, the key 334 would never engage the key way 335b of the interface 371b when a new cartridge 370 is put into the cartridge compartment 303. Or, even though the key 334 and the key way 335b are at a relative position at which the key 334 is able to engage the key way 335b, there is a possibility that the former does not engage the latter because the clearance therebetween is small.

In order to solve this inconvenience, the shaft-engaging hole 333b of the cartridge 370 can be engaged by the engaging portion 332 of the thrust driver 330, with the key 334 being retracted inside the engaging portion 332 and with the thrust driver 330 and the interface 371b of the cartridge 370 being disengaging from each other at the time when the cartridge 370 is put inside the cartridge compartment 303. Thus, the user can put the cartridge 370 into the cartridge compartment 303 without worrying about the relative position between the key 334 and the key way 335b. The reason why only the key 334 is retracted is that the absolute volume to be retracted is smaller than that of a fork, corresponding to the thrust driver 330, according to a conventional 135-type (Japanese Laid-Open Patent Publication No. 3-135536). Even though the key 334 is in the state that it is retracted, the engaging portion 332 of the thrust driver 330 can engage the shaft-engaging hole 333b of the cartridge 370 reliably. Therefore, the cartridge spool 372 or the cartridge 370 is kept in position with respect to the cartridge compartment 303 stably.

After the cartridge 370 is put in the cartridge compartment 303, the unlocking driver 340 engages the interface 374b. As described previously, the stop position of the unlocking driver 340 is set at the initial position by the return spring $RSP_1$. In the initial state, the position of each projection 341 coincides with the position of each groove 377b and 378b of the interface 374b when the light-intercepting door 375 is in the closed state. When the projections 341 of the unlocking driver 340 are inserted into the grooves 377b and 378b of the interface 374b of the cartridge 370, one of the projections 341 of the unlocking driver 340 elastically deforms the locking claw 379 which locks the interface 374b at the groove 378b, thus discharging the locking claw 379 from the groove 378b. Consequently, the interface 374b becomes rotatable in the direction shown by the arrow $m_0$ (See FIG. 39.). As a result, the door 375 integrated with the interface 374b can be opened as shown in FIG. 40.

Then, if the user starts closing the cover 301, the holding shaft 306 starts to engage the interface 371a, and then the driver 310 starts to engage the interface 374a. When the cover 301 is pressed downward, the transmission arm 312 of the driver 310 which engages the interface 371a moves into the notch 321 formed on the operation lever 320 as shown in FIG. 33. Then, the pin 304 mounted on the camera body 302 engages the positioning hole 305 formed in the cover 301 to position the cover 301 with respect to the camera body 302, and at the same time, a part of the cover 301 presses the projection 326b of the release lever 325 downward against the biasing force (exerting in the direction shown by the arrow $m_{S2}$ of FIG. 33) of the spring $SP_2$.

As a result, the projection 326a of the release lever 325 moves out of the range of the sliding movement of the operation lever 320, and the operation lever 320 slides immediately due to the biasing force of the spring $SP_1$. At the same time, one end of the operation lever 320 presses the holding lever 327 to make the holding lever 327 rotate counterclockwise in FIG. 33. As a result, one end (end at which the spring $SP_3$ is fixed) of the holding lever 327 enters the holding opening 307 of the cover 301, thus keeping the cover 301 in the closed state. Therefore, the end of the holding lever 327 is positioned on the side of the opening 307 with respect to the vertical movable locus (direction shown by the arrows $m_{TU}$ and $m_{TD}$ of FIG. 33) of the plunger 351. The holding lever 327 whose one end enters the holding opening 307 of the cover 301 is shown by the broken line in FIG. 33.

An inside wall surface of the notch 321 of the operation lever 320 is brought into contact with the arm 312 to rotate the driver 310. The driver 310 causes the light-intercepting door 375 of the cartridge 370 to be opened via the interface 374a, due to the rotation thereof. At the same time, the interface 374b, the unlocking driver 340 and the cam 342 integral also rotate, and the projection 343 of the cam 342 turns off the detection switch $S_2$ due to the rotation of the cam 342.

When the detection switches $S_2$ is turned off, the solenoid 350 is positively energized (step #330 in the flowchart of FIG. 44 described later) by the control circuit 380. As a result, the plunger 351 moves upward (direction shown by the arrow $m_{TU}$ Of FIG. 33) to enter the rotational locus of the holding lever 327. Because this state is kept by the toggle spring TSP, the cover 301 is kept closed and locked with respect to the camera body 302, and the cover cannot be opened even though the operation lever 320 is operated as far as the solenoid 350 is not negatively energized.

If the holding lever 327 is not fixed by the plunger 351, the driver 310 drives the interface 371a to enclose the door 375 according to the rotation of the transmission arm 312 when the operation lever 320 is returned to the original position (See FIG. 33.). If the film FL is fed out from the outer shell 376 of the cartridge 370, the film FL is exposed to light if the cover 301 is open, even though the door 375 is closed to a certain extent. Also, if the cartridge 370 is taken out of the cartridge compartment 303 with the film FL being outside the outer shell 376 of the cartridge 370, the film FL is damaged. In order to solve these problems, the plunger 351 locks the holding lever 327 so as to prevent the movement of the holding lever 327 locking the cover 301.

As described above, one of the features of the fifth embodiment of the present invention is that in the camera having the driving mechanism for driving the light-intercepting door of the film cartridge 370 which comprises the light-intercepting door 375 for preventing the film FL, at the entrance/exit thereof inside the cartridge 370, from being exposed to light; a pair of interfaces 374a and 374b, for opening and closing the light-intercepting door 375, disposed at both ends of the door 375; and a locking claw 379 for preventing the door 375 from being opened and closed, there is provided the unlocking driver 340, provided on the bottom of the cartridge compartment 303 into which the film cartridge 370 is put, for disengaging the locking claw 379 from the interface 374b with the unlocking driver engaging the interface 374b; the return spring $RSP_1$ for setting the unlocking driver 340 to the initial rotational position when the unlocking driver 340 does not engage the interface 374b of the cartridge 370; and the driver 310, provided on the cartridge compartment cover 301 for closing the cartridge compartment 303 and engaging the interface 374a when the locking claw 379 is unlocked from the interface 374b, constructed so that the light-intercepting door 375 is opened at the time of closing the cover 301 and that the door 375 is closed at the time of opening the cover 301.

Because the driver 310 for opening/closing the door 375 is mounted on the cover 301, the driving source for driving the light-intercepting door 375 of the cartridge 370 can be gotten from the driving source for driving the cover 301. The return spring $RSP_1$ returns the unlocking driver 340 to the initial rotational position, and the rotation of the driver 310 is transmitted to the unlocking driver 340 via the shaft 375a of the door 375. Accordingly, it is unnecessary to provide a special member for transmitting the driving force to the unlocking driver 340, and it is possible to make the driving mechanism for driving the light-intercepting door small and compact.

Then, the control circuit 380 executes the initial loading (step #340 of FIG. 44, sub-routine shown in FIG. 45 or FIG. 46) which will be described later. The initial loading means the setting of a frame to be initially exposed to light to the photographing position by moving the film. First, a thrust operation of thrusting the film FL is started by driving the feeding motor 352 forward. In the state in which the key 334 does not engage the key way 335b, frictional resistance is small; therefore, the cartridge spool 372 as well as the outer shell 376 hardly rotates until the key 334 engages the key way 335b of the interface 371b, even though the thrust driver 330 rotates. Because neither the interface 371b nor the thrust driver 330 is rotation-symmetrical, the thrust driver 330 engages the engaging hole 333b of the interface 371b only at the predetermined rotational angular position. Therefore, after the film is rewound into the cartridge 370, it does not occur that the stop position of the cartridge spool 372 dislocate from the predetermined stop position thereof.

When the key 334 engages the key way 335b by a control described later of the drive of the feeding motor 352, a normal initial loading starts, i.e., the first frame (See FIG. 43.) detected the photo reflector $PR_2$ is set at the photographing position.

A small load is applied to the feeding motor 352 because the cartridge spool 372 is supported by the thrust driver 330 and the shaft 306 of the cover 301 at a high accuracy from the time at which the thrust operation starts until the time at which the film FL is rewound into the cartridge 370.

Figure 44:
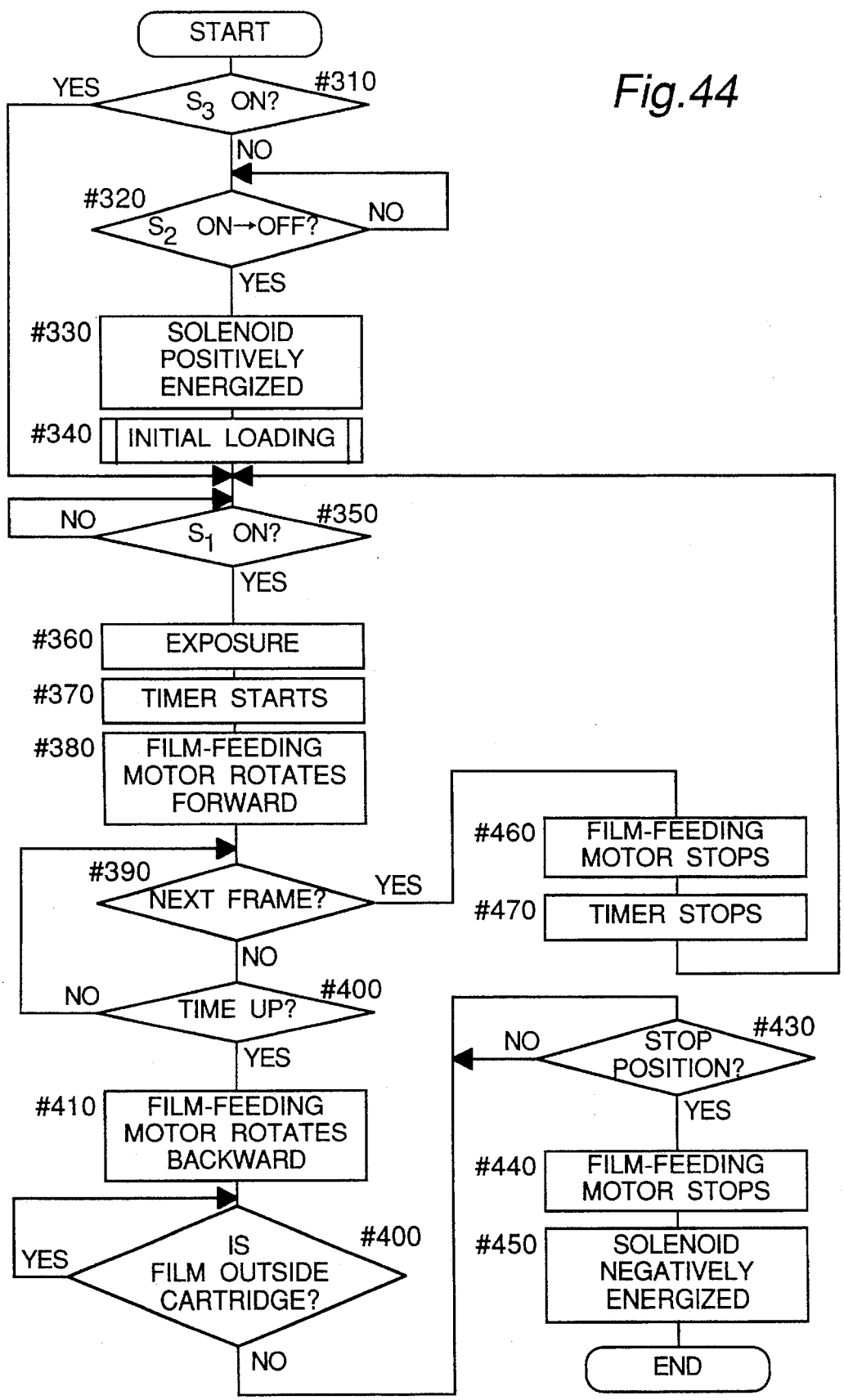
FIG. 44 is a flowchart showing a sequence of the camera.

For each shutter release, an exposure operation of exposing a frame to light (exposure operation to be performed when it is decided that the release switch $S_1$ is turned on at step #350 of FIG. 44) and an operation of feeding the frame forward are repeatedly performed until the last frame is exposed to light. When the last frame is detected by the photo reflector $PR_2$, the feeding motor 352 is rotated backward to rewind the film FL. After the photo reflector $PR_2$ detects that the film FL is rewound into the cartridge 370, the thrust driver 330 is controlled to be stopped. When the encoder switch $S_4$ detects the predetermined rotational angular position of the thrust driver 330, the control circuit 380 stops the feeding motor 352. Then, the solenoid 350 is energized negatively to move the plunger 351 downward (direction shown by the arrow $m_{TD}$ in FIG. 33) away from the rotational locus of the holding lever 327. At this time, the plunger switch $S_3$ is turned off again. In this state, the cover 301 can be opened or closed by operating the operation lever 320.

As described above, one of the features of the fifth embodiment of the present invention is that in the camera having the cover-locking mechanism for locking the cartridge compartment cover 301 in which the film FL of the cartridge 370 having the light-intercepting door 375 at the entrance/exit of the film FL is moved with the cover 301 being closed, there is provided the holding lever 327, interlocked with the cover-closing operation, which keeps the cover 301 closed; the detection switch $S_2$ for detecting whether the light-intercepting door 375 is opened or closed; the photo reflector $PR_2$ for detecting the movement and position of the film FL; the plunger 351, functioning as the locking means, which moves into the rotational locus of the holding lever 327 when the cover 301 is closed, thus limiting the movement of the holding lever 327 to keep closing the cover 301; and the control circuit 380 which prohibits the plunger 351 from unlocking the holding lever 327 keeping the cover 301 closed when the switch $S_2$ detects that the light-intercepting door 375 is opened, and which allows the plunger 351 to unlock the holding lever 327 keeping the cover 301 closed when the photo reflector $PR_2$ detects that the film FL is rewound into the 10 film cartridge 370.

Because the decision of permitting or prohibiting the operation of unlocking the holding lever 327 is made based on a result obtained when the film FL is not out of the cartridge 370, the film FL is never exposed to light. This construction prevents the film FL in the cartridge compartment 303 from being exposed to light by opening the cover 301 carelessly.

If the operation lever 320 is moved in the direction against the biasing force of the spring $SP_1$, the driver 310 is rotated via the arm 312, thus closing the door 375 of the cartridge 370. When the door 375 is completely closed, the unlocking driver 340 is returned to the initial position by the interface 374b, and the switch $S_2$ is turned on again due to the rotation of the cam 342.

Furthermore, when the operation lever 320 moves, it gets away from the pivotal range of the release lever 325, and the release lever 325 is pivoted into the movement range of the operation lever 320 by the spring $SP_2$. At the same time, one end of the holding lever 327 comes out from the opening 307 of the cover 301. The cover 301 unlocked from the holding lever 327 is biased upward by the projection 326b of the release lever 325 and opened a little bit. Then, the cartridge 370 can be taken out from the cartridge compartment 303 by opening the cover 301.

The control operation of the film winding mechanism executed by the control circuit 380 is described below with reference to the flowchart shown in FIG. 44. When the power switch $S_0$ is turned on, the control operation shown in FIG. 44 starts. First, it is decided at step #310 whether or not the plunger switch $S_3$ is ON. If the plunger switch $S_3$ is ON, it is decided that the cartridge 370 is put in the cartridge compartment 303. That is, as described previously, when the plunger switch $S_3$ is ON, the plunger 351 is moved at the upward position, thus positioning one end of the holding lever 327 in the holding opening 307; namely, the cover 301 is kept closed by the holding lever 327 and is prevented from being opened, with the cartridge 370 being accommodated in the cartridge compartment 303.

If it is decided that the switch $S_3$ is ON at step #310, the program goes to step #350. If it is decided at step #310 that the plunger switch $S_3$ is OFF, the program goes to step #320 at which the CPU waits for the switch $S_2$ being switched from ON to OFF. At step #330, the solenoid 350 is energized positively (plunger 351 moves in the direction shown by the arrow $m_{TU}$ in FIG. 33). The switching of the switch $S_2$ from ON to OFF means that the cartridge 370 is inside the cartridge compartment 303 and that the light-intercepting door 375 is opened. That is, as described previously, when the cartridge 370 is put into the cartridge compartment 303, the driver 310 rotates the cam 342 via the shaft 375a of the door 375 and the unlocking driver 340, and as a result the projection 343 of the cam 342 turns off the switch $S_2$.

Figure 45:
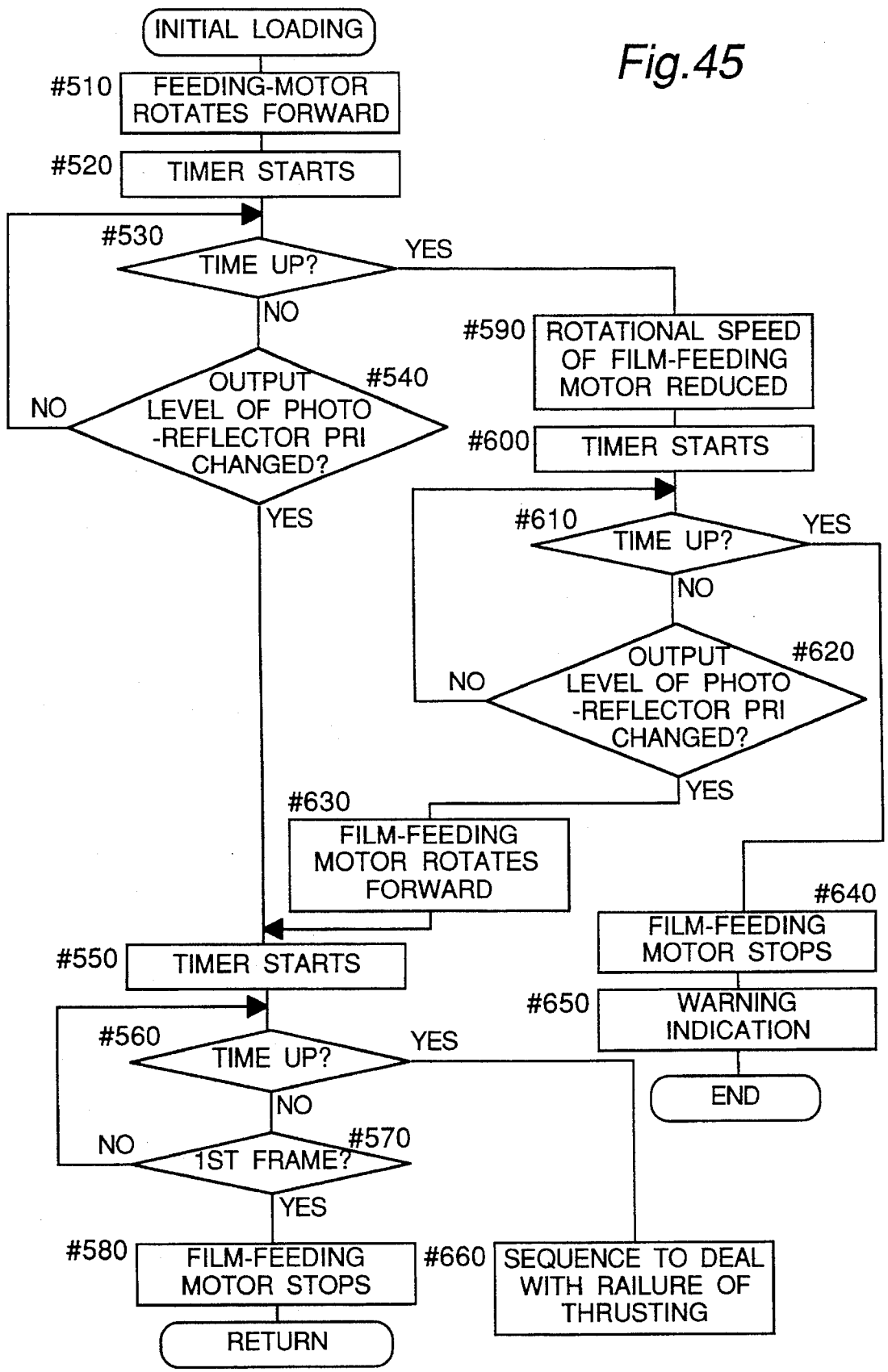
FIG. 45 is a flowchart showing a subroutine of an initial loading operation shown in the flowchart of FIG. 44.

At step #340, the initial loading shown in FIG. 45, which will be described later, is performed. The first frame of the film FL is set at the predetermined position in the initial loading, and then an operation for exposing the frame to light is executed at step #360 after the release switch $S_1$ is turned on at step #350. Then, the timer is started at step #370, and the feeding motor 352 is rotated forward at step #380.

As described above, one of the features of the fifth embodiment of the present invention is that in the camera in which the film FL of the cartridge 370 having the cartridge spool 372 and the light-intercepting door 375 at the entrance/exit of the film FL is moved with the cover 301 being closed, there is provided the feeding motor 352 for rotating the cartridge spool 372; the driver 310 for driving the door 375; the switch $S_2$ for detecting that the driver 310 opens the light-intercepting door 375; and the control circuit 380 for causing the feeding motor 352 to start the thrust operation for thrusting the film FL when the switch $S_2$ detects that the door 375 is opened.

According to this construction, the control circuit 380 does not allow the feeding motor 352 to start the thrust operation until the switch $S_2$ detects that the door 375 is opened. That is, the thrust operation is not started before the door 375 is opened. Accordingly, the start of the thrust operation of the film FL accommodated in the cartridge 370 is prevented with the light-intercepting door 375 of the cartridge being closed.

At step #390, the number of perforations PF is counted by the photo reflector $PR_2$ to decide whether or not there is a next frame of the film FL. If there is, the feeding motor 352 is stopped at step #460, and the timer is stopped at step #470. Then, the program returns to step #350 to repeat the same photographing operation.

If it is detected that there is no next frame of the film FL at step #390, it is decided at step #400 whether or not a predetermined time elapses from the starting time of the timer. The reason why such a decision is required at step #400 is that because the photo reflector $PR_2$ detects no more perforations after the last frame passes the photo reflector $PR_2$, it takes more time than the predetermined time period needed for feeding one frame. If time is not up at step #400, the program goes back to step #390 at which the CPU waits for the time being up. Meanwhile, if it is decided that time is up at step #400, the feeding motor 352 is rotated backward to rewind the film FL into the cartridge 370.

At step #420, the perforations PF are detected by the photo reflector $PR_2$ to decide whether or not all the film FL is rewound into the cartridge 370. If it is decided that the film FL is rewound into the cartridge 370, the program goes to step #430.

At step #430, it is decided whether or not the interfaces 371a and 371b come to the predetermined stop position by reading the encoder pattern 336 by the encoder switch $S_4$ while the cartridge spool 372 is rotated with all the film FL being rewound inside the film cartridge 370. If it is decided that the interfaces 371a, 371b come to the stop position, the feeding motor 352 is stopped at step #440.

At step #450, the solenoid 350 is energized negatively to unlock the holding lever 327 from the plunger 351. When the operation lever 320 is slid against the biasing force of the spring $SP_m$, the spring $SP_3$ biases the holding lever 327 to move away from the opening 307, thus unlocking the cover 301 with respect to the camera body 302.

The sub-routine (corresponding to step #340 of FIG. 44) of the initial loading is described below with reference to FIG. 45. First, at step #510, the feeding motor 352 is rotated forward, and the thrust operation is started. Then, at step #520, the timer is started to count time the thrust driver 330 starts rotating. It is decided at step #530 whether or not the predetermined time period elapses from the starting time of the timer. In this embodiment, the decision of the time out is adopted, based upon the decision that the predetermined period of time elapses after the timer's starting; however, it is also possible to adopt a decision based on whether or not the thrust driver 330 rotates a predetermined number of times after the start of its rotation. In this case, the number of its rotation can be counted by reading the encoder pattern 336 by the encoder switch $S_4$.

If it is decided that the time is not out at step #530, then, it is decided at step #540 whether or not the level of the output of the photo reflector $PR_1$ which reads the information of the disc 373 changes. This is because if the disc 373 does not rotate, the level of the output of the photo reflector $PR_1$ does not change as well. If it is decided that the level does not change at step #540, the program returns to step #530 to perform the same operation of step #530 and #540 repeatedly. If the level of the output of the photo reflector $PR_1$ changes, the program goes to step #550.

As described above, the bar code shown on the bar code disc 373 is read upon starting of the thrust operation. Unless the key 334 engages the key way 335b, the disc 373 does not rotate; Therefore, the output level of the photo reflector $PR_1$ does not change. That is, the fact that the output level of the photo reflector $PR_1$ does not change shows that the cartridge spool 372 is not in a predetermined rotational state, and thus it shows that the cartridge spool 372 and the thrust driver 330 are not engaged with each other. In other words, that there is no change in the output level of the photo reflector $PR_1$ means that the thrust driver 330 rotates without engaging the interface 371b, and as a result the disc 373 does not rotate or rotate not at a predetermined rotational speed. It is also possible to decide at step #540 that the thrust driver 330 does not engage with the interface 371b of the cartridge 370 by detecting that the rotational speed of the disc 373 is different from that of the thrust driver 330, on the basis of the change in the output level of the photo reflector $PR_1$. But in this fifth embodiment, this latter case is excluded, and their mutual engagement is described from whether or not the disk 373 is rotated.

If it is decided at step #530 that the predetermined time period elapses from the starting time of the timer, the rotational speed of the feeding motor 352 is reduced at step #590. When the interface 371b rotates without engaging the thrust driver 330, the key 334 is retracted inside the cylindrical engaging portion 332 of the thrust driver 330 with a condition that it is biased downward by the interface 371b of the film cartridge 370. The reason why the feeding motor 352 is driven at a reduced speed is because if the thrust driver 330 rotates at a high speed, it is difficult that the key 334 biased by the spring $SP_4$ engages the key way 335b of the cartridge 370. In other words, if the thrust driver 330 rotates at a slow speed, the key 334 engages the key way 335b easily.

According to the fifth embodiment, if the output level of the photo reflector $PR_1$ does not change a predetermined time after the thrust operation starts, the rotational speed of the feeding motor 352 is changed. That is, the rotational speed of the feeding motor 352 is reduced to make the key 334 engage with the key way 335b surely. The normal thrust operation is started if there is a change in the output level of the photo reflector $PR_1$. Such a control ensures the mutual engagement between the cartridge spool 372 and the thrust driver 330 after the cartridge 370 is put into the cartridge compartment 303.

In the camera, using the thrust-type of cartridge, according to the fifth embodiment, the key 334 and the key way 335b are smaller than those adopted in a conventional camera employing a film cartridge of 135-type, and the key 334 is not shaken greatly in the key way 335b. Therefore, even though the positions of both the key 334 and the key way 335b are coincident with each other, it is difficult for the key 334 to engage the key way 335b easily or there is a possibility that the former does not engage the latter. All these problems arises all the more because the interface 371b and the thrust driver 330 are rotation-unsymmetrical (there is only one mutual engaging position in one complete rotation) in order to decide the rotational stop position of the cartridge spool 372 for displaying that the cartridge is used. The reason why the key way 335b is constructed not to be loose with respect to the key 334 is to decide the rotational stop position of the cartridge spool 372 accurately and to reduce the load applied at the time of feeding the film FL. In order to allow the key 334 to be shaken in a small degree in the key way 335b, the engaging portion 332 is constructed to be inserted into the engaging hole 333b even though the key 334 and the key way 335b are not in mutual engagement with each other.

As described above, one of the features of the fifth embodiment of the present invention is that in the camera using the film cartridge 370 having the cartridge spool 372 recording information of the film FL and the bar code disk 373 rotating together with the spool 372, there is provided the film-winding mechanism which comprises the thrust driver 330, as an engaging member, engaging the cartridge spool 372 (See FIGS. 34 and 38.) to rotate and drive it; the feeding motor 352 (See FIG. 42.) for rotating the thrust driver 330; the photo reflector $PR_1$, serving as the reading means, for reading the information of the film FL recorded on the disc 373 and outputting the information of the film; and the control circuit 380 for controlling the feeding motor 352 so as to change the rotational speed of the thrust driver 330 if the output level of the photo reflector $PR_1$ does not change, even if a predetermined period of time passes or even if the thrust driver 330 rotates a predetermined number of times, after the starting time of the rotation of the thrust driver 330.

This construction allows a reliable engagement between the cartridge spool 372 and the thrust driver 330. Further, the camera is constructed so that the photo reflector PR$_1$ reads and outputs the information of the film FL recorded on the disc 373 rotating together with the cartridge spool 372; therefore, it is unnecessary to provide a member for detecting the rotational state of the cartridge spool 372. With this construction, it is possible to make the film-winding mechanism small and compact.

Then, the timer is started at step #600. Similarly to the operation performed at step #530, it is decided at step #610 whether a predetermined time of period elapses from the starting time of the timer. If time is not up, it is decided at step #620 whether the output level of the photo reflector PR$_1$ changes. This is because if the disc 373 does not rotate, the output level of the photo reflector PR$_1$ does not change. If it is decided at step #620 that the output level of the photo reflector PR$_1$ does not change, the program returns to step #610 to repeat the same operation as above. If the output level changes, the feeding motor 352 is rotated forward at step #630, and then the program goes to step #550. On the other hand, if it is decided at step #610 that the time is up, the feeding motor 352 is stopped at step #640, and a warning indication is made at step #650, and the operation terminates.

The timer is started at step #550, and then it is decided at step #560 whether or not the predetermined time of period elapses from the starting time of the timer. If it does, a known appropriate processing sequence for failure is executed at step #660. If it does not, the number of perforations of the first frame is counted by the photo reflector PR$_2$ at step #570 in order to decide whether the first frame is appropriately set at the photographing position. If the first frame is not appropriately set at the position, the program returns to steps #560 to repeat the same operation as above. Meanwhile, if it is decided at step #570 that the first frame is appropriately set, the feeding motor 352 is stopped at step #580. Then, the program returns.

As described above, in the initial loading operation according to the fifth embodiment, when the unused cartridge 370 is put into the cartridge compartment 303, the film is set at the predetermined position corresponding to the first frame. It is also possible to construct the camera in such a way that a frame of a film is set ready for photographing when a film cartridge whose film is rewound on the way before its compete use is put in the film cartridge compartment again. In this case, the camera can be constructed so that the stop position of the film is determined based on a comparison between a manually inputted value of the number of frames to be set ready for photographing or the set number of perforations calculated based on information recorded on the film surface at the time of photographing, and the number of perforations detected by the photo reflector PR$_2$.

Film information recorded on the disc 373 used to control exposure or the like is read by the photo reflector PR$_1$. This operation may be carried out during initial loading operation or each time photographing operation is performed.

Figure 46:
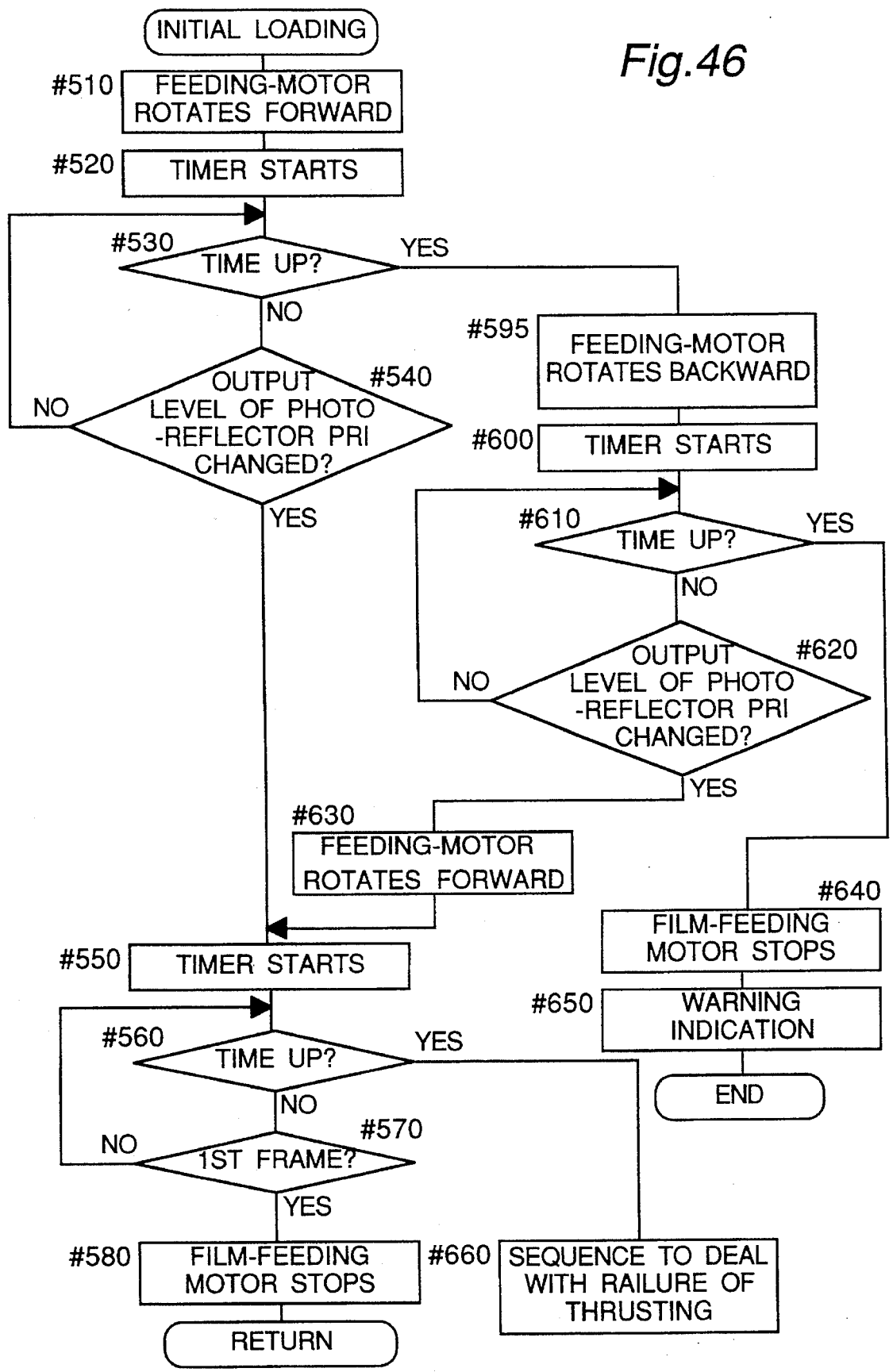
FIG. 46 is a flowchart according to a modification of the subroutine shown in FIG. 45.

FIG. 46 shows a subroutine of another initial loading applicable to the fifth embodiment. Except that step #590 in FIG. 45 is replaced by step #595, the subroutine shown in FIG. 46 is the same as that of FIG. 45. At step #595, as a means for changing the rotational state of the thrust driver 330, the feeding motor 352 is rotated backward to make the key 334 and the key way 335b engage with each other easily.

As described above, one of the features of the fifth embodiment of the present invention is that the feeding motor 352 driving the cartridge spool 372 to perform the thrust, operation for thrusting the film FL is controlled to start when the detecting means for detecting whether or not the light-intercepting door 375 is opened detects that the door 375 is opened. With this construction, it is possible to present the film FL from being thrust from the film cartridge 370 with the light-intercepting door 375 being closed when the film cartridge 370 is set inside the cartridge compartment 303. Therefore, the film FL is not damaged inside the compartment 303, or its malfunction is escaped.

A cover-locking mechanism according to a sixth embodiment of the present invention is described below with reference to FIGS. 47 through 55.

Figure 47:
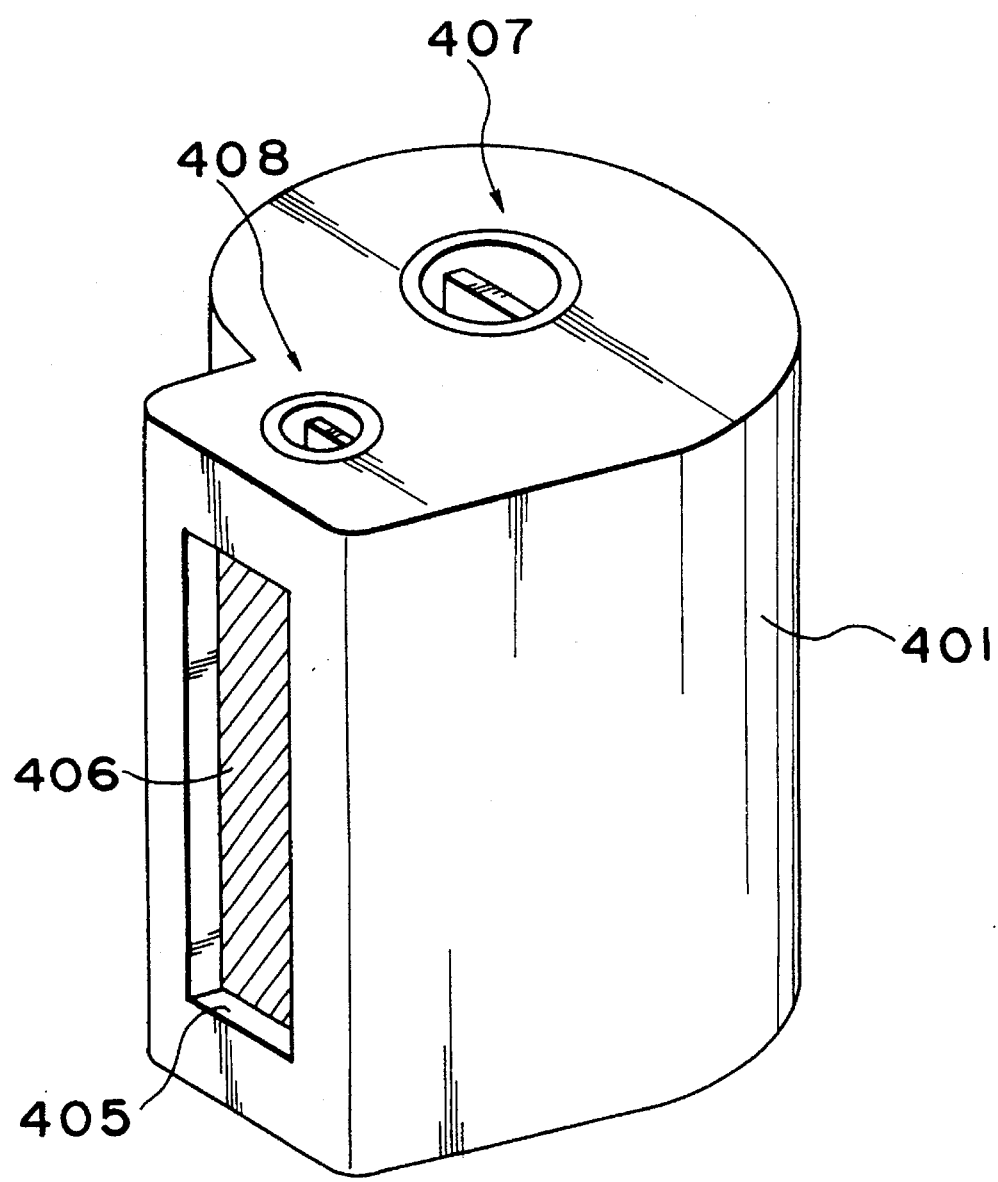
FIG. 47 is a perspective view showing a film cartridge with a light-intercepting door opened and closed by an opening/closing mechanism of a camera which has a cover-locking mechanism for locking a cartridge compartment cover according to a sixth embodiment of the present invention.
Figure 48:
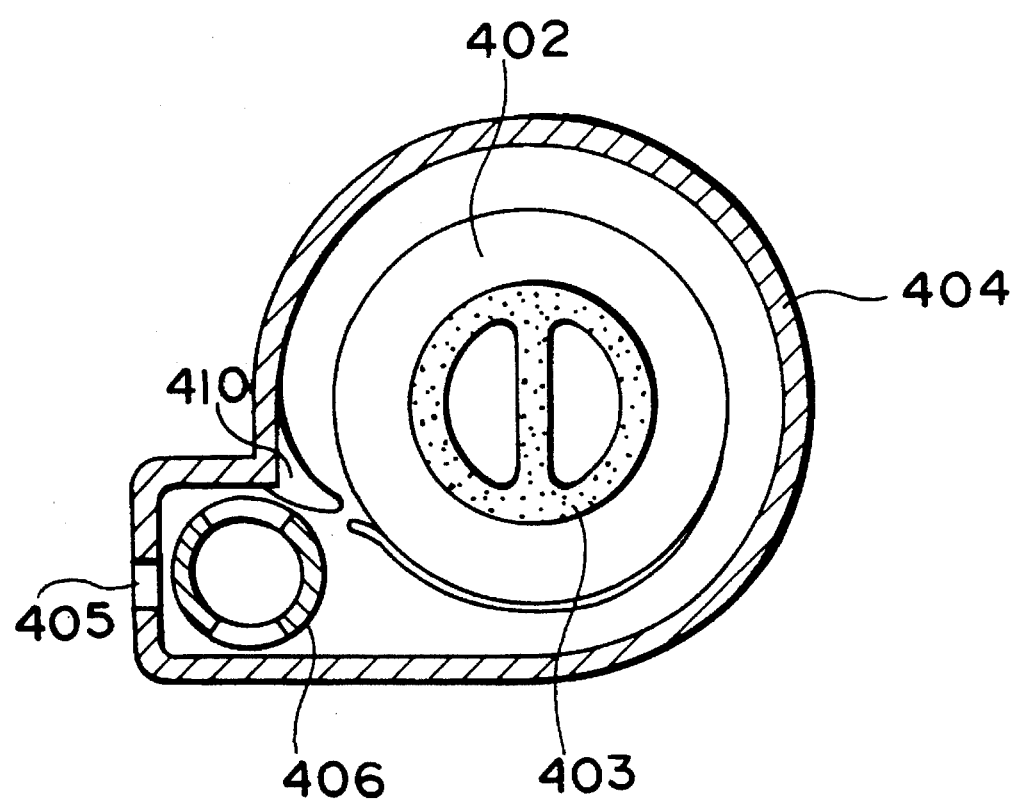
FIG. 48 is a sectional view, showing the film cartridge of FIG. 47, taken along a line approximately disposed at the center of the cartridge and perpendicular to the axis of its cartridge spool.
Figure 49:
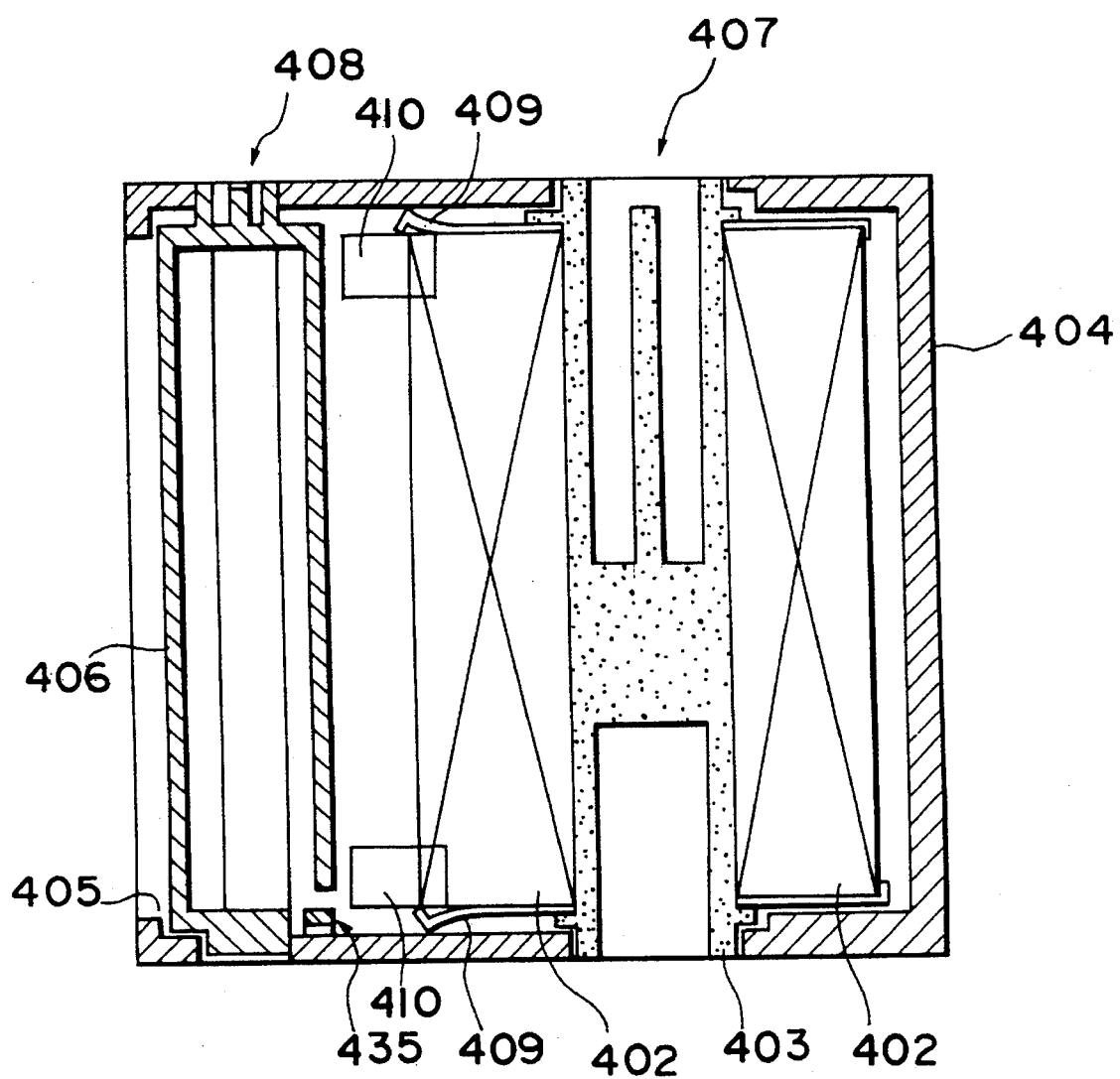
FIG. 49 is a sectional view, showing the film cartridge of FIG. 47, taken along a line parallel to the axial direction of the film cartridge.

FIG. 47 is a perspective view showing a film cartridge having a light-intercepting door which is opened and closed by an opening/closing mechanism of a camera having a cover-locking mechanism according to the sixth embodiment of the present invention. FIG. 48 is a sectional view, showing the film cartridge of FIG. 47, taken along a line which is approximately disposed at the center of the film cartridge and is perpendicular to the axis of a cartridge spool. FIG. 49 is a sectional view, showing the film cartridge of FIG. 47, taken along a line in the axial direction of the film cartridge. In the cartridge 401, a film 402 wound around a cartridge spool 403 is accommodated inside an outer shell 404. A light-intercepting door 406 is rotatably supported inside a film entrance/exit 405. On one end surface of the cartridge 401 are formed a driven interface 407 for feeding the film 402 by rotating the spool 403 and a driven interface 408 for opening and closing the film entrance/exit 405 by rotating the door 406.

Referring to FIG. 49, on the upper and lower end surfaces of the film 402 wound around the spool 403 is installed, a plate-like circumscribed disc 409 which is made of an elastic material and has a vertical edge formed by bending the periphery thereof at an angle of approximately 90°. The film 402 is in contact with the inner peripheral surface of the vertical edge because of its loosening in a circumferential direction due to its elasticity. The vertical edge of the disc 409 is flexed by a claw 410 projecting in the vicinity of the film entrance/exit 405 from the outer shell 404. The film 402 is allowed to be fed out from the flexed portion via the film entrance/exit 405 of the outer shell 404. The claw 410 flexes the vertical edge of the disc 409 and picks up the leading end of the film 402, thus guiding the film 402 toward the film entrance/exit 405.

In the outer shell 404 is formed a click projection 435 by which the light-intercepting door 406 is clicked and held by the outer shell 404 when the interface 408 is driven to close the door 406. In this manner, the door 406 is reliably locked at the closed position and the film 402 accommodated in the outer shell 404 can be prevented from being exposed to light.

Figure 50:
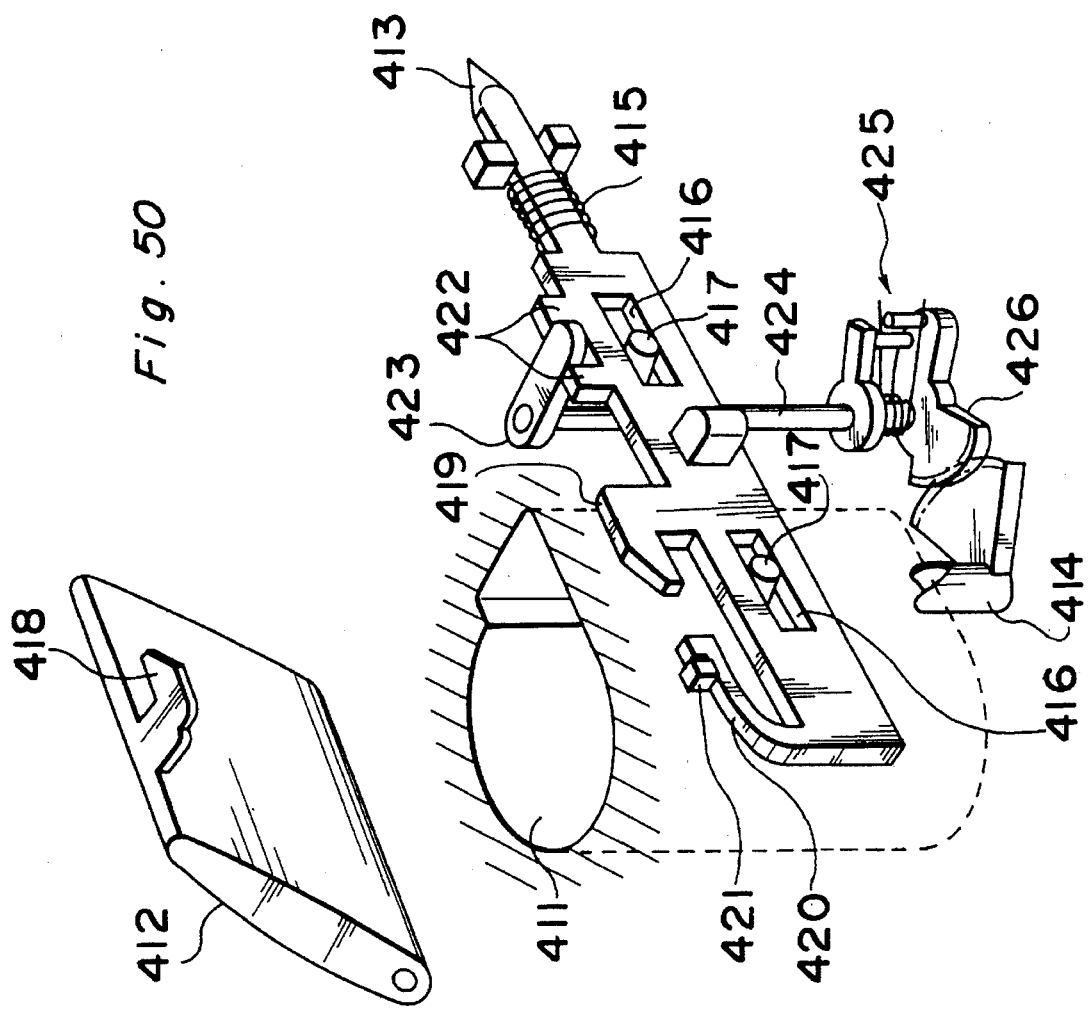
FIG. 50 is a perspective view, showing the cover-locking mechanism, viewed from the back side of the camera.

FIG. 50 is a perspective view, showing a mechanism for opening and closing a cartridge compartment cover, viewed from the back side of the camera in which the mechanism is provided. The mechanism for opening and closing the light-intercepting door 406 of the cartridge 401 put in a cartridge compartment 411 is disposed in the rear (front in FIG. 50) of the cartridge compartment 411. The mechanism is interlocked with a mechanism for opening and closing a cover 412 of the cartridge compartment 411.

More specifically, in the rear side of the cartridge compartment 411 is provided a cover-locking lever 413 (for locking the cover 412 at the closed position) extending along a film-feeding direction that the film 402 is fed. The cover-locking lever 413 is slidable along the feeding direction of the film 402. The sliding motion of the cover-locking lever 413 allows the driving force of the driving source to be transmitted to a driving interface 414 for opening and closing the light-intercepting door 406. The interface 414 engages the interface 408 of the film cartridge 401, thus transmitting the driving force thereto. In this manner, the door 406 is opened and closed. A spring 415 biases the cover-locking lever 413 in a direction (toward the left in FIG. 50) in which the cover 412 disposed at the closed position is locked. Referring to FIG. 50, reference numeral 416 denotes a guide groove for guiding the cover-locking lever 413 in its sliding direction, and 417 denotes a pin located in the guide groove 416.

A claw 419 formed on the cover-locking lever 413 engages a hook 418 formed on the cover 412, when the cover 412 is at a position at which the cartridge compartment 411 is closed thereby.

An arm 420 elastically deformable is formed at one end of the cover-locking lever 413. The arm 420 engages a fixed projection 421 formed in the camera body, thus holding the cover-locking lever 413 at a predetermined position against the biasing force of the spring 415. At the predetermined position, the claw 419 of the cover-locking lever 413 does not engage the hook 418 of the cover 412; i.e., the cover 412 is unlocked. An operation member not shown moves the cover-locking lever 413 to a predetermined position at which the cover 412 is unlocked from the camera body. In order to unlock the cover-locking lever 413 from the arm 420, the cover 412 is closed so that the hook 418 presses the tip portion of the arm 420. As a result, the tip portion of the arm 420 moves under and beyond the projection 421, thus moving the cover-locking lever 413 in the left direction in FIG. 50 by the biasing force of the spring 415. The hook 418 is constructed to unlock the arm 420 at the final stage of the operation of closing the cover 412.

A pair of projections 422 parallel with each other are formed upward from the cover-locking lever 413 in approximately the center thereof. A tip portion of a follower lever 423 is put between the projections 422, so that the follower lever 423 is driven when the cover-locking lever 413 is slid. The base of the driven lever 423 serves as an axis of the rotational motion thereof and is connected with the upper end of a shaft 424. A gear 426 is fixed to the shaft 424 at the lower end thereof via an overcharge spring mechanism 425.

Figure 51:
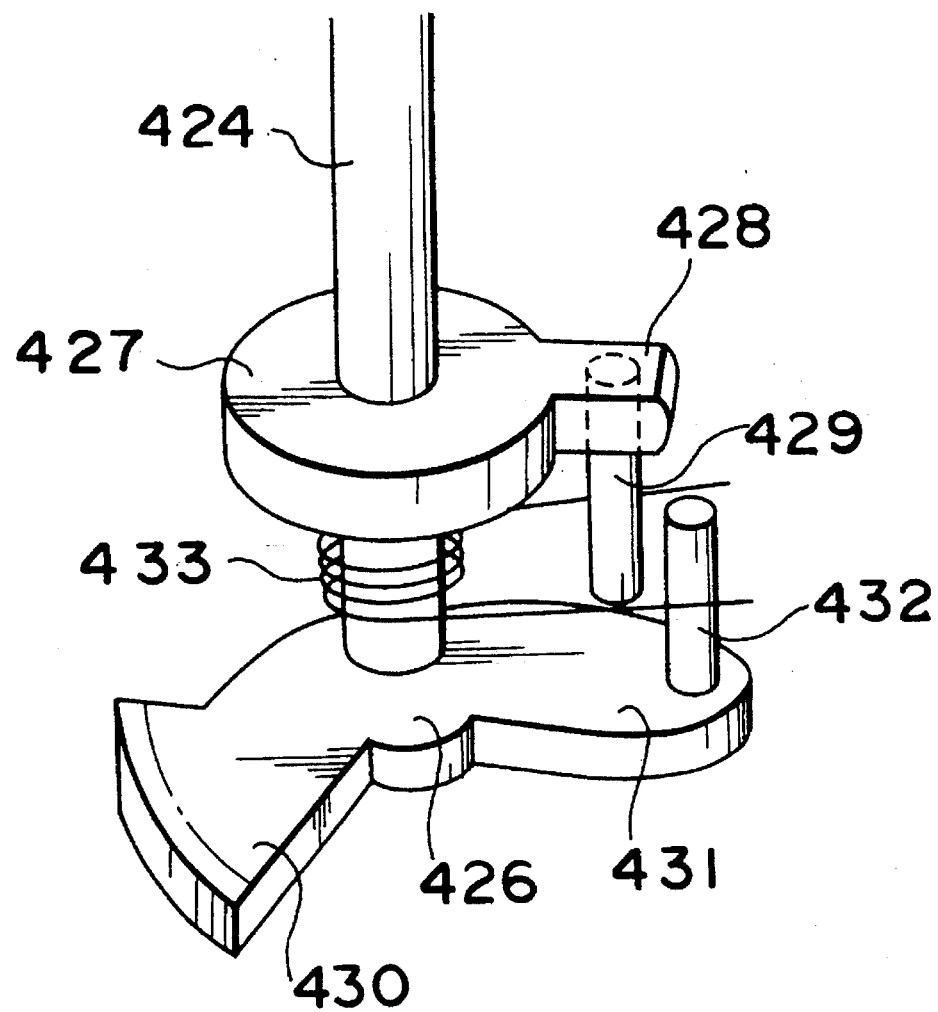
FIG. 51 is an enlarged perspective view showing an overcharge spring mechanism shown in FIG. 50.

The detailed construction of the overcharge spring mechanism 425 is shown in FIG. 51. A flange 427 is integrated with the shaft 424. An arm 428 extends radially from the periphery of the flange 427. A pin 429 projects downward from the arm 428. A gear 426 is rotatably mounted on the lower end of the shaft 424. The gear 426 is coaxial with the shaft 424 and has a teeth 430 formed thereon partially. On the gear 426, an extended portion 431 is formed opposite to the tooth 430 with respect to its axis. A pin 432 projects upward from the extended portion 431. A helical spring 433 is mounted around the shaft 424 between the flange 427 and the gear 426. Both ends of the helical spring 433 are fixed to the outer sides of the pins 429 and 432. That is, the pins 429 and 432 are sandwiched between the legs of the helical spring 433.

The biasing force of the spring 433 for sandwiching both pins 429 and 432 is constructed a bit to surpass a maximum click load of the cartridge 401, regarded as the highest load of loads of the cartridges 401 whose values vary among products. Upon receiving the rotational force of the shaft 424, the helical spring 433 exerts a rotational force on the gear 426. That is, if a force acting on the cover-locking lever 413 and trying to rotate the shaft 424 is greater than a predetermined force, the force is absorbed by the elastic deformation of the spring 433 and is not transmitted to the gear 426. That is, the gear 426 is not driven by an excessive force, and thus neither the driving interface 414 nor the interface 408 of the cartridge 401 is driven by an excessive force.

According to the above-described construction, when the cover-locking lever 413 slides to open or close the cover 412 of the cartridge compartment 411, the follower lever 423 and the shaft 424 rotate because the projections 422 are in engagement with the follower lever 423. The rotation of the shaft 424 is transmitted to the gear 426 via the overcharge spring mechanism 425. The rotation of the gear 426 causes the driving interface 414 engaging the gear 426 to be rotated. As a result, the door 406 is rotated to be opened or closed.

Figure 52:
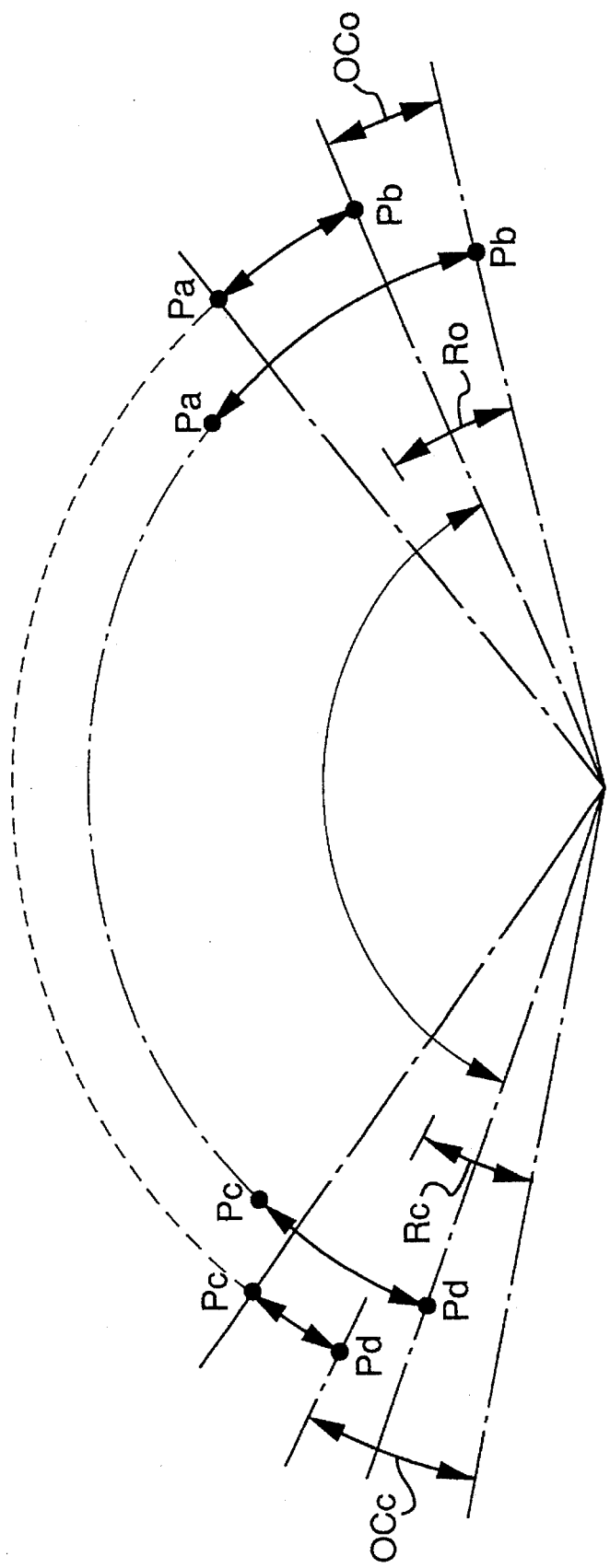
FIG. 52 is a graph showing a relationship between a rotational stroke range of a driving interface of the camera shown in FIG. 50 and that of a follower interface of the film cartridge shown in FIG. 47.

As shown in FIG. 52, the stroke of the rotation of the driving interface 414 caused by the sliding movement of the cover-locking lever 413 is set to be greater than is required, in consideration of nonuniformity or backlash in assembling accuracy of the driven interface 408 of the cartridge 401. The rotational stroke range of the driving interface 414 is shown by a narrow solid line; that of the interface 408 of the cartridge 401, with the highest opening/closing operation characteristics, selected from products thereof having nonuniformity in assembling accuracy is shown by a narrow one-dot chain line; and that of the interface 408, with the lowest opening/closing operation characteristics, selected therefrom is shown by a narrow broken line. In the figure, Pa is a point ensuring that the light-intercepting door 406 opens with respect to the film entrance/exit 405; Pb is a point at which the light-intercepting door 406 is completely opened with its opening motion finished; Pc is a point at which the click projection 435 of the light-intercepting door 406 passes an engaging portion of the outer shell 404 which engages the click projection 435; Pd is a point at which the light-intercepting door 406 is completely closed; Ro indicates a range of nonuniformity in the opening characteristics of the light-intercepting door 406; Rc indicates a range of nonuniformity in the closing characteristics of the door 406; OCo indicates a range corresponding to an overcharging amount of biasing force of the helical spring 433 generated at the time when the light-intercepting door 406 is opened; and OCc indicates a range corresponding to an overcharging amount thereof generated at the time when the door 406 is closed. The maximum overcharging amounts of biasing force of the spring 433 for compensating nonuniformity in the opening and closing characteristics of the light-intercepting door 406 are also shown by the reference characters OCo and OCc, respectively.

Supposing that a rotational stroke range of the driving interface 414 is set as shown in FIG. 52, an overstroke range is generated, at both sides of opening and closing the light-intercepting door 406, between the rotational stroke of the driving interface 414 and that of the interface 408 of the film cartridge 401. The over-stroke is, however, absorbed by the elastic deformation of the helical spring 433. This construction allows the gear 426 to start rotating behind a certain time after the cover-locking lever 413 starts sliding, due to the elastic deformation of the spring 433. Therefore, when the cover 412 is closed with the cartridge 401 being put in the cartridge compartment 411, the light-intercepting door 406 is opened only after the cover 412 is completely closed. This ensures that the film 402 of the cartridge 401 is exposed to light carelessly.

Figure 53:
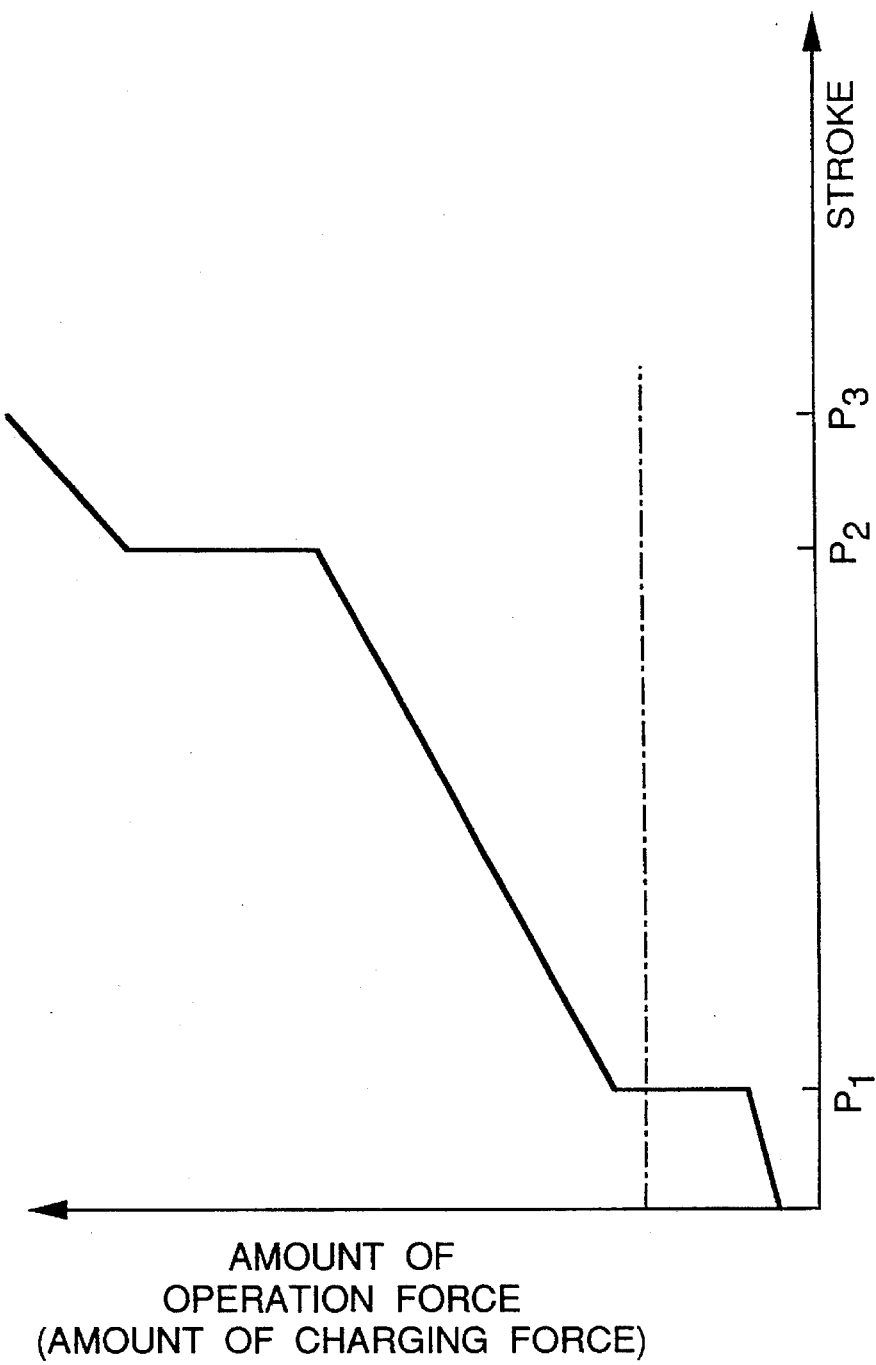
FIG. 53 is a graph showing a relationship between the rotational stroke of the driving interface shown in FIG. 50 and the amount of the operation force exerted thereon.

FIG. 53 shows the relationship between the rotational stroke of the driving interface 414 and the amount of the operation force exerted thereon. The rotational stroke of the driving interface 414 is plotted on the abscissa, and the amount of the operation force is plotted on the ordinate. One-dot chain line indicates a necessary minimum force to drive the interface 414. In the figure, $P_1$ indicates a point at which the overcharging ends in the closing direction of the interface 414; P2 indicates a point at which the overcharging starts in the opening direction thereof; and $P_3$ indicates a point at which the claw 419 of the cover-locking lever 413 completes engaging the hook 418 of the cartridge compartment cover 412.

Figure 54:
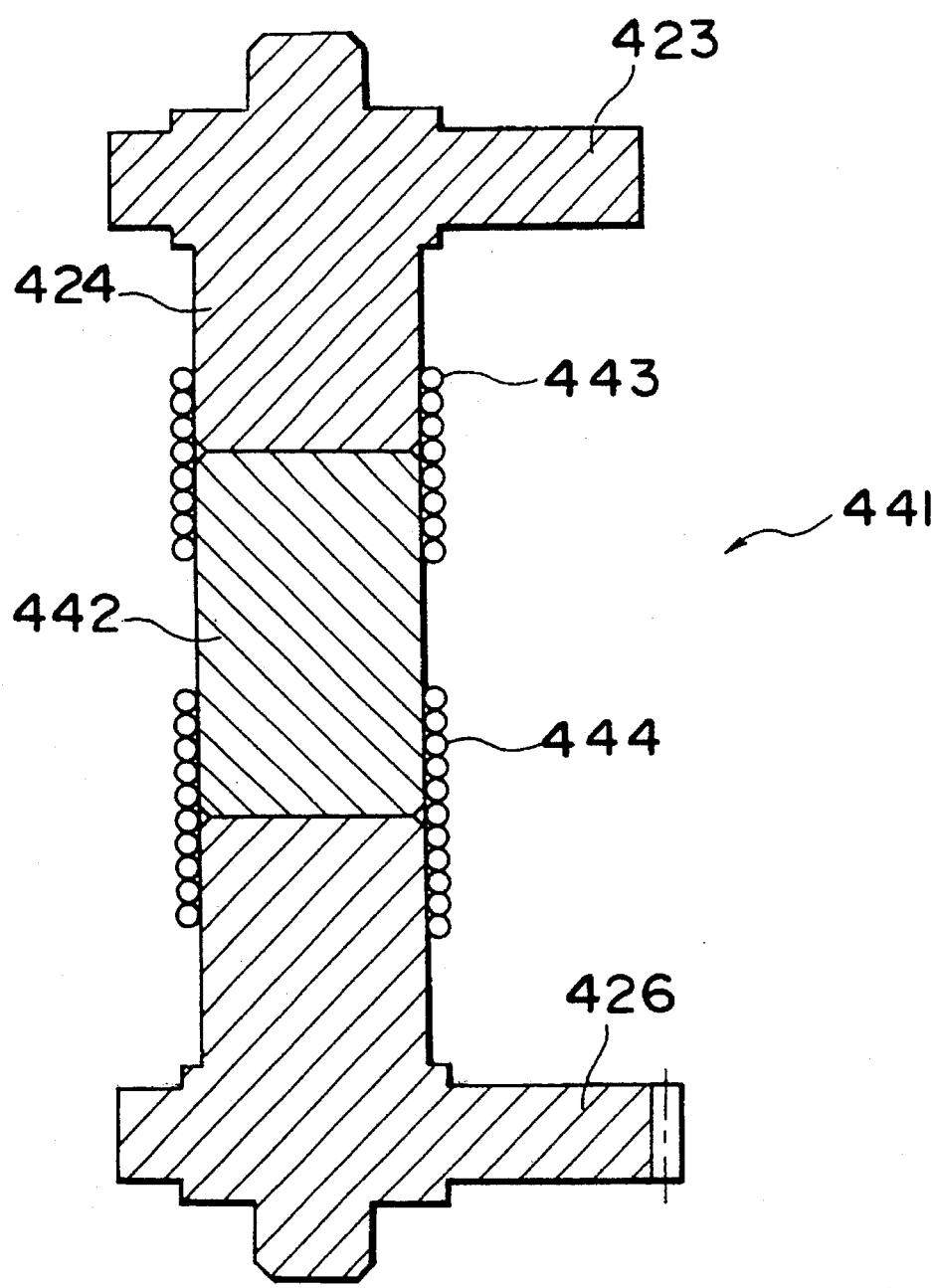
FIG. 54 is an enlarged sectional view of a clutch mechanism according to a modification of the overcharge spring mechanism shown in FIG. 51.

In the sixth embodiment, the overcharge spring mechanism 425 is adopted as a mechanism for connecting the follower lever 423 followed by the sliding movement of the cover-locking lever 413 to the gear 426 via the shaft 424. As a modification of the overcharge spring mechanism 425 according to this embodiment, it is possible to install a clutch mechanism 441 between the shaft 424 and the gear 426 as shown in FIG. 54. The clutch mechanism 441 comprises a connecting pin 442, having the same diameter as that of the shaft 424, approximately disposed in the middle of the shaft 424; and clutch springs 443 and 444 tightly wound around the connecting portions between the shaft 424 and the pin 442. Under no load applied thereto, the inner diameter of the clutch springs 443 and 444 is smaller than the outer diameter of the shaft 424 and that of the pin 442. The winding directions of the clutch springs 443 and 444 are opposite to each other. Therefore, at the time when the rotation of the shaft 424 is transmitted to the gear 426 under an excessive force, one of the clutch springs 443 or 444 is loosened and slid on the shaft 424 and the pin 442. Therefore, in both the forward and backward rotational directions of the shaft 424, only the rotation of the shaft is transmitted to the gear 426 with no excessive load.

Figure 55:
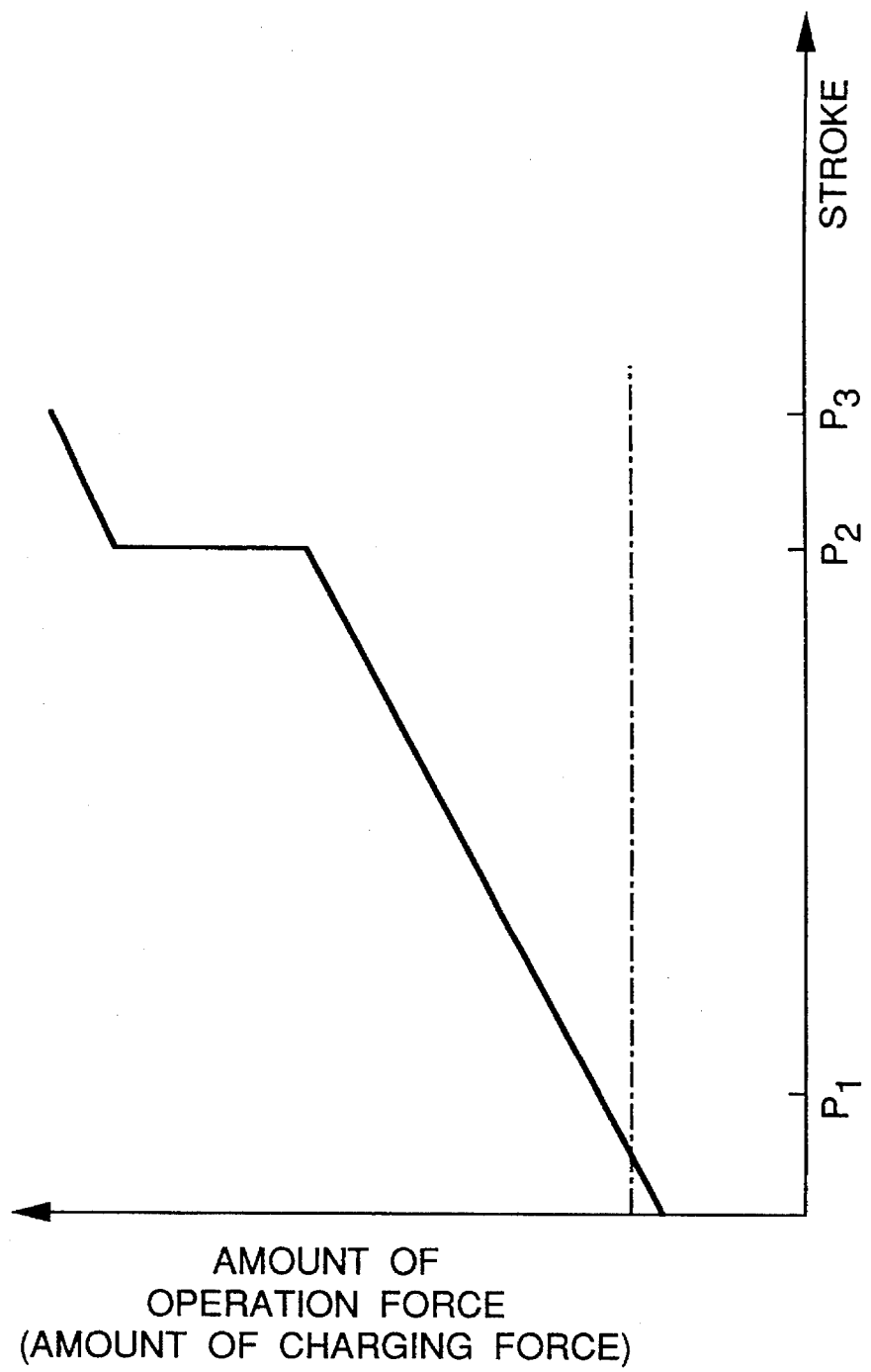
FIG. 55 is a graph showing a relationship between the rotational stroke of the driving interface shown in FIG. 54 and the amount of the operation force exerted thereon.

FIG. 55 shows the relationship between the rotational stroke of the driving interface 414 and the amount of its operation force. Just like the graph shown in FIG. 53, the rotational stroke of the driving interface 414 is plotted on the abscissa, and the amount of the operation force is plotted on the ordinate. And, in this figure, $P_1$ indicates a point at which the overcharging ends in the closing direction of the interface 414; $P_2$ indicates a point at which the overcharging starts in the opening direction thereof; and $P_3$ indicates a point at which the claw 419 of the cover-locking lever 413 completes engaging the hook 418 of the cover 412.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A mechanism for locking a cover for opening/closing a cartridge compartment in which a film cartridge is accommodated comprising:

a lock mechanism selectively having a locking state that the cover is prevented from being opened and an unlocking state that the cover can be opened;

a film feeding mechanism which feeds a film in and out the film cartridge;

a drive mechanism which drives the film feeding mechanism; and an actuating mechanism, driven by the driving mechanism, which switches the lock mechanism between the locking state and the unlocking state.

2. The mechanism according to claim 1, wherein the lock mechanism has a locking member movable between a locking position at which the cover is kept closed and an unlocking position at which the cover can be opened.

3. The mechanism according to claim 1, wherein the film feeding mechanism has a first driving member driven by the driving mechanism and a second driving member driven by the first driving member; and the first and second driving members have a predetermined range of relative angular play within which the second driving member is not driven by the first driving member when the driving mechanism drives the first driving member oppositely, wherein a movement of the actuating mechanism is controlled by a relative movement between the first and second driving members.

4. The mechanism according to claim 1, wherein the cartridge compartment has a detecting mechanism which detects an opening/closing of the cover; and when the detecting mechanism detects that the cover closes with the film cartridge being accommodated inside the cartridge compartment, the driving mechanism operates so that the lock mechanism has the locking state.

5. The mechanism according to claim 1, wherein the film is fed out of the film cartridge with the lock mechanism having the locking state.

6. The mechanism according to claim 1, wherein the film feeding mechanism has a fork which engages a spool of the film cartridge with which an indicator to provide an exposed/unexposed indication to the film rotates, and a rotation detecting mechanism which detects a rotational amount of the spool, wherein an operation of the driving mechanism is stopped when the rotation detecting mechanism detects that the spool rotates by a predetermined amount of rotation after the film is rewound up to a tip thereof inside the film cartridge with the film being exposed to light completely or partially.

7. The mechanism according to claim 6, wherein the lock mechanism is switched from the locking state to the unlocking state by driving the driving mechanism oppositely after a rotation of the spool of the film cartridge is controlled to stop.

8. The mechanism according to claim 1, which is used for a camera.

9. A mechanism for locking a cartridge compartment cover, of a camera, for opening/closing a cartridge compartment thereof in which a film cartridge is accommodated comprising:

a locking member movable between a locking position at which the cartridge compartment cover is prevented from being opened and an unlocking position at which the cover can be opened;

a first control member which is disposed, in a system for transmitting a force of a motor, between the motor and a joint for driving a cartridge spool of the film cartridge, and which has an input gear driven by the motor;

a second control member which is disposed between the joint and the first control member and which has an output gear;

rotation transmitting means which connects the first and second control members so as to allow them to rotate relatively within a predetermined range of relative rotation thereof and which transmits a rotation of the first control member to the second control member with the first and second control members being at both extremities of the predetermined range of relative rotation thereof;

cam means which is provided in at least one of the first and second control members; and a cam follower which follows the cam means so that the cam follower moves the locking member to the locking position when the first and second control members are at both extremities of the predetermined range of relative rotation thereof and that the cam follower moves the locking member to the unlocking position when the first and second control members are within the extremities of the predetermined range of relative rotation thereof.

10. A mechanism for locking a cover for opening/closing a cartridge compartment in which a film cartridge having a spool with which an indicator to provide an exposed/unexposed indication to a film thereof rotates is accommodated comprising:

a lock mechanism selectively having a locking state that the cartridge compartment cover is prevented from being opened and an unlocking state that the cover can be opened;

a feeding mechanism which feeds a film in and out the film cartridge; and an actuating mechanism which switches the lock mechanism from the locking state to the unlocking state after the spool is stopped at a predetermined position.

11. The mechanism according to claim 10, wherein the lock mechanism has a locking member movable between a locking position at which the cover is kept closed and an unlocking position at which the cover can be opened.

12. The mechanism according to claim 10, wherein the feeding mechanism is driven by a driving mechanism, and the actuating mechanism is controlled by a driving force of the driving mechanism.

13. The mechanism according to claim 10, wherein the lock mechanism is switched from the unlocking state to the locking state after the cartridge compartment is loaded with the film cartridge.

14. The mechanism according to claim 12, wherein the lock mechanism is switched from the unlocking state to the locking state after the cartridge compartment is loaded with the film cartridge.

15. The mechanism according to claim 10, which is used for a camera.

16. A mechanism for locking a cover for opening/closing a cartridge compartment in which a film cartridge having a spool with which an indicator to provide an exposed/unexposed indication to a film thereof rotates is accommodated comprising:

a lock mechanism selectively having a locking state that the cartridge compartment cover is prevented from being opened and an unlocking state that the cover can be opened;

a film-feeding mechanism which feeds a film in and out the film cartridge;

a driving mechanism which drives the film-feeding mechanism; and an actuating mechanism which rewinds the film inside the film cartridge, which switches the lock mechanism from the locking state to the unlocking state by a driving force of the driving mechanism after the spool is stopped at a predetermined position.

17. A mechanism for locking a cover for opening/closing a cartridge compartment in which a film cartridge having a light-intercepting door at an entrance/exit of a film thereof is accommodated comprising:

a locking member movable between a locking position at which the cover is kept closed and an unlocking position at which the cover can be opened; and a driving mechanism which drives the light-intercepting door, and which interlocks with the locking member so as to open the door when the locking member is moved from the unlocking position to the locking position.

18. The mechanism according to claim 17, which has a mechanism for biasing the locking member to the locking position.

19. The mechanism according to claim 17, wherein the driving mechanism has a safety mechanism for preventing a larger amount of driving force than a predetermined amount thereof from being transmitted to the light-intercepting door.

20. The mechanism according to claim 19, wherein the safety mechanism comprises a clutch in a system for transmitting the driving force.

21. The mechanism according to claim 20, wherein the clutch comprises a pair of shafts disposed coaxially and a spring which connects the pair of shafts.

22. The mechanism according to claim 19, wherein the safety mechanism comprises a pair of members rotatable with respect to each other and a biasing mechanism which biases the pair of members to a predetermined relative position.

23. The mechanism according to claim 17, which is used for a camera.

24. A mechanism for locking a cover for opening/closing a cartridge compartment in which a film cartridge having a light-intercepting door at an entrance/exit of a film thereof is accommodated comprising:

a lock mechanism selectively having a locking state that the cartridge compartment cover is prevented from being opened and an unlocking state that the cover can be opened;

a detecting mechanism which detects an opening/closing of the light-intercepting door;

an opening/closing mechanism which opens/closes the light-intercepting door; and a locking control mechanism which prevents the lock mechanism from being switched from the locking state to the unlocking state when the detecting mechanism detects that the light-intercepting door is opened and which switches the lock mechanism from the locking state to the unlocking state when the detecting mechanism detects that the light-intercepting door is closed.

25. The mechanism according to claim 24, which is used for a camera.

26. A mechanism for locking a cover for opening/closing a cartridge compartment in which a film cartridge having a light-intercepting door at an entrance/exit of a film thereof is accommodated comprising:

a lock mechanism selectively having a locking state that the cartridge compartment cover is prevented from being opened and an unlocking state that the cover can be opened;

a detecting mechanism which detects an opening/closing of the light-intercepting door;

an opening/closing mechanism which opens/closes the light-intercepting door; and a locking control mechanism which prevents the lock mechanism from being switched from the locking state to the unlocking state when the detecting mechanism detects that the light-intercepting door is opened.

27. A mechanism for locking a cover for opening/closing a cartridge compartment in which a film cartridge having a light-intercepting door at an entrance/exit of a film thereof is accommodated comprising:

- a lock mechanism selectively having a locking state that the cartridge compartment cover is prevented from being opened and an unlocking state that the cover can be opened;
- a detecting mechanism which detects an opening/closing of the light-intercepting door;
- an opening/closing mechanism which opens/closes the light-intercepting door; and
- a locking control mechanism which switches the lock mechanism from the locking state to the unlocking state when the detecting mechanism detects that the light-intercepting door is closed.

28. A mechanism in which a film cartridge having a light-intercepting door at an entrance/exit of a film thereof is used comprising:

- a cartridge compartment in which the film cartridge is accommodated;
- a cover for opening/closing the cartridge compartment;
- an opening/closing mechanism which opens/closes the light-intercepting door;
- a detecting mechanism which detects an opening/closing of the light-intercepting door; and
- a film-feeding control mechanism which feeds the film from the film cartridge up to a position at which the film is set ready for photographing when the detecting mechanism detects that the light-intercepting door is opened.

29. The mechanism according to claim 28, which is used for a camera.

30. A mechanism for locking a cover for opening/closing a cartridge compartment in which a film cartridge having a light-intercepting door at an entrance/exit of a film thereof is accommodated comprising:

- a lock mechanism selectively having a locking state that the cartridge compartment cover is prevented from being opened and an unlocking state that the cover can be opened;
- an opening/closing mechanism which opens/closes the light-intercepting door; and
- a lock control mechanism which switches the lock mechanism between the locking state and the unlocking state by a driving force of the opening/closing mechanism.

31. The mechanism according to claim 30, wherein the lock mechanism comprises a first engaging member movable between a first engaging position at which the cover is prevented from being opened and a first unlocking position, being away from the first engaging position, at which the cover can be opened; a biasing mechanism for biasing the first engaging member to the first engaging position; an operation member for moving the first engaging member to the first unlocking position against a biasing force of the biasing mechanism; and a second engaging member, movable between a second engaging position at which the cover is prevented from being opened and a second unlocking position at which the cover can be opened, wherein the second engaging member is driven by the lock control mechanism.

32. The mechanism according to claim 30, wherein the lock mechanism has a locking member movable between a locking position at which the cover is kept closed and an unlocking position at which the cover can be opened, wherein the locking member is kept at the locking position when the locking member is moved to the locking position.

33. The mechanism according to claim 30, which is used for a camera.

34. A mechanism for locking a cover for opening/closing a cartridge compartment in which a film cartridge having a light-intercepting door at an entrance/exit of a film thereof and a spool with which an indicator to provide an exposed/unexposed indication to the film rotates is accommodated comprising:

- a lock mechanism selectively having a locking state that the cartridge compartment cover is prevented from being opened and an unlocking state that the cover can be opened;
- a cartridge-spool driving mechanism which drives the spool of the cartridge with engaging with the spool thereof;
- an opening/closing mechanism which opens/closes the light-intercepting door; and
- a lock control mechanism which switches the lock mechanism from the locking state to the unlocking state by a driving force of the opening/closing mechanism after driving the spool at a predetermined position to display an exposed/unexposed indication to the film by the cartridge-spool driving mechanism.

35. A mechanism for locking a cover for opening/closing a cartridge compartment of a camera in which a film cartridge having a light-intercepting door at an entrance/exit of a film thereof and a pair of interlocking members which are located at both ends of the light-intercepting door is accommodated, comprising:

- an opening/closing driving member, which engages with one of the interlocking members of the cartridge when the cartridge is put in the cartridge compartment, for driving the light-intercepting door;
- an engaging portion, engaging with the other interlocking member of the film cartridge when the cover is closed with the film cartridge being inside the cartridge compartment, which rotates with interlocking with the light-intercepting door; and
- a lock member, interlocking with the engaging portion, which prevents the cover from being opened when the light-intercepting door is opened and which allows the cover to be opened when the light-intercepting door is closed.

* * * * *